United States Patent
Kim et al.

(10) Patent No.: US 11,757,692 B2
(45) Date of Patent: *Sep. 12, 2023

(54) METHOD FOR TRANSMITTING/RECEIVING SIGNAL IN WIRELESS COMMUNICATION SYSTEM, AND DEVICE SUPPORTING SAME

(71) Applicant: LG Electronics Inc., Seoul (KR)

(72) Inventors: Seonwook Kim, Seoul (KR); Hyunsoo Ko, Seoul (KR); Changhwan Park, Seoul (KR); Suckchel Yang, Seoul (KR); Sukhyon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/968,317

(22) Filed: Oct. 18, 2022

(65) Prior Publication Data

US 2023/0070204 A1 Mar. 9, 2023

Related U.S. Application Data

(63) Continuation of application No. 17/267,446, filed as application No. PCT/KR2019/010103 on Aug. 9, 2019, now Pat. No. 11,546,200.

(30) Foreign Application Priority Data

Aug. 9, 2018 (KR) .................... 10-2018-0092796
Jan. 10, 2019 (KR) .................... 10-2019-0003563
(Continued)

(51) Int. Cl.
*H04L 27/26* (2006.01)
*H04L 5/00* (2006.01)
(Continued)

(52) U.S. Cl.
CPC .......... *H04L 27/2657* (2013.01); *H04L 5/001* (2013.01); *H04W 16/14* (2013.01);
(Continued)

(58) Field of Classification Search
CPC ..... H04W 16/14; H04W 48/10; H04W 56/00; H04W 74/0833; H04L 27/2657; H04L 5/001
See application file for complete search history.

(56) References Cited

U.S. PATENT DOCUMENTS

2020/0037230 A1   1/2020   Chen et al.
2021/0235456 A1   7/2021   Xu et al.
(Continued)

FOREIGN PATENT DOCUMENTS

BR   112021016010 A2 * 10/2021 .......... H04B 17/327
CN   111277378       * 12/2018
(Continued)

OTHER PUBLICATIONS

Convida Wireless, "Design Considerations for SSB in NR-U," R1-1807225, 3GPP TSG-RAN WG1 Meeting #93, Busan, Korea, dated May 21-25, 2018, 5 pages.
(Continued)

*Primary Examiner* — Phong La
(74) *Attorney, Agent, or Firm* — Fish & Richardson P.C.

(57) ABSTRACT

Disclosed in various embodiments are a method for transmitting/receiving a signal in a wireless communication system, and a device supporting same. More particularly, disclosed in various embodiments are a method for transmitting/receiving a synchronization signal block (SSB) in an unlicensed band, and a device supporting same.

8 Claims, 36 Drawing Sheets

(30) Foreign Application Priority Data

| | | | |
|---|---|---|---|
| Jan. 21, 2019 | (KR) | ........................ | 10-2019-0007410 |
| Feb. 15, 2019 | (KR) | ........................ | 10-2019-0018193 |
| Mar. 28, 2019 | (KR) | ........................ | 10-2019-0035564 |
| May 2, 2019 | (KR) | ........................ | 10-2019-0051526 |

(51) Int. Cl.
  *H04W 16/14* (2009.01)
  *H04W 48/10* (2009.01)
  *H04W 56/00* (2009.01)
  *H04W 74/08* (2009.01)

(52) U.S. Cl.
  CPC ........... *H04W 48/10* (2013.01); *H04W 56/00* (2013.01); *H04W 74/0833* (2013.01)

(56) References Cited

U.S. PATENT DOCUMENTS

| | | | |
|---|---|---|---|
| 2021/0297966 A1* | 9/2021 | Noh | .................... H04W 56/001 |
| 2021/0320833 A1 | 10/2021 | Kim et al. | |
| 2021/0400725 A1 | 12/2021 | Harada et al. | |

FOREIGN PATENT DOCUMENTS

| | | | | |
|---|---|---|---|---|
| CN | 111181702 | * | 5/2020 | |
| CN | 111277378 | | 6/2020 | |
| CN | 112956271 | | 6/2021 | |
| CN | 111181702 | | 8/2021 | |
| JP | 2019140512 | | 2/2018 | |
| WO | WO2017047973 | | 3/2017 | |
| WO | WO2018233513 | | 12/2018 | |
| WO | WO2019160331 | | 8/2019 | |
| WO | WO-2019160331 A1 | * | 8/2019 | .......... H04W 56/001 |
| WO | WO2020082395 | | 4/2020 | |
| WO | WO2020103160 | | 5/2020 | |

OTHER PUBLICATIONS

Ericsson, "On initial access, RRM, mobility and RLM," Rl-1806254, 3GPP TSG-RAN WG1 Meeting #93, Busan, Korea, dated May 21-25, 2018, 9 pages.

Huawei & HiSilicon, "Initial access in NR unlicensed," R1-1805920 3GPP TSG RAN WG1 Meeting #93, Busan, Korea, dated May 21-25, 2018, 8 pages.

InterDigital Inc., "On Initial Access for NR Unlicensed Spectrum," R1-1807037, 3GPP TSG RAN WG1 Meeting #93, Busan, South Korea, dated May 21-25, 2018, 8 pages.

International Search Report and Written Opinion in International Appln. No. PCT/KR2019/010103, dated Dec. 3, 2019, 16 pages (with English translation).

European Search Report in European Appln. No. 19846025.5, dated Sep. 3, 2021, 10 pages.

* cited by examiner

FIG. 17A
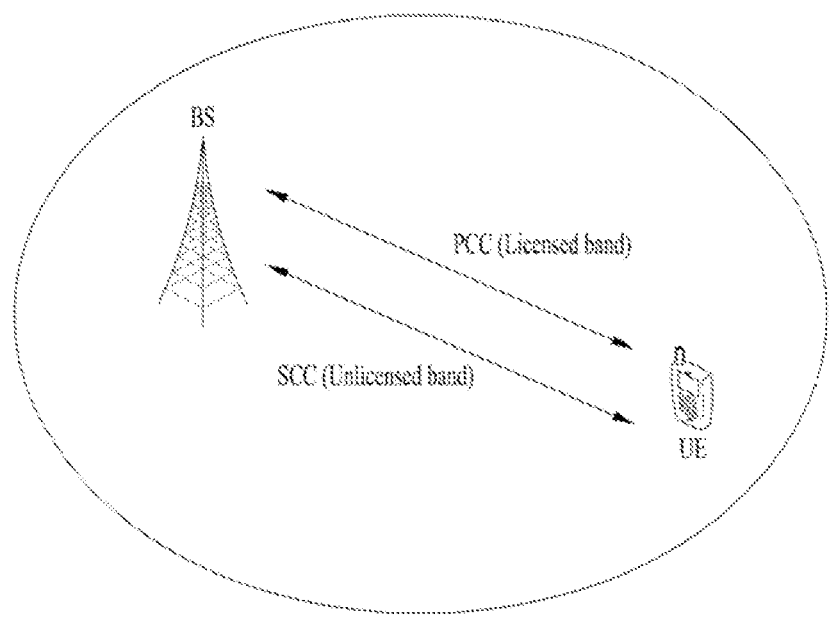
Carrier aggregation between L-band and U-band
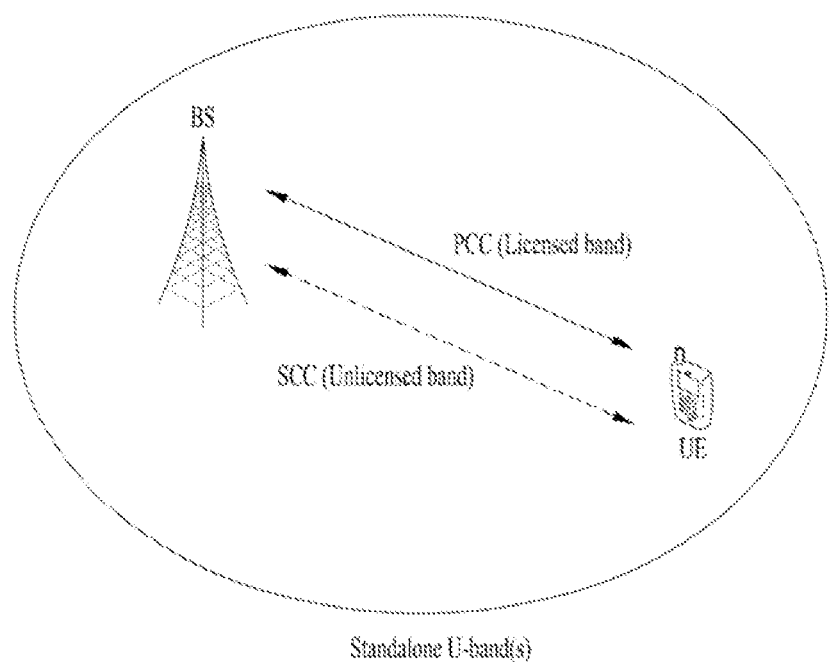
Standalone U-band(s)
FIG. 17B

FIG. 25

METHOD FOR TRANSMITTING/RECEIVING SIGNAL IN WIRELESS COMMUNICATION SYSTEM, AND DEVICE SUPPORTING SAME

CROSS-REFERENCE TO RELATED APPLICATIONS

This application is a continuation of U.S. application Ser. No. 17/267,446, filed on Feb. 9, 2021, which is the National Phase of PCT International Application No. PCT/KR2019/010103, filed on Aug. 9, 2019, which claims priority to Korean Patent Application Nos. 10-2018-0092796, filed on Aug. 9, 2018, 10-2019-0003563, filed on Jan. 10, 2019, 10-2019-0007410, filed on Jan. 21, 2019, 10-2019-0018193, filed on Feb. 15, 2019, 10-2019-0035564, filed on Mar. 28, 2019, and 10-2019-0051526, filed on May 2, 2019. The disclosures of the prior applications are incorporated by reference in their entirety.

TECHNICAL FIELD

Various embodiments of the present disclosure relate to a wireless communication system, and more particularly, to a method and apparatus for transmitting and receiving a signal in a wireless communication system.

BACKGROUND

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, Ultra-reliable and low latency communication (URLLC), and the like has been discussed.

SUMMARY

Various embodiments of the present disclosure may provide a method and apparatus for transmitting and receiving signals in a wireless communication system.

Specifically, various embodiments of the present disclosure may provide a method and apparatus for transmitting and receiving a synchronization signal block (SSB) in an unlicensed band in consideration of the feature of the unlicensed band in which a channel access procedure (CAP) should be performed before signal transmission and reception.

Further, various embodiments of the present disclosure may provide a method and apparatus for transmitting and receiving a radio resource management (RRM) report based on an SSB transmitted and received in an unlicensed band.

It will be appreciated by persons skilled in the art that the objects that could be achieved with the present disclosure are not limited to what has been particularly described hereinabove and the above and other objects that the present disclosure could achieve will be more clearly understood from the following detailed description.

Various embodiments of the present disclosure may provide a method and apparatus for transmitting a signal in a wireless communication system.

According to various embodiments of the present disclosure, a method of transmitting a signal by an apparatus in a wireless communication system may be provided. The method may include performing a channel access procedure (CAP) for an unlicensed band, and transmitting one or more synchronization signal blocks (SSBs) in the unlicensed band based on the CAP.

In an exemplary embodiment, the one or more SSBs may be transmitted on one or more consecutive second candidate positions including a starting candidate position determined based on the CAP among first candidate positions configured within a time window.

In an exemplary embodiment, indexes from 0 to N−1 may be repeatedly assigned to the first candidate positions.

In an exemplary embodiment, N may be the number of the one or more SSBs, and the indexes of the one or more SSBs may be identical to the indexes of the one or more second candidate positions, respectively.

In an exemplary embodiment, wherein based on a first SSB among the one or more SSBs not being available to be transmitted on the one or more second candidate positions according to the position of the starting candidate position determined based on the CAP, transmission of the one or more SSBs may be dropped, the remaining one or more second SSBs among the one or more SSBs may be transmitted on the one or more second candidate positions while transmission of the first SSB may be dropped, or the one or more second SSBs may be transmitted on the one or more second candidate positions while the first SSB may be transmitted in a time area outside the time window, contiguously to the one or more second SSBs.

In an exemplary embodiment, the first candidate positions may be determined based on a minimum time interval on which a SSB related to the same beam index or a SSB with a quasi-co-located (QCL) relationship is available to be transmitted.

In an exemplary embodiment, the method may further include transmitting information about the minimum time interval by cell-specific radio resource control (RRC) signaling or user equipment (UE)-specific RRC signaling.

In an exemplary embodiment, the minimum time interval may be determined to be one of preconfigured limited values.

In an exemplary embodiment, the information about the minimum time interval may be related to one or more bits included in the cell-specific RRC signaling or the UE-specific RRC signaling, and the one value may be indicated based on a value of the one or more bits.

In an exemplary embodiment, the method may further include transmitting the information about the minimum time interval for each cell identifier (ID) by cell-specific RRC signaling, system information block 3 (SIB 3), or SIB4, and receiving information related to radio resource management (RRM) measurement for a neighboring cell in response to the information about the minimum time interval for each cell ID.

In an exemplary embodiment, the information related to RRM measurement may be configured for each of the first candidate positions.

According to various embodiments of the present disclosure, an apparatus for transmitting a signal in a wireless communication system may be provided. The apparatus may include at least one memory, and at least one processor coupled to the at least one memory. The at least one processor may be configured to perform a CAP for an unlicensed band, and transmit one or more SSBs in the unlicensed band based on the CAP.

In an exemplary embodiment, the one or more SSBs may be transmitted on one or more consecutive second candidate positions including a starting candidate position determined based on the CAP among first candidate positions configured within a time window.

In an exemplary embodiment, the first candidate positions may be determined based on a minimum time interval on which a SSB related to the same beam index or a SSB with a quasi-co-located (QCL) relationship is available to be transmitted.

In an exemplary embodiment, the at least one processor may be configured to transmit information about the minimum time interval by cell-specific RRC signaling or UE-specific RRC signaling.

According to various embodiments of the present disclosure, an apparatus for receiving a signal in a wireless communication system may be provided. The apparatus may include at least one memory and at least one processor coupled to the at least one memory. The at least one processor may be configured to receive one or more SSBs in an unlicensed band based on a CAP for the unlicensed band.

In an exemplary embodiment, the one or more SSBs may be received at one or more consecutive second candidate positions including a starting candidate position determined based on the CAP among first candidate positions configured within a time window.

In an exemplary embodiment, the apparatus may communicate at least one of a mobile terminal, a network, or an autonomous driving vehicle other than a vehicle including the apparatus.

The above-described various embodiments of the present disclosure are only some of the preferred embodiments of the present disclosure, and various embodiments reflecting the technical features of the present disclosure may be derived and understood from the following detailed description of the present disclosure by those skilled in the art.

According to various embodiments of the present disclosure, the following effects may be achieved.

According to various embodiments of the present disclosure, a method and apparatus for transmitting and receiving a synchronization signal block (SSB) in an unlicensed band in consideration of the feature of the unlicensed band in which a channel access procedure (CAP) should be performed before signal transmission and reception may be provided.

Specifically, according to various embodiments of the present disclosure, a method and apparatus for transmitting and receiving a synchronization signal block (SSB) in an unlicensed band may be provided, which eliminate ambiguity of a user equipment (UE) about an unspecified starting time of an SSB transmission in view of the feature of the unlicensed band in which signal transmission and reception depends on a channel access procedure (CAP).

Further, according to various embodiments of the present disclosure, a method and apparatus for transmitting and receiving a radio resource management (RRM) report based on an SSB transmitted and received in the above-described unlicensed band may be provided.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the present disclosure, provide embodiments of the present disclosure together with detail explanation. Yet, a technical characteristic of the present disclosure is not limited to a specific drawing. Characteristics disclosed in each of the drawings are combined with each other to configure a new embodiment. Reference numerals in each drawing correspond to structural elements.

FIGS. 17A and 17B illustrate an exemplary wireless communication system supporting an unlicensed band, which is applicable to various embodiments of the present disclosure;

FIG. 25 is a diagram illustrating an exemplary SSB transmission structure according to various embodiments of the present disclosure;

DETAILED DESCRIPTION

Figure 1:
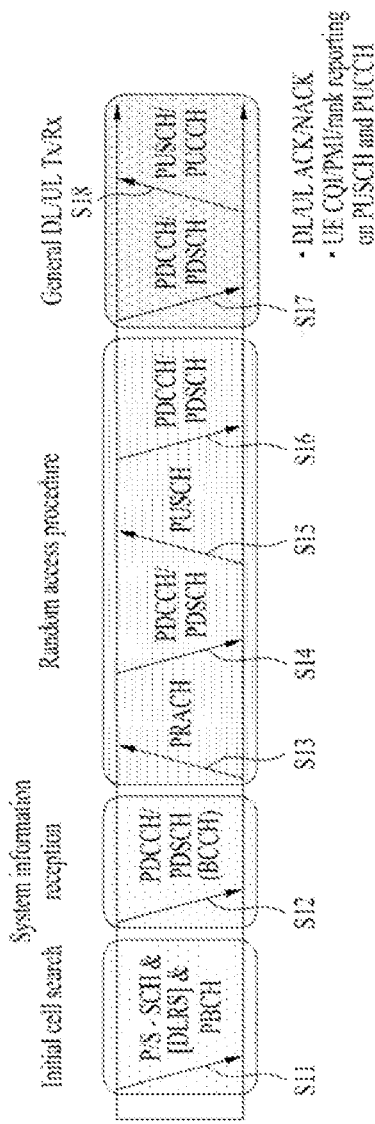
FIG. 1 is a diagram illustrating physical channels and a signal transmission method using the physical channels, which may be used in various embodiments of the present disclosure.

The various embodiments of the present disclosure described below are combinations of elements and features of the various embodiments of the present disclosure in specific forms. The elements or features may be considered selective unless otherwise mentioned. Each element or feature may be practiced without being combined with other elements or features. Further, various embodiments of the present disclosure may be constructed by combining parts of the elements and/or features. Operation orders described in various embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the various embodiments of the present disclosure will be avoided lest it should obscure the subject matter of the various embodiments of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the various embodiments of the present disclosure (more particularly, in the context of the following claims) unless indicated otherwise in the specification or unless context clearly indicates otherwise.

In the various embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an advanced base station (ABS), an access point, etc.

In the various embodiments of the present disclosure, the term terminal may be replaced with a UE, a mobile station (MS), a subscriber station (SS), a mobile subscriber station (MSS), a mobile terminal, an advanced mobile station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an uplink (UL). Likewise, the UE may serve as a reception end and the BS may serve as a transmission end, on a downlink (DL).

The various embodiments of the present disclosure may be supported by standard specifications disclosed for at least one of wireless access systems including an institute of electrical and electronics engineers (IEEE) 802.xx system, a 3rd generation partnership project (3GPP) system, a 3GPP long term evolution (LTE) system, 3GPP 5G NR system and a 3GPP2 system. In particular, the various embodiments of the present disclosure may be supported by the standard specifications, 3GPP TS 36.211, 3GPP TS 36.212, 3GPP TS 36.213, 3GPP TS 36.321, 3GPP TS 36.331, 3GPP TS 37.213, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the various embodiments of the present disclosure, in the various embodiments of the present disclosure may be explained by the above standard specifications. All terms used in the various embodiments of the present disclosure may be explained by the standard specifications.

Reference will now be made in detail to the various embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the various embodiments of the present disclosure. However, it will be apparent to those skilled in the art that the specific terms may be replaced with other terms without departing the technical spirit and scope of the various embodiments of the present disclosure.

Hereinafter, 3GPP LTE/LTE-A systems and 3GPP NR system are explained, which are examples of wireless access systems.

The various embodiments of the present disclosure can be applied to various wireless access systems such as code division multiple access (CDMA), frequency division multiple access (FDMA), time division multiple access (TDMA), orthogonal frequency division multiple access (OFDMA), single carrier frequency division multiple access (SC-FDMA), etc.

CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as IEEE 802.11 (Wi-Fi), IEEE 802.16 (WiMAX), IEEE 802.20, evolved UTRA (E-UTRA), etc. UTRA is a part of universal mobile telecommunications system (UMTS). 3GPP LTE is a part of evolved UMTS (E-UMTS) using E-UTRA, adopting OFDMA for DL and SC-FDMA for UL. LTE-advanced (LTE-A) is an evolution of 3GPP LTE.

While the various embodiments of the present disclosure are described in the context of 3GPP LTE/LTE-A systems and 3GPP NR system in order to clarify the technical features of the various embodiments of the present disclosure, the various embodiments of the present disclosure is also applicable to an IEEE 802.16e/m system, etc.

1. Overview of 3GPP System 1.1. Physical Channels and General Signal Transmission In a wireless access system, a UE receives information from a base station on a DL and transmits information to the base station on a UL. The information transmitted and received between the UE and the base station includes general data information and various types of control information. There are many physical channels according to the types/usages of information transmitted and received between the base station and the UE.

FIG. 1 is a diagram illustrating physical channels and a signal transmission method using the physical channels, which may be used in various embodiments of the present disclosure.

When a UE is powered on or enters a new cell, the UE performs initial cell search (S11). The initial cell search involves acquisition of synchronization to a BS. Specifically, the UE synchronizes its timing to the base station and acquires information such as a cell identifier (ID) by receiving a primary synchronization channel (P-SCH) and a secondary synchronization channel (S-SCH) from the BS.

Then the UE may acquire information broadcast in the cell by receiving a physical broadcast channel (PBCH) from the base station.

During the initial cell search, the UE may monitor a DL channel state by receiving a downlink reference signal (DL RS).

After the initial cell search, the UE may acquire more detailed system information by receiving a physical downlink control channel (PDCCH) and receiving on a physical downlink shared channel (PDSCH) based on information of the PDCCH (S12).

Subsequently, to complete connection to the eNB, the UE may perform a random access procedure with the eNB (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a PUSCH by using scheduling information in the RAR (S15), and perform a contention resolution procedure including reception of a PDCCH signal and a PDSCH signal corresponding to the PDCCH signal (S16).

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure.

Control information that the UE transmits to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Radio Frame Structures

Figure 2A:
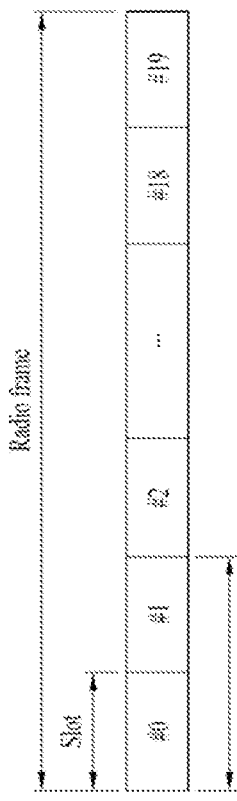
FIGS. 2A and 2B are diagrams illustrating a radio frame structure in a long term evolution (LTE) system to which various embodiments of the present disclosure are applicable.
Figure 2B:
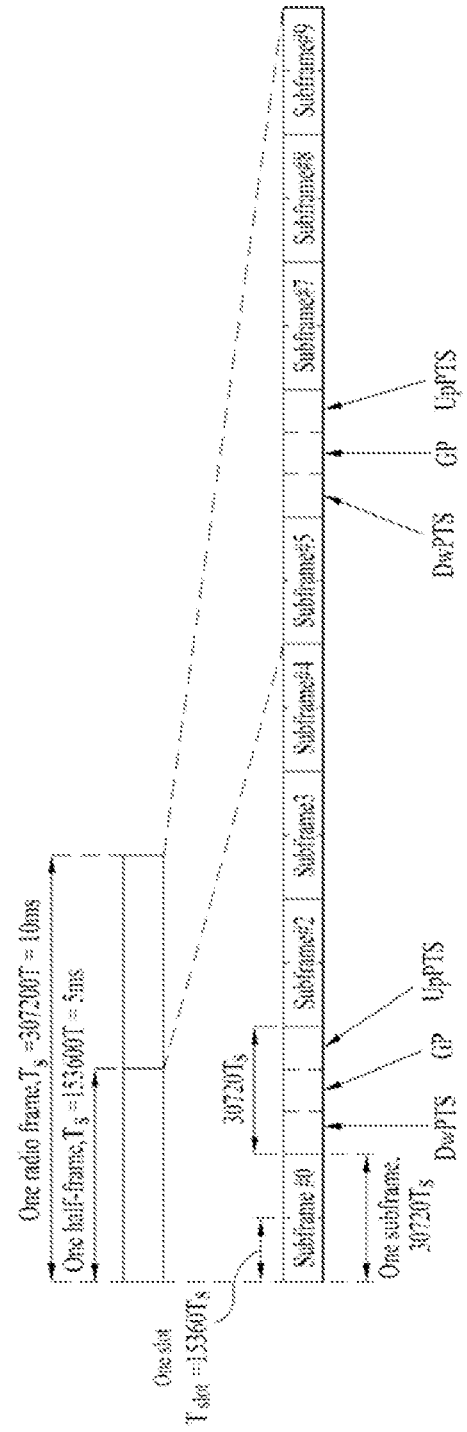
Figure 3:
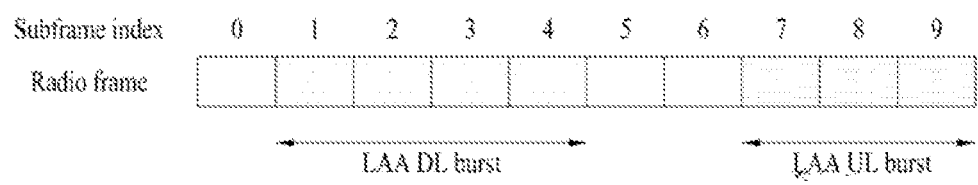
FIG. 3 is a diagram illustrating a radio frame structure in an LTE system to which various embodiments of the present disclosure are applicable.

FIGS. 2 and 3 illustrate radio frame structures in an LTE system to which various embodiments of the present disclosure are applicable.

The LTE system supports frame structure type 1 for frequency division duplex (FDD), frame structure type 2 for time division duplex (TDD), and frame structure type 3 for an unlicensed cell (UCell). In the LTE system, up to 31 secondary cells (SCells) may be aggregated in addition to a primary cell (PCell). Unless otherwise specified, the following operation may be applied independently on a cell basis.

In multi-cell aggregation, different frame structures may be used for different cells. Further, time resources (e.g., a subframe, a slot, and a subslot) within a frame structure may be generically referred to as a time unit (TU).

FIG. 2A illustrates frame structure type 1. Frame type 1 is applicable to both a full Frequency Division Duplex (FDD) system and a half FDD system.

A DL radio frame is defined by 10 1-ms subframes. A subframe includes 14 or 12 symbols according to a cyclic prefix (CP). In a normal CP case, a subframe includes 14 symbols, and in an extended CP case, a subframe includes 12 symbols.

Depending on multiple access schemes, a symbol may be an OFDM(A) symbol or an SC-FDM(A) symbol. For example, a symbol may refer to an OFDM(A) symbol on DL and an SC-FDM(A) symbol on UL. An OFDM(A) symbol may be referred to as a cyclic prefix-OFDMA(A) (CP-OFDM(A)) symbol, and an SC-FMD(A) symbol may be referred to as a discrete Fourier transform-spread-OFDM(A) (DFT-s-OFDM(A)) symbol.

One subframe may be defined by one or more slots according to a subcarrier spacing (SCS) as follows.

When SCS=7.5 kHz or 15 kHz, subframe #i is defined by two 0.5-ms slots, slot #2i and slot #2i+1 (i=0~9).

When SCS=1.25 kHz, subframe #i is defined by one 1-ms slot, slot #2i.

When SCS=15 kHz, subframe #i may be defined by six subslots as illustrated in Table 1.

Table 1 lists exemplary subslot configurations for one subframe (normal CP).

TABLE 1

| | Subslot number | | | | | |
|---|---|---|---|---|---|---|
| | 0 | 1 | 2 | 3 | 4 | 5 |
| Slot number | | | 2i | | | 2i + 1 |
| Uplink subslot pattern (Symbol number) | 0, 1, 2 | 3, 4 | 5, 6 | 0, 1 | 2, 3 | 4, 5, 6 |
| Downlink subslot pattern 1 (Symbol number) | 0, 1, 2 | 3, 4 | 5, 6 | 0, 1 | 2, 3 | 4, 5, 6 |
| Downlink subslot pattern 2 (Symbol number) | 0, 1 | 2, 3, 4 | 5, 6 | 0, 1 | 2, 3 | 4, 5, 6 |

FIG. 2B illustrates frame structure type 2. Frame structure type 2 is applied to a TDD system. Frame structure type 2 includes two half frames. A half frame includes 4 (or 5) general subframes and 1 (or 0) special subframe. According to a UL-DL configuration, a general subframe is used for UL or DL. A subframe includes two slots.

Table 2 lists exemplary subframe configurations for a radio frame according to UL-DL configurations.

TABLE 2

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2, D represents a DL subframe, U represents a UL subframe, and S represents a special subframe. A special subframe includes a downlink pilot time slot (DwPTS), a guard period (GP), and an uplink pilot time slot (UpPTS). The DwPTS is used for initial cell search, synchronization, or channel estimation at a UE. The UpPTS is used for channel estimation at an eNB and acquisition of UL transmission synchronization at a UE. The GP is a period for cancelling interference of a UL caused by the multipath delay of a DL signal between a DL and the UL.

Table 3 lists exemplary special subframe configurations.

TABLE 3

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $(1 + X) \cdot 2192 \cdot T_s$ | $(1 + X) \cdot 2560 \cdot T_s$ | $7680 \cdot T_s$ | $(1 + X) \cdot 2192 \cdot T_s$ | $(1 + X) \cdot 2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | $(2 + X) \cdot 2192 \cdot T_s$ | $(2 + X) \cdot 2560 \cdot T_s$ | $20480 \cdot T_s$ | $(2 + X) \cdot 2192 \cdot T_s$ | $(2 + X) \cdot 2560 \cdot T_s$ |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |
| 10 | $13168 \cdot T_s$ | $13152 \cdot T_s$ | $12800 \cdot T_s$ | — | — | — |

In Table 3, X is configured by higher-layer signaling (e.g., radio resource control (RRC) signaling or the like) or given as 0.

FIG. 3 is a diagram illustrating frame structure type 3.

Frame structure type 3 may be applied to a UCell operation. Frame structure type 3 may be applied to, but not limited to, a licensed assisted access (LAA) SCell with a normal CP. A frame is 10 ms in duration, including 10 1-ms subframes. Subframe #i is defined by two consecutive slots, slot #2i and slot #2i+1. Each subframe in a frame may be used for a DL or UL transmission or may be empty. A DL transmission occupies one or more consecutive subframes, starting from any time in a subframe and ending at a boundary of a subframe or in a DwPTS of Table 3. A UL transmission occupies one or more consecutive subframes.

Figure 4:
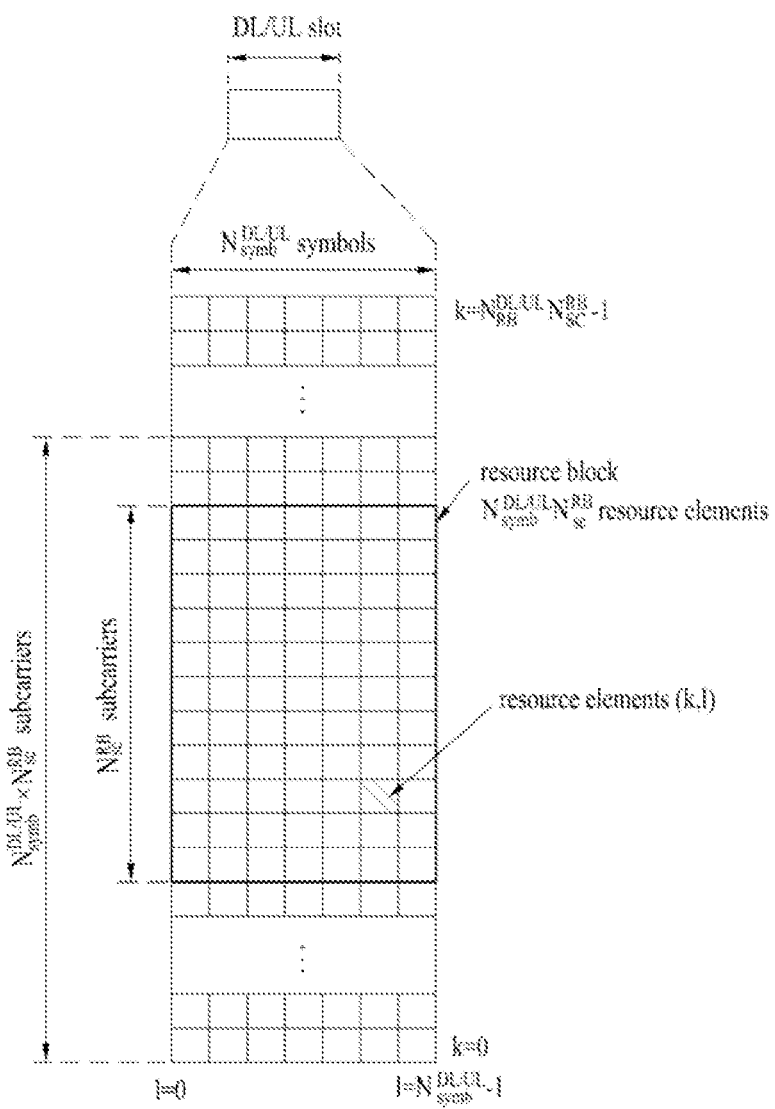
FIG. 4 is a diagram illustrating a slot structure in an LTE system to which various embodiments of the present disclosure are applicable.

FIG. 4 is a diagram illustrating a slot structure in an LTE system to which various embodiments of the present disclosure are applicable.

Referring to FIG. 4, a slot includes a plurality of orthogonal frequency division multiplexing (OFDM) symbols in the time domain by a plurality of resource blocks (RBs) in the frequency domain. A symbol may refer to a symbol duration. A slot structure may be described by a resource grid including $N^{DL/UL}_{RB}N^{RB}_{sc}$ subcarriers and $N^{DL/UL}_{symb}$ symbols. $N^{DL}_{RB}$ represents the number of RBs in a DL slot, and $N^{UL}_{RB}$ represents the number of RBs in a UL slot. $N^{DL}_{RB}$ and $N^{UL}_{RB}$ are dependent on a DL bandwidth and a UL bandwidth, respectively. $N^{DL}_{symb}$ represents the number of symbols in the DL slot, and $N^{UL}_{symb}$ represents the number of symbols in the UL slot. $N^{RB}_{sc}$ represents the number of subcarriers in one RB. The number of symbols in a slot may vary according to an SCS and a CP length (see Table 1). For example, while one slot includes 7 symbols in a normal CP case, one slot includes 6 symbols in an extended CP case.

An RB is defined as $N^{DL/UL}_{symb}$ (e.g., 7) consecutive symbols in the time domain by $N^{RB}_{sc}$ (e.g., 12) consecutive subcarriers in the frequency domain. The RB may be a physical resource block (PRB) or a virtual resource block (VRB), and PRBs may be mapped to VRBs in a one-to-one correspondence. Two RBs each being located in one of the two slots of a subframe may be referred to as an RB pair. The two RBs of an RB pair may have the same RB number (or RB index). A resource with one symbol by one subcarrier is referred to as a resource element (RE) or tone. Each RE in the resource grid may be uniquely identified by an index pair (k, l) in a slot. k is a frequency-domain index ranging from 0 to $N^{DL/UL}_{RB} \times N^{RB}_{sc} - 1$ and l is a time-domain index ranging from 0 to $N^{DL/UL}_{symb} - 1$.

Figure 5:
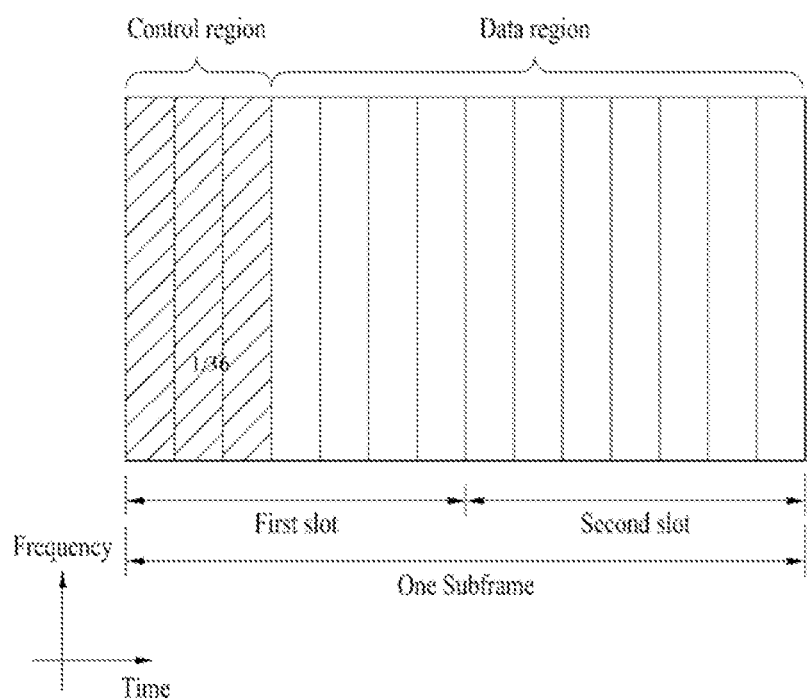
FIG. 5 is a diagram illustrating an uplink (UL) subframe structure in an LTE system to which various embodiments of the present disclosure are applicable.

FIG. 5 is a diagram illustrating a UL subframe structure in an LTE system to which various embodiments of the present disclosure are applicable.

Referring to FIG. 5, one subframe 500 includes two 0.5-ms slots 501. Each slot includes a plurality of symbols 502, each corresponding to one SC-FDMA symbol. An RB 503 is a resource allocation unit corresponding to 12 subcarriers in the frequency domain by one slot in the time domain.

A UL subframe is divided largely into a control region 504 and a data region 505. The data region is communication resources used for each UE to transmit data such as voice, packets, and so on, including a physical uplink shared channel (PUSCH). The control region is communication resources used for each UE to transmit an ACK/NACK for a DL channel quality report or a DL signal, a UL scheduling request, and so on, including a physical uplink control channel (PUCCH).

A sounding reference signal (SRS) is transmitted in the last SC-FDMA symbol of a subframe in the time domain.

Figure 6:
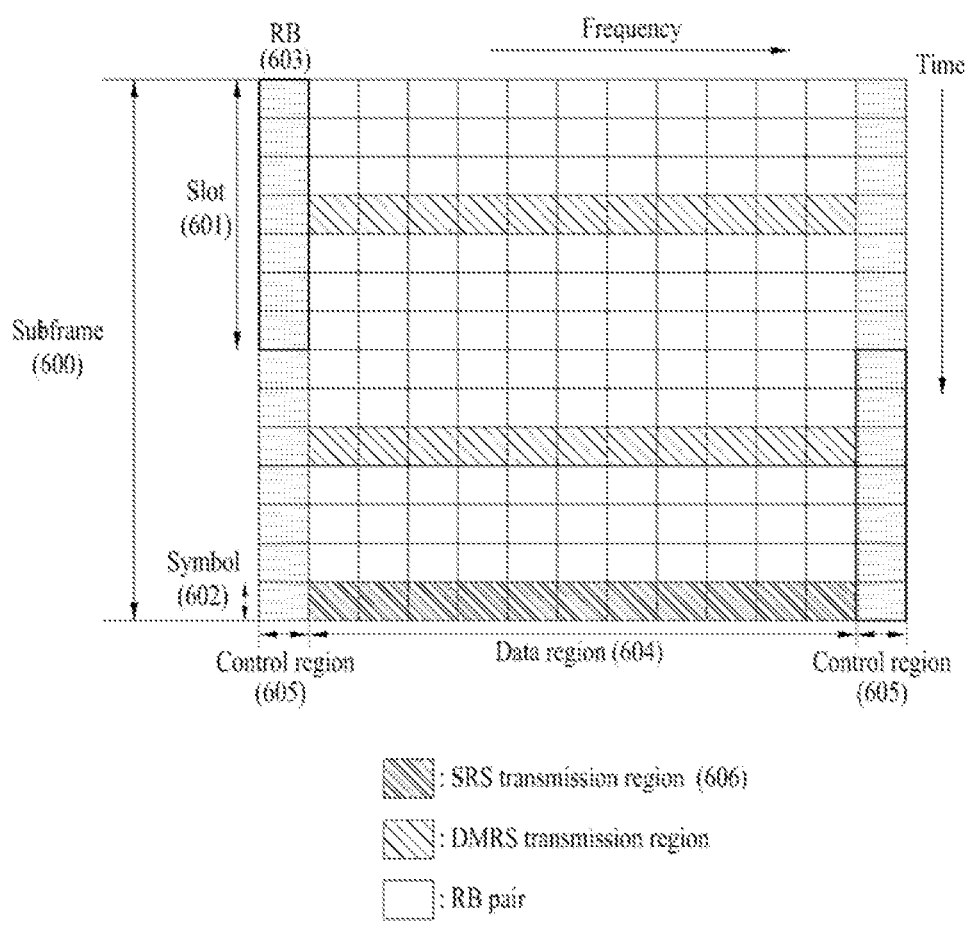
FIG. 6 is a diagram illustrating a downlink (DL) subframe structure in an LTE system to which various embodiments of the present disclosure are applicable.

FIG. 6 is a diagram illustrating a DL subframe structure in an LTE system to which various embodiments of the present disclosure are applicable.

Referring to FIG. 6, up to three (or four) OFDM(A) symbols at the beginning of the first slot of a subframe corresponds to a control region. The remaining OFDM(A) symbols correspond to a data region in which a PDSCH is allocated, and a basic resource unit of the data region is an RB. DL control channels include a physical control format indicator channel (PCFICH), a physical downlink control channel (PDCCH), a physical hybrid-ARQ indicator channel (PHICH), and so on.

The PCFICH is transmitted in the first OFDM symbol of a subframe, conveying information about the number of OFDM symbols (i.e., the size of a control region) used for transmission of control channels in the subframe. The PHICH is a response channel for a UL transmission, conveying a hybrid automatic repeat request (HARQ) acknowledgement (ACK)/negative acknowledgement (NACK) signal. Control information delivered on the PDCCH is called downlink control information (DCI). The DCI includes UL resource allocation information, DL resource control information, or a UL transmit (Tx) power control command for any UE group.

Figure 7:
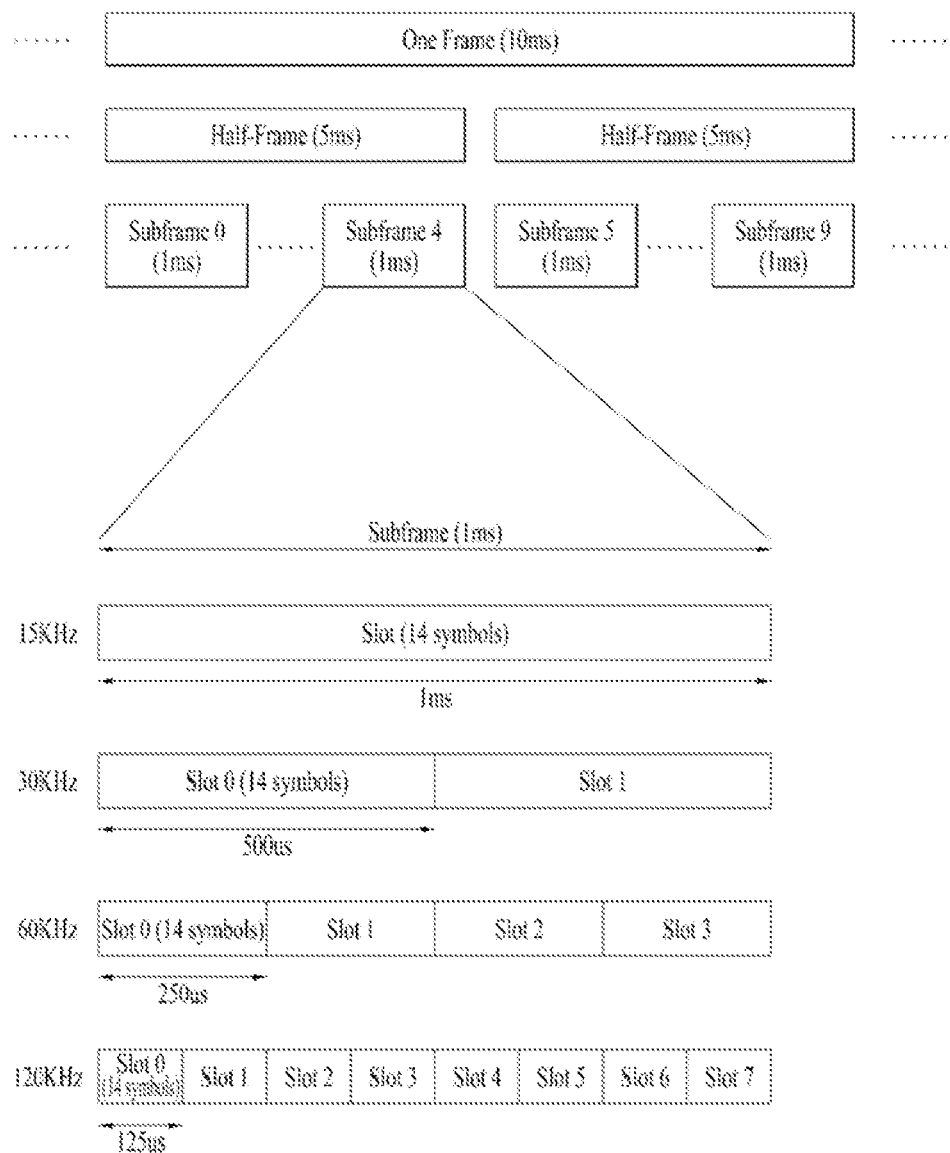
FIG. 7 is a diagram illustrating a radio frame structure in a new radio access technology (NR) system to which various embodiments of the present disclosure are applicable.

FIG. 7 is a diagram illustrating a radio frame structure in an NR system to which various embodiments of the present disclosure are applicable.

The NR system may support multiple numerologies. A numerology may be defined by a subcarrier spacing (SCS) and a cyclic prefix (CP) overhead. Multiple SCSs may be derived by scaling a default SCS by an integer N (or µ). Further, even though it is assumed that a very small SCS is not used in a very high carrier frequency, a numerology to be used may be selected independently of the frequency band of a cell. Further, the NR system may support various frame structures according to multiple numerologies.

Now, a description will be given of OFDM numerologies and frame structures which may be considered for the NR system. Multiple OFDM numerologies supported by the NR system may be defined as listed in Table 4. For a bandwidth part, µ and a CP are obtained from RRC parameters provided by the BS.

TABLE 4

| µ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In NR, multiple numerologies (e.g., SCSs) are supported to support a variety of 5G services. For example, a wide area in cellular bands is supported for an SCS of 15 kHz, a dense-urban area, a lower latency, and a wider carrier bandwidth are supported for an SCS of 30 kHz/60 kHz, and a larger bandwidth than 24.25 GHz is supported for an SCS of 60 kHz or more, to overcome phase noise.

An NR frequency band is defined by two types of frequency ranges, FR1 and FR2. FR1 may be a sub-6 GHz range, and FR2 may be an above-6 GHz range, that is, a millimeter wave (mmWave) band.

Table 5 below defines the NR frequency band, by way of example.

TABLE 5

| Frequency range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, the time-domain sizes of various fields are represented as multiples of a basic time unit for NR, $T_c=1/(\Delta f_{max}*N_f)$ where $\Delta f_{max}=480*10^3$ Hz and a value $N_f$ related to a fast Fourier transform (FFT) size or an inverse fast Fourier transform (IFFT) size is given as $N_f=4096$. $T_c$ and $T_s$ which is an LTE-based time unit and sampling time, given as $T_s=1/((15 kHz)*2048)$ are placed in the following relationship: $T_s/T_c=64$. DL and UL transmissions are organized into (radio) frames each having a duration of $T_f=(\Delta f_{max}*N_f/100)*T_c=10$ ms. Each radio frame includes 10 subframes each having a duration of $T_{sf}=(\Delta f_{max}*N_f/1000)*T_c=1$ ms. There may exist one set of frames for UL and one set of frames for DL. For a numerology μ, slots are numbered with $n^\mu_s \in \{0, \ldots, N^{slot,\mu}_{subframe}-1\}$ in an increasing order in a subframe, and with $n^\mu_{s,f} \in \{0, \ldots, N^{slot,\mu}_{frame}-1\}$ in an increasing order in a radio frame. One slot includes $N^\mu_{symb}$ consecutive OFDM symbols, and $N^\mu_{symb}$ depends on a CP. The start of a slot $n^\mu_s$ in a subframe is aligned in time with the start of an OFDM symbol $n^\mu_s*N^\mu_{symb}$ in the same subframe.

Table 6 lists the number of symbols per slot, the number of slots per frame, and the number of slots per subframe, for each SCS in a normal CP case, and Table 7 lists the number of symbols per slot, the number of slots per frame, and the number of slots per subframe, for each SCS in an extended CP case.

TABLE 6

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 7

| μ | $N^{slot}_{symb}$ | $N^{frame,\mu}_{slot}$ | $N^{subframe,\mu}_{slot}$ |
|---|---|---|---|
| 2 | 12 | 40 | 4 |

In the above tables, $N^{slot}_{symb}$ represents the number of symbols in a slot, $N^{frame,\mu}_{slot}$ represents the number of slots in a frame, and $N^{subframe,\mu}_{slot}$ represents the number of slots in a subframe.

In the NR system to which various embodiments of the present disclosure are applicable, different OFDM(A) numerologies (e.g., SCSs, CP lengths, and so on) may be configured for a plurality of cells which are aggregated for one UE. Accordingly, the (absolute time) period of a time resource including the same number of symbols (e.g., a subframe (SF), a slot, or a TTI) (generically referred to as a time unit (TU), for convenience) may be configured differently for the aggregated cells.

FIG. 7 illustrates an example with μ=2 (i.e., an SCS of 60 kHz), in which referring to Table 6, one subframe may include four slots. One subframe={1, 2, 4} slots in FIG. 7, which is exemplary, and the number of slot(s) which may be included in one subframe is defined as listed in Table 6 or Table 7.

Further, a mini-slot may include 2, 4 or 7 symbols, fewer symbols than 2, or more symbols than 7.

Figure 8:
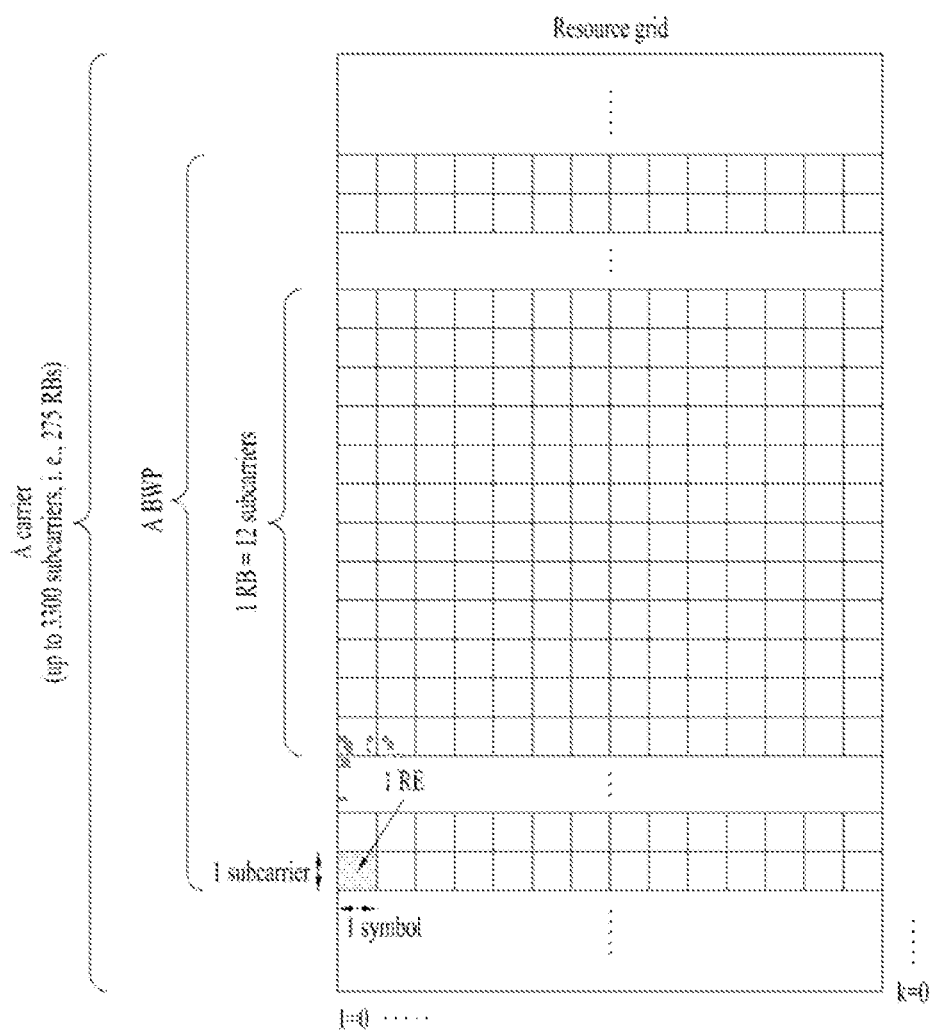
FIG. 8 is a diagram illustrating a slot structure in an NR system to which various embodiments of the present disclosure are applicable.

FIG. 8 is a diagram illustrating a slot structure in an NR system to which various embodiments of the present disclosure are applicable.

Referring FIG. 8, one slot includes a plurality of symbols in the time domain. For example, one slot includes 7 symbols in a normal CP case and 6 symbols in an extended CP case.

A carrier includes a plurality of subcarriers in the frequency domain. An RB is defined by a plurality of (e.g., 12) consecutive subcarriers in the frequency domain.

A bandwidth part (BWP), which is defined by a plurality of consecutive (P)RBs in the frequency domain, may correspond to one numerology (e.g., SCS, CP length, and so on).

A carrier may include up to N (e.g., 5) BWPs. Data communication may be conducted in an activated BWP, and only one BWP may be activated for one UE. In a resource grid, each element is referred to as an RE, to which one complex symbol may be mapped.

Figure 9:
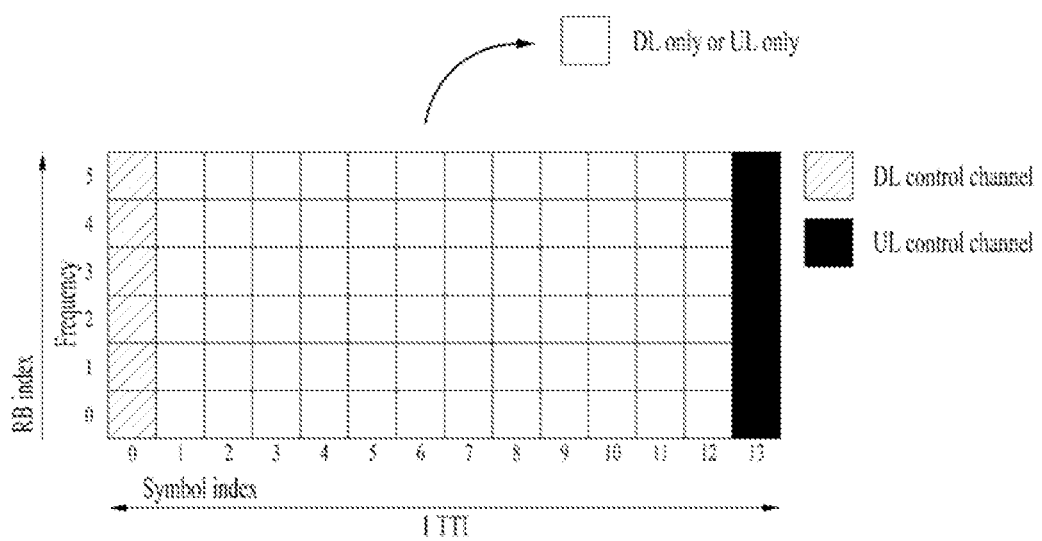
FIG. 9 is a diagram illustrating a self-contained slot structure to which various embodiments of the present disclosure are applicable.

FIG. 9 is a diagram illustrating a self-contained slot structure to which various embodiments of the present disclosure are applicable.

The self-contained slot structure may refer to a slot structure in which all of a DL control channel, DL/UL data, and a UL control channel may be included in one slot.

In FIG. 9, the hatched area (e.g., symbol index=0) indicates a DL control region, and the black area (e.g., symbol index=13) indicates a UL control region. The remaining area (e.g., symbol index=1 to 12) may be used for DL or UL data transmission.

Based on this structure, a BS and a UE may sequentially perform DL transmission and UL transmission in one slot. That is, the BS and UE may transmit and receive not only DL data but also a UL ACK/NACK for the DL data in one slot. Consequently, this structure may reduce a time required until data retransmission when a data transmission error occurs, thereby minimizing the latency of a final data transmission.

In this self-contained slot structure, a predetermined length of time gap is required to allow the BS and the UE to switch from transmission mode to reception mode and vice versa. To this end, in the self-contained slot structure, some OFDM symbols at the time of switching from DL to UL may be configured as a guard period (GP).

Figure 12:
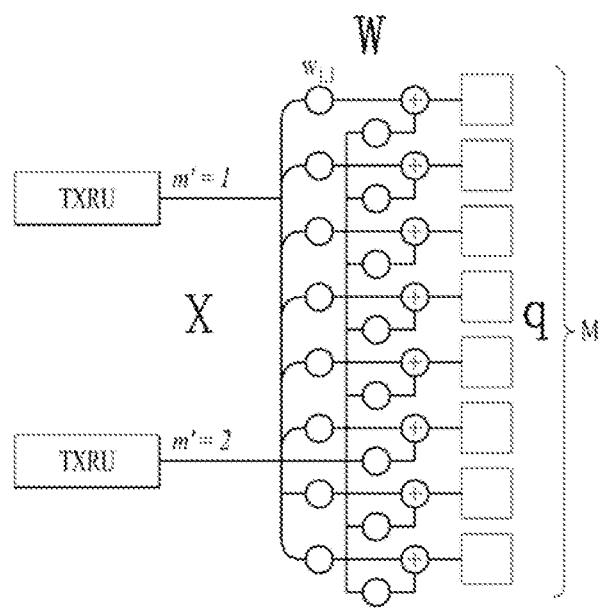
FIG. 12 is a diagram illustrating representative methods of connecting TXRUs to antenna elements according to various embodiments of the present disclosure.

While the self-contained slot structure has been described above as including both of a DL control region and a UL control region, the control regions may selectively be included in the self-contained slot structure. In other words, the self-contained slot structure according to various embodiments of the present disclosure may cover a case of including only the DL control region or the UL control region as well as a case of including both of the DL control region and the UL control region, as illustrated in FIG. 12.

Further, the sequence of the regions included in one slot may vary according to embodiments. For example, one slot may include the DL control region, the DL data region, the UL control region, and the UL data region in this order, or the UL control region, the UL data region, the DL control region, and the DL data region in this order.

A PDCCH may be transmitted in the DL control region, and a PDSCH may be transmitted in the DL data region. A PUCCH may be transmitted in the UL control region, and a PUSCH may be transmitted in the UL data region.

The PDCCH may deliver downlink control information (DCI), for example, DL data scheduling information, UL data scheduling information, and so on. The PUCCH may deliver uplink control information (UCI), for example, an acknowledgement/negative acknowledgement (ACK/NACK) information for DL data, channel state information (CSI), a scheduling request (SR), and so on.

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DM-RS) is mapped to resources, generated as an OFDM symbol signal, and transmitted through a corresponding antenna port.

The PDCCH carries downlink control information (DCI) and is modulated in quadrature phase shift keying (QPSK). One PDCCH includes 1, 2, 4, 8, or 16 control channel elements (CCEs) according to an aggregation level (AL). One CCE includes 6 resource element groups (REGs). One REG is defined by one OFDM symbol by one (P)RB.

Figure 10:
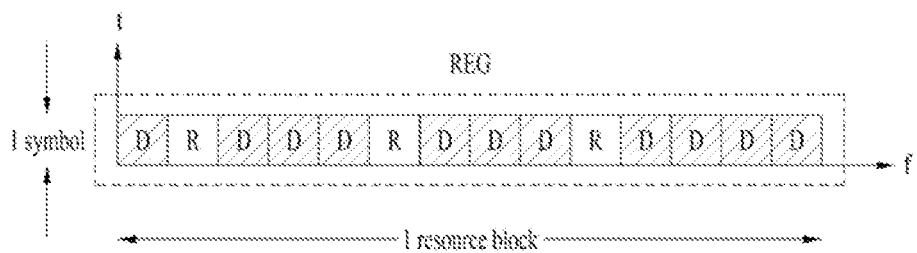
FIG. 10 is a diagram illustrating the structure of one resource element group (REG) in an NR system to which various embodiments of the present disclosure are applicable.

FIG. 10 is a diagram illustrating the structure of one REG to which various embodiments of the present disclosure are applicable.

In FIG. 10, D represents an RE to which DCI is mapped, and R represents an RE to which a DM-RS is mapped. The DM-RS is mapped to REs #1, #5, and #9 along the frequency axis in one symbol The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

The PUSCH delivers UL data (e.g., a UL-shared channel transport block (UL-SCH TB)) and/or UCI, in cyclic prefix-orthogonal frequency division multiplexing (CP-OFDM) waveforms or discrete Fourier transform-spread-orthogonal division multiplexing (DFT-s-OFDM) waveforms. If the PUSCH is transmitted in DFT-s-OFDM waveforms, the UE transmits the PUSCH by applying transform precoding. For example, if transform precoding is impossible (e.g., transform precoding is disabled), the UE may transmit the PUSCH in CP-OFDM waveforms, and if transform precoding is possible (e.g., transform precoding is enabled), the UE may transmit the PUSCH in CP-OFDM waveforms or DFT-s-OFDM waveforms. The PUSCH transmission may be scheduled dynamically by a UL grant in DCI or semi-statically by higher-layer signaling (e.g., RRC signaling) (and/or layer 1 (L1) signaling (e.g., a PDCCH)) (a configured grant). The PUSCH transmission may be performed in a codebook-based or non-codebook-based manner.

The PUCCH delivers UCI, an HARQ-ACK, and/or an SR and is classified as a short PUCCH or a long PUCCH according to the transmission duration of the PUCCH. Table 8 lists exemplary PUCCH formats.

TABLE 8

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in a PUCCH resource for a corresponding SR configuration.

PUCCH format 1 conveys UCI of up to 2 bits and modulation symbols of the UCI are spread with an OCC (which is configured differently whether frequency hopping is performed) in the time domain. The DM-RS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DM-RS. The DM-RS is located in symbols #1, #4, #7, and #10 of a given RB with a density of ⅓. A pseudo noise (PN) sequence is used for a DM-RS sequence. For 1-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DM-RS.

PUCCH format 4 supports multiplexing of up to 4 UEs in the same PRBS, and conveys UCI of more than 2 bits. In other words, PUCCH resources of PUCCH format 3 includes an OCC. Modulation symbols are transmitted in TDM with the DM-RS.

1.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 11:
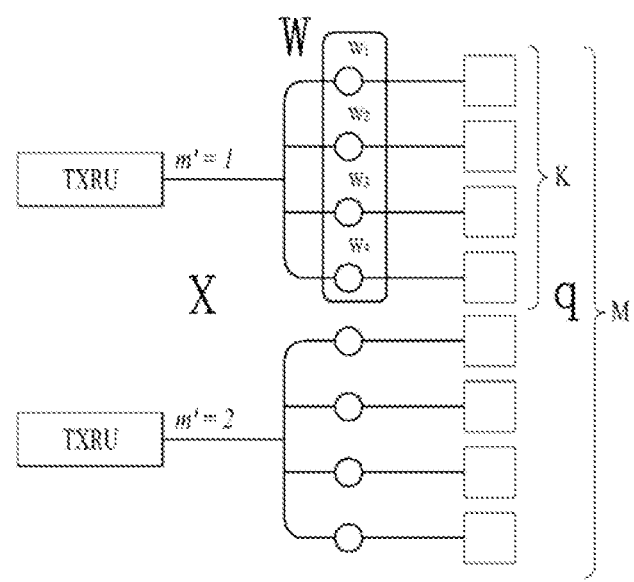
FIG. 11 is a diagram illustrating representative methods of connecting transceiver units (TXRUs) to antenna elements according to various embodiments of the present disclosure.

FIGS. 11 and 12 are diagrams illustrating representative methods for connecting TXRUs to antenna elements according to various embodiments of the present disclosure. Here, the TXRU virtualization model represents the relationship between TXRU output signals and antenna element output signals.

FIG. 11 shows a method for connecting TXRUs to sub-arrays. In FIG. 11, one antenna element is connected to one TXRU according to various embodiments of the present disclosure.

Meanwhile, FIG. 12 shows a method for connecting all TXRUs to all antenna elements. In FIG. 12, all antenna elements are connected to all TXRUs. In this case, separate addition units are required to connect all antenna elements to all TXRUs as shown in FIG. 12.

In FIGS. 11 and 12, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 11 has a disadvantage in that it is difficult to achieve beamforming focusing but has an advantage in that all antennas can be configured at low cost.

On the contrary, the configuration shown in FIG. 12 is advantageous in that beamforming focusing can be easily achieved. However, since all antenna elements are connected to the TXRU, it has a disadvantage of high cost.

When a plurality of antennas is used in the NR system to which the present disclosure is applicable, a hybrid beamforming (BF) scheme in which digital BF and analog BF are combined may be applied. In this case, analog BF (or radio frequency (RF) BF) means an operation of performing precoding (or combining) at an RF stage. In hybrid BF, each of a baseband stage and the RF stage perform precoding (or combining) and, therefore, performance approximating to digital BF can be achieved while reducing the number of RF chains and the number of a digital-to-analog (D/A) (or analog-to-digital (A/D) converters.

For convenience of description, a hybrid BF structure may be represented by N transceiver units (TXRUs) and M physical antennas. In this case, digital BF for L data layers to be transmitted by a transmission end may be represented by an N-by-L matrix. N converted digital signals obtained thereafter are converted into analog signals via the TXRUs and then subjected to analog BF, which is represented by an M-by-N matrix.

Figure 13:
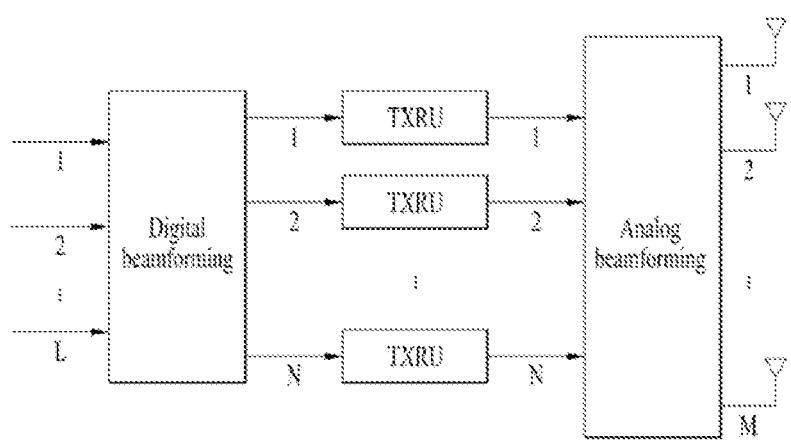
FIG. 13 is a schematic diagram illustrating a hybrid beamforming structure from the perspective of TXRUs and physical antennas according to various embodiments of the present disclosure.

FIG. 13 is a diagram schematically illustrating an exemplary hybrid BF structure from the perspective of TXRUs and physical antennas according to the present disclosure. In FIG. 13, the number of digital beams is L and the number analog beams is N.

Additionally, in the NR system to which the present disclosure is applicable, an BS designs analog BF to be changed in units of symbols to provide more efficient BF support to a UE located in a specific area. Furthermore, as illustrated in FIG. 13, when N specific TXRUs and M RF antennas are defined as one antenna panel, the NR system according to the present disclosure considers introducing a plurality of antenna panels to which independent hybrid BF is applicable.

In the case in which the BS utilizes a plurality of analog beams as described above, the analog beams advantageous for signal reception may differ according to a UE. Therefore, in the NR system to which the present disclosure is applicable, a beam sweeping operation is being considered in which the BS transmits signals (at least synchronization signals, system information, paging, and the like) by applying different analog beams in a specific subframe (SF) or slot on a symbol-by-symbol basis so that all UEs may have reception opportunities.

Figure 14:
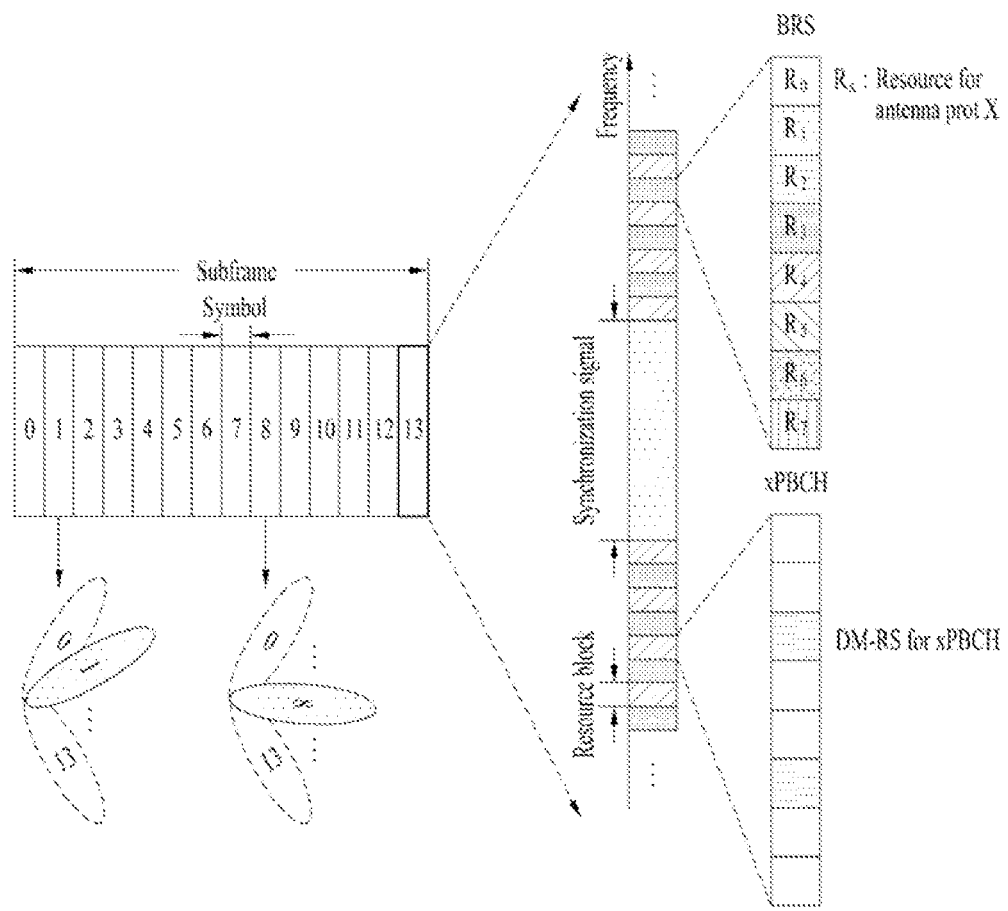
FIG. 14 is a schematic diagram illustrating a beam sweeping operation for a synchronization signal and system information in a downlink transmission procedure according to various embodiments of the present disclosure.

FIG. 14 is a diagram schematically illustrating an exemplary beam sweeping operation for a synchronization signal and system information in a DL transmission procedure according to various embodiments of the present disclosure.

In FIG. 14 below, a physical resource (or physical channel) on which the system information of the NR system to which the present disclosure is applicable is transmitted in a broadcasting manner is referred to as an xPBCH. Here, analog beams belonging to different antenna panels within one symbol may be simultaneously transmitted.

As illustrated in FIG. 14, in order to measure a channel for each analog beam in the NR system to which the present disclosure is applicable, introducing a beam RS (BRS), which is a reference signal (RS) transmitted by applying a single analog beam (corresponding to a specific antenna panel), is being discussed. The BRS may be defined for a plurality of antenna ports and each antenna port of the BRS may correspond to a single analog beam. In this case, unlike the BRS, a synchronization signal or the xPBCH may be transmitted by applying all analog beams in an analog beam group such that any UE may receive the signal well.

1.4. Synchronization Signal Block (SSB) or SS/PBCH Block

In the NR system to which the present disclosure is applicable, a primary synchronization signal (PSS), a secondary synchronization signal (SSS), and/or a physical broadcast signal (PBCH) may be transmitted in one SS block or SS PBCH block (hereinafter, referred to as an SSB or SS/PBCH block). Multiplexing other signals may not be precluded within the SSB.

The SS/PBCH block may be transmitted in a band other than the center of a system band. Particularly, when the BS supports broadband operation, the BS may transmit multiple SS/PBCH blocks.

Figure 15:
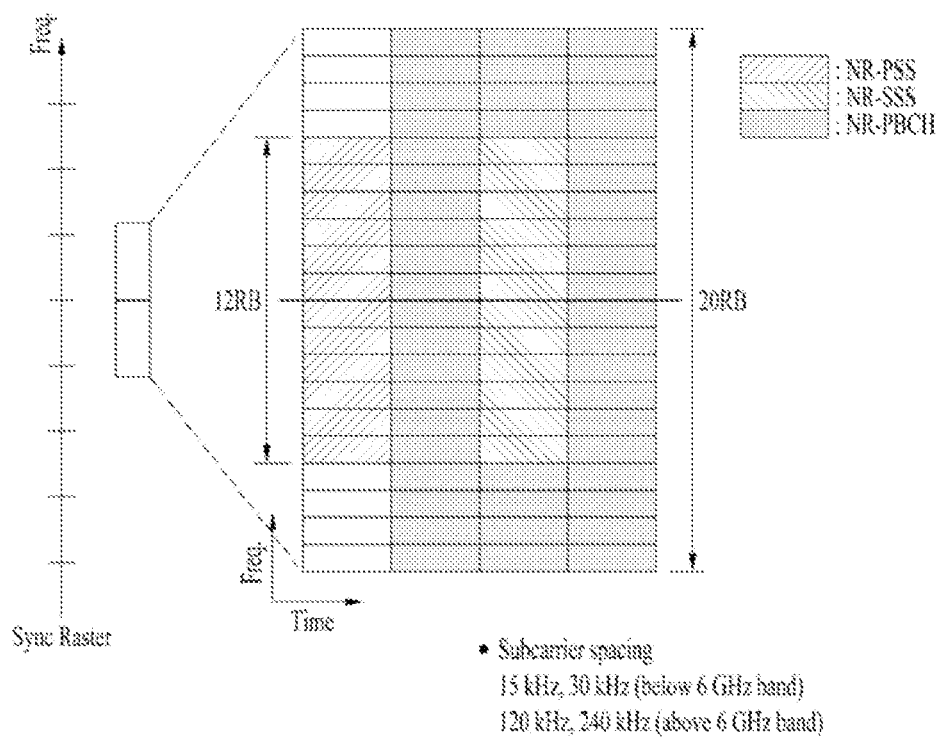
FIG. 15 is a schematic diagram illustrating a synchronization signal/physical broadcast channel (SS/PBCH) block applicable to various embodiments of the present disclosure.

FIG. 15 is a schematic diagram illustrating an SS/PBCH block applicable to the present disclosure.

As illustrated in FIG. 15, the SS/PBCH block applicable to the present disclosure may include 20 RBs in four consecutive OFDM symbols. Further, the SS/PBCH block may include a PSS, an SSS, and a PBCH, and the UE may perform cell search, system information acquisition, beam alignment for initial access, DL measurement, and so on based on the SS/PBCH block.

Each of the PSS and the SSS includes one OFDM symbol by 127 subcarriers, and the PBCH includes three OFDM symbols by 576 subcarriers. Polar coding and QPSK are applied to the PBCH. The PBCH includes data REs and DM-RS REs in every OFDM symbol. There are three DM-RS REs per RB, with three data REs between every two adjacent DM-RS REs.

Further, the SS/PBCH block may be transmitted even in a frequency band other than the center frequency of a frequency band used by the network.

For this purpose, a synchronization raster being candidate frequency positions at which the UE should detect the SS/PBCH block is defined in the NR system to which the present disclosure is applicable. The synchronization raster may be distinguished from a channel raster.

In the absence of explicit signaling of the position of the SS/PBCH block, the synchronization raster may indicate available frequency positions for the SS/PBCH block, at which the UE may acquire system information.

The synchronization raster may be determined based on a global synchronization channel number (GSCN). The GSCN may be transmitted by RRC signaling (e.g., an MIB, a system information block (SIB), remaining minimum system information (RMSI), other system information (OSI), or the like).

The synchronization raster is defined to be longer along the frequency axis than the channel raster and characterized by a smaller number of blind detections than the channel raster, in consideration of the complexity of initial synchronization and a detection speed.

Figure 16:
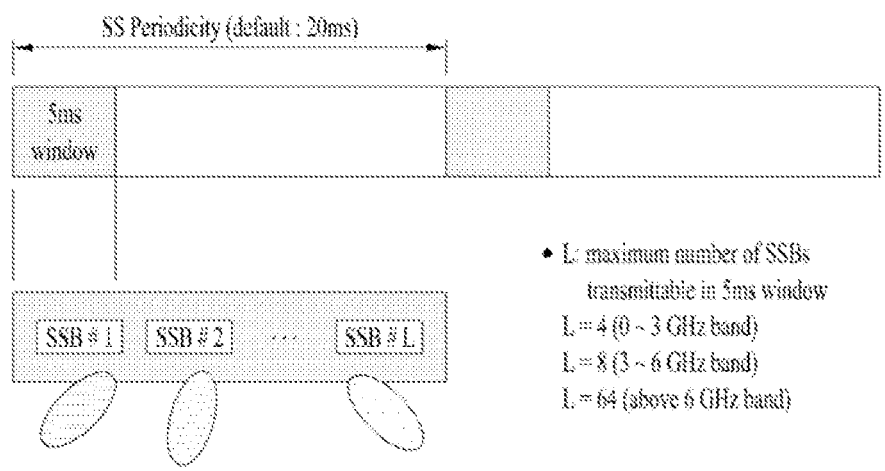
FIG. 16 is a schematic diagram illustrating an SS/PBCH block transmission configuration applicable to various embodiments of the present disclosure.

FIG. 16 is a schematic diagram illustrating an SS/PBCH block transmission structure applicable to the present disclosure.

In the NR system to which the present disclosure is applicable, the BS may transmit an SS/PBCH block up to 64 times for 5 ms. The multiple SS/PBCH blocks may be transmitted on different beams, and the UE may detect the SS/PBCH block on the assumption that the SS/PBCH block is transmitted on a specific one beam every 20 ms.

As the frequency band is higher, the BS may set a larger maximum number of beams available for SS/PBCH block transmission within 5 ms. For example, the BS may transmit the SS/PBCH block by using up to 4 different beams at or below 3 GHz, up to 8 different beams at 3 to 6 GHz, and up to 64 different beams at or above 6 GHz, for 5 ms.

1.5. Synchronization Procedure

The UE may acquire synchronization by receiving the above-described SS/PBCH block from the BS. The synchronization procedure largely includes cell ID detection and timing detection. The cell ID detection may include PSS-based cell ID detection and SSS-based cell ID detection. The timing detection may include PBCH DM-RS-based timing detection and PBCH contents-based (e.g., MIB-based) timing detection.

First, the UE may acquire timing synchronization and the physical cell ID of a detected cell by detecting a PSS and an SSS. More specifically, the UE may acquire the symbol timing of the SS block and detect a cell ID within a cell ID group, by PSS detection. Subsequently, the UE detects the cell ID group by SSS detection.

Further, the UE may detect the time index (e.g., slot boundary) of the SS block by the DM-RS of the PBCH. The UE may then acquire half-frame boundary information and system frame number (SFN) information from an MIB included in the PBCH.

The PBCH may indicate that a related (or corresponding) RMSI PDCCH/PDSCH is transmitted in the same band as or a different band from that of the SS/PBCH block. Accordingly, the UE may then receive RMSI (e.g., system information other than the MIB) in a frequency band indicated by the PBCH or a frequency band carrying the PBCH, after decoding of the PBCH.

In relation to the operation, the UE may acquire system information.

The MIB includes information/parameters required for monitoring a PDCCH that schedules a PDSCH carrying SystemInformationBlock1 (SIB1), and is transmitted to the UE on the PBCH in the SS/PBCH block by the gNB.

The UE may check whether there is a CORESET for a Type0-PDCCH common search space, based on the MIB. The Type0-PDCCH common search space is a kind of PDCCH search space and used to transmit a PDCCH that schedules an SI message.

In the presence of a Type0-PDCCH common search space, the UE may determine (i) a plurality of contiguous RBs included in the CORESET and one or more consecutive symbols and (ii) a PDCCH occasion (e.g., a time-domain position for PDCCH reception), based on information (e.g., pdcch-ConfigSIB1) included in the MIB.

In the absence of a Type0-PDCCH common search space, pdcch-ConfigSIB1 provides information about a frequency position at which the SSB/SIB1 exists and a frequency range in which the SSB/SIB1 does not exist.

SIB1 includes information about the availability and scheduling of the other SIBs (hereinafter, referred to as SIBx where x is 2 or a larger integer). For example, SIB1 may indicate whether SIBx is periodically broadcast or provided in an on-demand manner (or upon request of the UE). When SIBx is provided in the on-demand manner, SIB1 may include information required for an SI request of the UE. SIB1 is transmitted on a PDSCH. A PDCCH that schedules SIB1 is transmitted in a Type0-PDCCH common search space, and SIB1 is transmitted on a PDSCH indicated by the PDCCH.

1.6. Quasi Co-Located or Quasi Co-Location (QCL)

In the present disclosure, QCL may mean one of the following.

(1) If two antenna ports are "quasi co-located (QCL)", the UE may assume that large-scale properties of a signal received from a first antenna port may be inferred from a signal received from the other antenna port. The "large-scale properties" may include one or more of the following.

Delay spread
Doppler spread
Frequency shift
Average received power
Received Timing (2) If two antenna ports are "quasi co-located (QCL)", the UE may assume that large-scale properties of a channel over which a symbol on one antenna port is conveyed may be inferred from a channel over which a symbol on the other antenna port is conveyed). The "large-scale properties" may include one or more of the following.

Delay spread
Doppler spread
Doppler shift
Average gain
Average delay
Average angle (AA): When it is said that QCL is guaranteed between antenna ports in terms of AA, this may imply that when a signal is to be received from other antenna port(s) based on an AA estimated from specific antenna port(s), the same or similar reception beam direction (and/or reception beam width/sweeping degree) may be set and the reception is processed accordingly (in other words, that when operated in this manner, reception performance at or above a certain level is guaranteed).
Angular spread (AS): When it is said that QCL is guaranteed between antenna ports in terms of AS, this may imply that an AS estimated from one antenna port may be derived/estimated/applied from an AS estimated from another antenna port.

Power Angle(-of-Arrival) Profile (PAP): When it is said that QCL is guaranteed between antenna ports in terms of PAP, this may imply that a PAP estimated from one antenna port may be derived/estimated/applied from a PAP estimated from another antenna port (or the PAPs may be treated as similar or identical).

In the present disclosure, both of the concepts defined in (1) and (2) described above may be applied to QCL. Alternatively, the QCL concepts may be modified such that it may be assumed that signals are transmitted from a co-location, for signal transmission from antenna ports for which the QCL assumption is established (e.g., the UE may assume that the antenna ports are transmitted from the same transmission point).

In the present disclosure, partial QCL between two antenna ports may mean that at least one of the foregoing QCL parameters for one antenna port is assumed/applied/used as the same as for the other antenna port (when an associated operation is applied, performance at or above a certain level is guaranteed).

1.7. Bandwidth Part (BWP)

In the NR system to which the present disclosure is applicable, frequency resources of up to 400 MHz per component carrier (CC) may be allocated/supported. When a UE operating in such a wideband CC always operates with a radio frequency (RF) module for the entire CCs turned on, battery consumption of the UE may increase.

Alternatively, considering various use cases (e.g., enhanced mobile broadband (eMBB), ultra-reliable and low latency communication (URLLC), and massive machine type communication (mMTC), and so on) operating within a single wideband CC, a different numerology (e.g., SCS) may be supported for each frequency band within the CC.

Alternatively, the maximum bandwidth capability may be different for each UE.

In consideration of the above situation, the BS may indicate/configure the UE to operate only in a partial bandwidth instead of the entire bandwidth of the wideband CC. The partial bandwidth may be defined as a BWP.

A BWP may include contiguous RBs on the frequency axis, and one BWP may correspond to one numerology (e.g., SCS, CP length, slot/mini-slot duration, and so on).

The BS may configure a plurality of BWPs in one CC configured for the UE. For example, the BS may configure a BWP occupying a relatively small frequency area in a PDCCH monitoring slot, and schedule a PDSCH indicated by the PDCCH (or a PDSCH scheduled by the PDCCH) in a larger BWP. Alternatively, when UEs are concentrated on a specific BWP, the BS may configure another BWP for some of the UEs, for load balancing. Alternatively, the BS may exclude some spectrum of the entire bandwidth and configure both of the BWPs in the same slot in consideration of frequency-domain inter-cell interference cancellation between neighboring cells.

The BS may configure at least one DL/UL BWP for a UE associated with a wideband CC, activate at least one of the configured DL/UL BWP(s) at a specific time (by L1 signaling (e.g., DCI or the like), MAC signaling, or RRC signaling). The activated DL/UL BWP may be referred to as an active DL/UL BWP. Before initial access or RRC connection setup, the UE may not receive a DL/UL BWP configuration from the BS. A DL/UL BWP that the UE assumes in this situation is defined as an initial active DL/UL BWP.

More specifically, according to various embodiments of the present disclosure, the UE may perform the following BWP operation.

A UE, which has been configured to operate BWPs of a serving cell, is configured with up to four DL BWPs within the DL bandwidth of the serving cell by a higher-layer parameter (e.g., DL-BWP or BWP-Downlink) and up to four UL BWPs within the UL bandwidth of the serving cell by a higher-layer parameter (e.g., UL-BWP or BWP-Uplink).

When the UE fails to receive a higher-layer parameter initialDownlinkBWP, an initial active DL BWP may be defined by the positions and number of consecutive PRBs: consecutive PRBs from the lowest index to the highest index among PRBs included in a CORESET for a Type-0 PDCCH CSS set. Further, the initial active DL BWP is defined by an SCS and a CP for PDCCH reception in the CORESET for the Type-0 PDCCH CSS set. Alternatively, the initial active DL BWP is provided by the higher-layer parameter initialDownlinkBWP. For an operation in a primary cell or a secondary cell, an initial active UL BWP is indicated to the UE by a higher-layer parameter initialUplinkBWP. When a supplementary UL carrier is configured for the UE, an initial active UL BWP on the supplementary UL carrier may be indicated to the UE by initialUplinkBW in a higher-layer parameter supplementaryUplink.

When the UE has a dedicated BWP configuration, the UE may be provided with a first active DL BWP for reception by a higher-layer parameter firstActiveDownlinkBWP-Id and a first active UL BWP for transmission on the carrier of the primary cell by a higher-layer parameter firstActiveUplinkGBWP-Id.

For each DL BWP of a DL BWP set or each UL BWP of a UL BWP set, the UE may be provided with the following parameters.

An SCS provided based on a higher-layer parameter (e.g., subcarrierSpacing).

A CP provided based on a higher-layer parameter (e.g., cyclicPrefix).

The number of common RBs and contiguous RBs is provided based on a higher-layer parameter locationAndBandwidth. The higher-layer parameter locationAndBandwidth indicates an offset $RB_{start}$ and a length $L_{RB}$ based on a resource indication value (RIV). It is assumed that $N^{size}_{BWP}$ is 275 and $O_{carrier}$ is provided by offsetToCarrier for the higher-layer parameter subcarrierSpacing.

An index in the set of DL BWPs or the set of UL BWPs, provided based on a higher-layer parameter (e.g., bwp-Id) in UL and DL independently.

A BWP-common set parameter or BWP-dedicated set parameter provided based on a higher-layer parameter (e.g., bwp-Common or bwp-Dedicated).

For an unpaired spectrum operation, a DL BWP in a set of DL BWPs with indexes provided by a higher-layer parameter (e.g., bwp-Id) is linked to a UL BWP in a set of UL BWPs with the same indexes, when the DL BWP index and the UL BWP index are identical. For the unpaired spectrum operation, when the higher-layer parameter bwp-Id of a DL BWP is the same as the higher-layer parameter bwp-Id of a UL BWP, the UE does not expect to receive a configuration in which the center frequency for the DL BWP is different from the center frequency for the UL BWP.

For each DL BWP in a set of DL BWPs of the primary cell (referred to as PCell) or of a PUCCH secondary cell (referred to as PUCCH-SCell), the UE may configure CORESETs for every CSS set and a USS. The UE does not expect to be configured without a CSS on the PCell or the PUCCH-SCell in an active DL BWP.

When the UE is provided with controlResourceSetZero and searchSpaceZero in a higher-layer parameter PDCCH- ConfigSIB1 or a higher-layer parameter PDCCH-Config-Common, the UE determines a CORESET for a search space set based on controlResourcesetZero and determines corresponding PDCCH monitoring occasions. When the active DL BWP is not the initial DL BWP, the UE determines PDCCH monitoring occasions for the search space set, only if the bandwidth of the CORESET is within the active DL BWP and the active DL BWP has the same SCS configuration and CP as the initial DL BWP.

For each UL BWP in a set of UL BWPs of the PCell or the PUCCH-SCell, the UE is configured with resource sets for PUCCH transmissions.

The UE receives a PDCCH and a PDSCH in a DL BWP according to a configured SCS and CP length for the DL BWP. The UE transmits a PUCCH and a PUSCH in a UL BWP according to a configured SCS and CP length for the UL BWP.

When a bandwidth part indicator field is configured in DCI format 1_1, the value of the bandwidth part indicator field indicates an active DL BWP in the configured DL BWP set, for DL receptions. When a bandwidth part indicator field is configured in DCI format 0_1, the value of the bandwidth part indicator field indicates an active UL BWP in the configured UL BWP set, for UL transmissions.

If a bandwidth part indicator field is configured in DCI format 0_1 or DCI format 1_1 and indicates a UL or DL BWP different from the active UL BWP or DL BWP, respectively, the UE may operate as follows.

For each information field in the received DCI format 0_1 or DCI format 1_1,
  if the size of the information field is smaller than a size required for interpretation of DCI format 0_1 or DCI format 1_1 for the UL BWP or DL BWP indicated by the bandwidth part indicator, the UE prepends zeros to the information field until its size is the size required for the interpretation of the information field for the UL BWP or DL BWP before the information field of DCI format 0_1 or DCI format 1_1 is interpreted.
  if the size of the information field is larger than the size required for interpretation of DCI format 0_1 or DCI format 1_1 for the UL BWP or DL BWP indicated by the bandwidth part indicator, the UE uses as many least significant bits (LSBs) of DCI format 0_1 or DCI format 1_1 as the size required for the UL BWP or DL BWP indicated by the bandwidth part indicator before interpreting the information field of DCI format 0_1 or DCI format 1_1.

The UE sets the active UL BWP or DL BWP to the UL BWP or DL BWP indicated by the bandwidth part indicator in DCI format 0_1 or DCI format 1_1.

The UE does not expect to detect DCI format 1_1 or DCI format 0_1 indicating an active DL BWP or active UL BWP change with a time-domain resource assignment field providing a slot offset value smaller than a delay required for the UE for an active DL BWP change or UL BWP change.

When the UE detects DCI format 1_1 indicating an active DL BWP change for a cell, the UE is not required to receive or transmit a signal in the cell during a time period from the end of the third symbol of a slot in which the UE receives a PDCCH including DCI format 1_1 until the beginning of a slot indicated by the slot offset value of the time-domain resource assignment field in DC format 1_1.

If the UE detects DCI format 0_1 indicating an active UL BWP change for a cell, the UE is not required to receive or transmit a signal in the cell during a time period from the end of the third symbol of a slot in which the UE receives a PDCCH including DCI format 0_1 until the beginning of a slot indicated by the slot offset value of the time-domain resource assignment field in DCI format 0_1.

The UE does not expect to detect DCI format 1_1 indicating an active DL BWP change or DCI format 0_1 indicating an active UL BWP change in a slot other than the first slot of a set of slots for the SCS of a cell that overlaps with a time period during which the UE is not required to receive or transmit a signal for an active BWP change in a different cell.

The UE expects to detect DCI format 0_1 indicating an active UL BWP change or DCI format 1_1 indicating an active DL BWP change, only if a corresponding PDCCH is received within the first 3 symbols of a slot.

For the serving cell, the UE may be provided with a higher-layer parameter defaultDownlinkBWP-Id indicating a default DL BWP among the configured DL BWPs. If the UE is not provided with a default DL BWP by defaultDownlinkBWP-Id, the default DL BWP may be set to the initial active DL BWP.

When the UE is provided with a timer value for the PCell by a higher-layer parameter bwp-InactivityTimer and the timer is running, the UE decrements the timer at the end of a subframe for FR1 (below 6 GHz) or at the end of a half subframe for FR2 (above 6 GHz), if a restarting condition is not met during a time period corresponding to the subframe for FR1 or a time period corresponding to the half-subframe for FR2.

For a cell in which the UE changes an active DL BWP due to expiration of a BWP inactivity timer and for accommodating a delay in the active DL BWP change or the active UL BWP change required by the UE, the UE is not required to receive or transmit a signal in the cell during a time period from the beginning of a subframe for FR1 or a half subframe for FR2, immediately after the BWP inactivity timer expires until the beginning of a slot in which the UE may receive or transmit a signal.

When the BWP inactivity timer of the UE for the specific cell expires within the time period during which the UE is not required to receive or transmit a signal for the active UL/DL BWP change in the cell or in a different cell, the UE may delay the active UL/DL BWP change triggered by expiration of the BWP activity timer until the subframe for FR1 or the half-subframe for FR2 immediately after the UE completes the active UL/DL BWP change in the cell or in the different cell.

When the UE is provided with a first active DL BWP by a higher-layer parameter firstActiveDownlinkBWP-Id and a first active UL BWP by a higher-layer parameter firstActiveUplinkBWP-ID on a carrier of the secondary cell, the UE uses the indicated DL BWP and the indicated UL BWP as the respective first active DL BWP and first active UL BWP on the carrier of the secondary cell.

For a paired spectrum operation, when the UE changes an active UL BWP on the PCell during a time period between a detection time of DCI format 1-0 or DC format 1_1 and a transmission time of a corresponding PUCCH including HARQ-ACK information, the UE does not expect to transmit the PUCCH including the HARQ-ACK information in PUCCH resources indicated by DCI format 1_0 or DCI format 1_1.

When the UE performs radio resource management (RRM) measurement for a bandwidth outside the active DL BWP for the UE, the UE does not expect to monitor a PDCCH.

1.8. Slot Configuration

In various embodiments of the present disclosure, a slot format includes one or more DL symbols, one or more UL symbols, and a flexible symbol. In various embodiments of the present disclosure, the corresponding configurations will be described as DL, UL, and flexible symbol(s), respectively, for the convenience of description.

The following may be applied to each serving cell.

When the UE is provided with a higher-layer parameter TDD-UL-DL-ConfigurationCommon, the UE may configure a slot format per slot over a certain number of slots, indicated by the higher-layer parameter TDD-UL-DL-ConfigurationCommon.

The higher-layer parameter TDD-UL-DL-ConfigurationCommon may provide the following.

A reference SCS configuration $\mu_{ref}$ based on a higher-layer parameter referenceSubcarrierSpacing.

A higher-layer parameter pattern1.

The higher-layer parameter pattern1 may provide the following.

A slot configuration periodicity P msec based on a higher-layer parameter dl-UL-TransmissionPeriodicity.

The number $d_{slots}$ of slots including only DL symbols based on a higher-layer parameter nrofDownlinkSlots.

The number $d_{symb}$ of DL symbols based on a higher-layer parameter nrofDownlinkSymbols.

The number $\mu_{slots}$ of slots including only UL symbols based on a higher-layer parameter nrofUplinkSlots.

The number $U_{sym}$ of UL symbols based on a higher-layer parameter nrofUplinkSymbols.

For an SCS configuration $\mu_{ref}=3$, only P=0.625 msec may be valid. For an SCS configuration $\mu_{ref}=2$ or $\mu_{ref}=3$, only P=1.25 msec may be valid. For an SCS configuration $\mu_{ref}=1$, $\mu_{ref}=2$ or $\mu_{ref}=3$, only P=2.5 msec may be valid.

The slot configuration periodicity (P msec) includes S slots given by $S=P\cdot 2^{\mu_{ref}}$ in an SCS configuration $\mu_{ref}$. The first $d_{slots}$ slots of the S slots include only DL symbols, and the last $u_{slots}$ slots of the S slots include only UL symbols. $d_{sym}$ symbols following the first $d_{slots}$ slots are DL symbols. $u_{sym}$ symbols preceding the $u_{slots}$ slots are UL symbols. The remaining $(S-d_{slots}-u_{slots})\cdot N_{symb}^{slot}-d_{sym}-u_{sym}$ symbols are flexible symbols.

The first symbol of every 20/P period is the first symbol of an even-numbered frame.

When the higher-layer parameter TDD-UL-DL-ConfigurationCommon provides higher-layer parameters pattern1 and pattern2, the UE configures a slot format per slot over a first number of slots based on the higher-layer parameter pattern1, and a slot format per slot over a second number of slots based on the higher-layer parameter pattern2.

The higher-layer parameter pattern2 may provide the following.

A slot configuration periodicity $P_2$ msec based on a higher-layer parameter dl-UL-TransmissionPeriodicity.

The number $d_{slots,2}$ of slots including only DL symbols based on a higher-layer parameter nrofDownlinkSlots.

The number $d_{sym,2}$ of DL symbols based on a higher-layer parameter nrofDownlinkSymbols.

The number $u_{slots,2}$ of slots including only UL symbols based on a higher-layer parameter nrofUplinkSlots.

The number $u_{sym,2}$ of UL symbols based on a higher-layer parameter nrofUplinkSymbols.

A $P_2$ value applicable according to an SCS configuration is equal to a P value applicable according to the SCS configuration.

A slot configuration periodicity $P+P_2$ msec includes the first S slots where $S=P\cdot 2^{\mu_{ref}}$ and the second $S_2$ slots where $S_2=P_2\cdot 2^{\mu_{ref}}$.

The first $d_{slots,2}$ ones of the $S_2$ slots include only DL symbols, and the last $u_{slots,2}$ ones of the $S_2$ slots include only UL symbols. $d_{sym,2}$ symbols following the first $d_{slots,2}$ slots are DL symbols. $u_{sym,2}$ symbols preceding the $u_{slots,2}$ slots are UL symbols. The remaining $(S_2-d_{slots,2}-u_{slots,2})\cdot N_{symb}^{slot}-d_{sym,2}-u_{sym,2}$ symbols are flexible symbols.

The UE expects the value of $P+P_2$ to be divided by 20 msec without a remainder. In other words, the UE expects the value of P+P2 to be an integer multiple of 20 msec.

The first symbol of every $20/(P+P_2)$ period is the first symbol of an even-numbered frame.

The UE expects that the reference SCS configuration $\mu_{ref}$ is smaller than or equal to an SCS configuration $\mu$ for any configured DL BWP or UL BWP. Each slot (configuration) provided by the higher-layer parameter pattern1 or pattern2 is applicable to $2^{(\mu-\mu_{ref})}$ consecutive slots in the active DL BWP or active UL BWP in the first slot which starts at the same time as the first slot for the reference SCS configuration $\mu_{ref}$. Each DL, flexible, or UL symbol for the reference SCS configuration $\mu_{ref}$ corresponds to $2^{(\mu-\mu_{ref})}$ consecutive DL, flexible, or UL symbols for the SCS configuration $\mu$.

When the UE is additionally provided with a higher-layer parameter Tdd-UL-DL-ConfigurationDedicated, the higher-layer parameter Tdd-UL-DL-ConfigurationDedicated overrides only flexible symbols per slot over the number of slots as provided by the higher-layer parameter Tdd-UL-DL-ConfigurationCommon.

The higher-layer parameter Tdd-UL-DL-ConfigurationDedicated may provide the following.

A set of slot configurations based on a higher-layer parameter slotSpecificConfigurationsToAddModList.

Each slot configuration in the set of slot configurations.

A slot index based on a higher-layer parameter slotIndex.

A set of symbols based on a higher-layer parameter symbols.

If the higher-layer parameter symbols=allDownlink, all symbols in the slot are DL symbols.

If the higher-layer parameter symbols=allUplink, all symbols in the slot are UL symbols.

If the higher-layer parameter symbols=explicit, the higher-layer parameter nrofDownlinkSymbols provides the number of first DL symbols in the slot, and the higher-layer parameter nrofUplinkSymbols provides the number of last UL symbols in the slot. If the higher-layer parameter nrofDownlinkSymbols is not provided, this implies that there are no first DL symbols in the slot. If the higher-layer parameter nrofUplinkSymbols is not provided, this implies that there are no last UL symbols in the slot. The remaining symbols in the slot are flexible symbols.

For each slot having an index provided by a higher-layer parameter slotIndex, the UE applies a (slot) format provided by a corresponding symbols. The UE does not expect the higher-layer parameter TDD-UL-DL-ConfigurationDedicated to indicate, as UL or DL, a symbol that the higher-layer parameter TDD-UL-DL-ConfigurationCommon indicates as DL or UL.

For each slot configuration provided by the higher-layer parameter TDD-UL-DL-ConfigurationDedicated, a reference SCS configuration is the reference SCS configuration $\mu_{ref}$ provided by the higher-layer parameter TDD-UL-DL-ConfigurationCommon.

A slot configuration periodicity and the number of DL/UL/flexible symbols in each slot of the slot configuration periodicity is determined based on the higher-layer parameters TDD-UL-DL-ConfigurationCommon and TDD-UL-DL-ConfigurationDedicated, and the information is common to each configured BWP.

The UE considers symbols in a slot indicated as DL by the higher-layer parameter TDD-UL-DL-ConfigurationCommon or TDD-UL-DL-ConfigurationDedicated to be available for signal reception. Further, the UE considers symbols in a slot indicated as UL by the higher-layer parameter TDD-UL-DL-ConfigurationCommon or TDD-UL-DL-ConfigurationDedicated to be available for signal transmission.

If the UE is not configured to monitor a PDCCH for DCI format 2_0, for a set of symbols of a slot that are indicated as flexible by the higher-layer parameter TDD-UL-DL-ConfigurationCommon or TDD-UL-DL-ConfigurationDedicated, or when the higher-layer parameters TDD-UL-DL-ConfigurationCommon and TDD-UL-DL-ConfigurationDedicated are not provided to the UE, the UE may operate as follows.

The UE may receive a PDSCH or a CSI-RS in the set of symbols of the slot, when the UE receives a corresponding indication by DCI format 1_0, DCI format 1_1, or DCI format 0_1.

The UE may transmit a PUSCH, a PUCCH, a PRACH, or an SRS in the set of symbols of the slot, if the UE receives a corresponding indication by DCI format 0_0, DCI format 0_1, DCI format 1_0, DCI format 1_1, or DCI format 2_3.

It is assumed that the UE is configured by the higher layer to receive a PDCCH, a PDSCH, or a CSI-RS in a set of symbols of a slot. When the UE does not detect DCI format 0_0, DCI format 0_1, DCI format 1_0, DCI format 1_1, or DCI format 2_3 that indicates to the UE to transmit a PUSCH, a PUCCH, a PRACH, or an SRS in at least one symbol of the set of symbols of the slot, the UE may receive the PDCCH, the PDSCH, or the CSI-RS. Otherwise, that is, when the UE detects DCI format 0_0, DCI format 0_1, DCI format 1_0, DCI format 1_1, or DCI format 2_3 that indicates to the UE to transmit a PUSCH, a PUCCH, a PRACH, or an SRS in at least one symbol of the set of symbols of the slot, the UE does not receive the PDCCH, the PDSCH, or the CSI-RS in the set of symbols of the slot.

When the UE is configured by the higher layer to transmit an SRS, a PUCCH, a PUSCH, or a PRACH in a set of symbols of a slot and detects DCI format 1_0, DCI format 1_1, or DCI format 0_1 indicating to the UE to receive a CSI-RS or a PDSCH in a subset of symbols from the set of symbols, the UE operates as follows.

The UE does not expect to cancel signal transmission in a subset of symbols that occur after fewer symbols than a PUSCH preparation time $T_{proc,2}$ for a corresponding UE processing capability on the assumption that $d_{2,1}=1$, relative to the last symbol of a CORESET in which the UE detects DCI format 1_0, DCI format 1_1, or DCI format 0_1.

The UE cancels the PUCCH, PUSCH, or PRACH transmission in the remaining symbols of the set of symbols, and cancels the SRS transmission in the remaining symbols of the set of symbols.

For a set of symbols of a slot that are indicated as UL by the higher-layer parameter TDD-UL-DL-ConfigurationCommon or TDD-UL-DL-ConfigurationDedicated, the UE does not receive a PDCCH, a PDSCH, or a CSI-RS in the set of symbols of the slot.

For a set of symbols of a slot that are indicated as DL by the higher-layer parameter TDD-UL-DL-ConfigurationCommon or TDD-UL-DL-ConfigurationDedicated, the UE does not transmit a PUSCH, a PUCCH, a PRACH, or an SRS in the set of symbols of the slot.

For a set of symbols of a slot that are indicated as flexible by the higher-layer parameter TDD-UL-DL-ConfigurationCommon or TDD-UL-DL-ConfigurationDedicated, the UE does not expect to receive a dedicated configuration for transmission from the UE and a dedicated configuration for reception at the UE in the set of symbols of the slot.

For a set of symbols of a slot indicated by a higher-layer parameter ssb-PositionsInBurst in a higher-layer parameter SystemInformationBlockType1 or ServingCellConfigCommon, for reception of SS/PBCH blocks, the UE does not transmit a PUSCH, a PUCCH, or a PRACH in the slot if a transmission overlaps with any symbol of the set of symbols, and the UE does not transmit an SRS in the set of symbols of the slot. When the higher-layer parameter TDD-UL-DL-ConfigurationCommon or TDD-UL-DL-ConfigDedicated is provided to the UE, the UE does not expect the set of symbols of the slot to be indicated as UL by the higher-layer parameter.

For a set of symbols of a slot corresponding to a valid PRACH occasion, and $N_{gap}$ symbols before the valid PRACH occasion, when a signal reception overlaps with any symbol of the set of symbols in the slot, the UE does not receive a PDCCH, a PDSCH, or a CSI-RS for a Type1-PDCCH CSS set. The UE does not expect the set of symbols of the slot to be indicated as DL by the higher-layer parameter TDD-UL-DL-ConfigurationCommon or TDD-UL-DL-ConfigDedicated.

For a set of symbols of a slot indicated by a higher-layer parameter pdcch-ConfigSIB1 in an MIB for a CORESET for a Type0-PDCCH CSS set, the UE does not expect the set of symbols to be indicated as UL by the higher-layer parameter TDD-UL-DL-ConfigurationCommon or TDD-UL-DL-ConfigDedicated.

When the UE is scheduled by DCI format 1_1 to receive a PDSCH over multiple slots, and the higher-layer parameter TDD-UL-DL-ConfigurationCommon or TDD-UL-DL-ConfigDedicated indicates that, for one of the multiple slots, at least one symbol in a set of symbols in which the UE is scheduled to receive a PDSCH in the slot is a UL symbol, the UE does not receive the PDSCH in the slot.

When the UE is scheduled by DCI format 0_1 to transmit a PUSCH over multiple slots, and the higher-layer parameter TDD-UL-DL-ConfigurationCommon or TDD-UL-DL-ConfigDedicated indicates that, for one of the multiple slots, at least one symbol in a set of symbols in which the UE is scheduled to receive a PDSCH in the slot is a DL symbol, the UE does not transmit the PUSCH in the slot.

A detailed description will be given below of a UE operation for determining a slot format. The UE operation may apply for a serving cell included in a set of serving cells configured for a UE by higher-layer parameters slotFormatCombToAddModList and slotFormatCombToReleaseList.

If the UE is configured with a higher-layer parameter SlotFormatIndicator, the UE is provided with an SFI-RNTI by a higher-layer parameter sfi-RNTI and with a payload size of DCI format 2_0 by a higher-layer parameter dci-PayloadSize.

For one or more serving cells, the UE is also provided with a configuration for a search space set S and a corresponding CORESET P. The search space set S and the corresponding CORESET P may be provided for monitoring $M_{p,s}^{(L_{SFI})}$ PDCCH candidates for DCI format 2_0 with a CCE aggregation level including $L_{SFI}$ CCEs.

The $M_{p,s}^{(L_{SFI})}$ PDCCH candidates are the first $M_{p,s}^{(L_{SFI})}$ PDCCH candidates for the CCE aggregation level $L_{SFI}$ for the search space set S in the CORESET P.

For each serving cell in the set of serving cells, the UE may be provided with:
- an ID of the serving cell based on a higher-layer parameter servingCellId.
- a location of an SFI-index field in DCI format 2_0 based on a higher-layer parameter positionInDCI.
- a set of slot format combinations based on a higher-layer parameter slotFormatCombinations, where each slot format combination in the set of slot format combinations includes
  - one or more slot formats based on a higher-layer parameter slotFormats for the slot format combination, and
  - mapping for the slot format combination provided by the higher-layer parameter slotFormats to a corresponding SFI-index field value in DCI format 2_0 provided by a higher-layer parameter slotFormatCombinationId.
- for an unpaired spectrum operation, a reference SCS configuration $\mu_{SFI}$ based on a higher-layer parameter subcarrierSpacing. When a supplementary UL carrier is configured for the serving cell, a reference SCS configuration $\mu_{SFI,SUL}$ based on a higher-layer parameter subcarrierSpacing2 for the supplementary UL carrier.
- for a paired spectrum operation, a reference SCS configuration $\mu SFI,DL$ for a DL BWP based on the higher-layer parameter subcarrierSpacing and a reference SCS configuration $\mu_{SFI,UL}$ for an UL BWP based on the higher-layer parameter subcarrierSpacing2.

An SFI-index field value in DCI format 2_0 indicates to the UE a slot format for each slot in a number of slots for each DL BWP or each UL BWP starting from a slot in which the UE detects DCI format 2_0. The number of slots is equal to or larger than a PDCCH monitoring periodicity for DCI format 2_0. The SFI-index field includes max $\{\lceil \log_2(\text{maxSFIindex}+1)\rceil, 1\}$ bits where maxSFIindex is the maximum of the values provided by the corresponding higher-layer parameter slotFormatCombinationId. A slot format is identified by a corresponding format index as provided in Table 11 to Table 14. In Table 9 to Table 12, 'D' denotes a DL symbol, 'U' denotes a UL symbol, and 'F' denotes a flexible symbol. In Table 9 to Table 12, 'D' denotes a DL symbol, 'U' denotes a UL symbol, and 'F' denotes a flexible symbol.

TABLE 9

| For-mat | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |

TABLE 10

| 15 | F | F | F | F | F | F | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |

TABLE 11

| 33 | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 33 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | U | U | U | U | U | U | U |

TABLE 12

| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56-254 | Reserved | | | | | | | | | | | | | |
| 255 | UE determines the slot format for the slot based on TDD-UL-DL-ConfigurationCommon. or TDD-UL-DL-ConfigDedicated and, if any, on detected DCI formats | | | | | | | | | | | | | |

If a PDCCH monitoring periodicity for DCI format 2_0, provided to the UE for the search space set S by a higher-layer parameter monitoringSlotPeriodicityAndOffset, is smaller than the duration of a slot format combination that the UE obtains in a PDCCH monitoring occasion for DCI format 2_0 by a corresponding SFI-index field value, and the UE detects more than one DCI format 2_0 indicating a slot format for a slot, the UE expects each of the more than one DCI format 2_0 to indicate the same (slot) format for the slot.

The UE does not expect to be configured to monitor a PDCCH for DCI format 2_0 on a second serving cell that uses a larger SCS than the serving cell.

For an unpaired spectrum operation of the UE on a serving cell, the UE is provided, by a higher-layer parameter subcarrierSpacing, with a reference SCS configuration $\mu_{SFI}$ for each slot format in a combination of slot formats indicated by an SFI-index field value in DCI format 2_0. The UE expects that for a reference SCS configuration $\mu_{SFI}$ and for an SCS configuration $\mu$ for an active DL BWP or an active UL BWP, $\mu \geq \mu_{SFI}$. Each slot format in the combination of slot formats indicated by the SFI-index field value in DCI format 2_0 is applicable to $2^{(\mu-\mu_{SFI})}$ consecutive slots in the active DL BWP or the active UL BWP in which the first slot starts at the same time as the first slot for the reference SCS configuration $\mu_{SFI}$. Each DL or flexible or UL symbol for the reference SCS configuration $\mu_{SFI}$ corresponds to $2^{(\mu-\mu_{SFI})}$ consecutive DL or flexible or UL symbols for the SCS configuration $\mu$.

For a paired spectrum operation of the UE on a serving cell, the SFI-index field in DCI format 2_0 includes a combination of slot formats for a reference DL BWP and a combination of slot formats for a reference UL BWP of the serving cell. The UE is provided with a reference SCS configuration $\mu_{SFI}$ for each slot format in the combination of slot formats indicated by the value. For the reference SCS configuration $\mu_{SFI}$ and an SCS configuration $\mu$ for the active DL BWP or the active UL BWP, the UE expects that $\mu \geq \mu_{SFI}$. The UE is provided, by a higher-layer parameter subcarrierSpacing, with a reference SCS configuration $\mu_{SFI,DL}$ for the combination of slot formats indicated by the SFI-index field value in DCI format 2_0 for the reference DL BWP of the serving cell. The UE is provided, by a higher-layer parameter subcarrierSpacing2, with a reference SCS configuration $\mu_{SFI,UL}$ for the combination of slot formats indicated by the SFI-index field value in DCI format 2_0 for the reference UL BWP of the serving cell. If $\mu_{SFI,DL} \geq \mu_{SFI,UL}$, for each $2^{(\mu_{SFI,DL}-\mu_{SFI,UL})}+1$ value provided by a value of the higher-layer parameter slotFormats, the value of the higher-layer parameter slotFormats is determined based on a value of the higher-layer parameter slotFormatCombinationId in the higher-layer parameter slotFormatCombination, the value of the higher-layer parameter slotFormatCombinationId is set based on the value of the SFI-index field value in DCI format 2_0, the first $2^{(\mu_{SFI,DL}-\mu_{SFI,UL})}$ values for the combination of slot formats are applicable to the reference DL BWP, and the next value is applicable to the reference UL BWP. If $\mu_{SFI,DL} < \mu_{SFI,UL}$, for each $2^{(\mu_{SFI,UL}-\mu_{SFI,DL})}+1$ value provided by the higher-layer parameter slotFormats, the first value for the combination of slot formats is applicable to the reference DL BWP and the next $2^{(\mu_{SFI,UL}-\mu_{SFI,DL})}$ values are applicable to the reference UL BWP.

For a set of symbols of a slot, the UE does not expect to detect DCI format 2_0 with an SFI-index field value indicating the set of symbols in the slot as UL and to detect DCI format 1_0, DCI format 1_1, or DCI format 0_1 indicating to the UE to receive a PDSCH or a CSI-RS in the set of symbols of the slot.

For a set of symbols of a slot, the UE does not expect to detect DCI format 2_0 with an SFI-index field value indicating the set of symbols in the slot as DL and to detect DCI format 1_0, DCI format 0_1, DCI format 1_0, DCI format 1_1, DCI format 2_3, or an RAR UL grant indicating to the UE to transmit a PUSCH, a PUCCH, a PRACH, or an SRS in the set of symbols of the slot.

For a set of symbols of a slot that are indicated as DL/UL by the higher-layer parameter TDD-UL-DL-ConfigurationCommon, or TDDUL-DL-ConfigDedicated, the UE does not expect to detect DCI format 2_0 with an SFI-index field value indicating the set of symbols of the slot as UL/DL, respectively, or as flexible.

For a set of symbols of a slot indicated to the UE by the higher-layer parameter ssb-PositionsInBurst in a higher-layer parameter SystemInformationBlockType1 or ServingCellConfigCommon for reception of SS/PBCH blocks, the UE does not expect to detect DCI format 2_0 with an SFI-index field value indicating the set of symbols of the slot as UL.

For a set of symbols of a slot indicated to the UE by a higher-layer parameter prach-ConfigurationIndex in a higher-layer parameter RACH-ConfigCommon for PRACH transmissions, the UE does not expect to detect DCI format 2_0 with an SFI-index field value indicating the set of symbols of the slot as DL.

For a set of symbols of a slot indicated to the UE by a higher-layer parameter pdcch-ConfigSIB1 in MIB for a CORESET for a Type0-PDCCH CSS set, the UE does not expect to detect DCI format 2_0 with an SFI-index field value indicating the set of symbols of the slot as UL.

For a set of symbols of a slot indicated to the UE as flexible by the higher-layer parameter TDD-UL-DL-ConfigurationCommon and the higher-layer parameter TDD-UL-DLConfigDedicated, or when the higher-layer parameter TDD-UL-DL-ConfigurationCommon and the higher-layer parameter TDD-UL-DL-ConfigDedicated are not provided to the UE, if the UE detects DCI format 2_0 providing a slot format corresponding to a slot format value other than 255,

- if one or more symbols in the set of symbols are symbols in a CORESET configured for the UE for PDCCH monitoring, the UE receives a PDCCH in the CORESET only if an SFI-index field value in DCI format 2_0 indicates that the one or more symbols are DL symbols.
- if the SFI-index field value in DCI format 2_0 indicates the set of symbols of the slot as flexible and the UE detects DCI format 1_0, DCI format 1_1, or DCI format 0_1 indicating to the UE to receive a PDSCH or a CSI-RS in the set of symbols of the slot, the UE receives a PDSCH or a CSI-RS in the set of symbols of the slot.
- if the SFI-index field value in DCI format 2_0 indicates the set of symbols of the slot as flexible and the UE detects DCI format 0_0, DCI format 0_1, DCI format 1_0, DCI format 1_1, DCI format 2_3, or an RAR UL grant indicating to the UE to transmit a PUSCH, a PUCCH, a PRACH, or an SRS in the set of symbols of the slot, the UE transmits the PUSCH, PUCCH, PRACH, or SRS in the set of symbols of the slot.
- if the SFI-index field value in DCI format 2_0 indicates the set of symbols of the slot as flexible, and the UE does not detect DCI format 1_0, DCI format 1_1, or DCI format 0_1 indicating to the UE to receive a PDSCH or a CSI-RS, or the UE does not detect DCI format 0_0, DCI format 0_1, DCI format 1_0, DCI format 1_1, DCI format 2_3, or an RAR UL grant indicating to the UE to transmit a PUSCH, a PUCCH, a PRACH, or an SRS in the set of symbols of the slot, the UE does not transmit or receive a signal in the set of symbols of the slot.
- if the UE is configured by the higher layer to receive a PDSCH or a CSI-RS in the set of symbols of the slot, the UE receives the PDSCH or the CSI-RS in the set of symbols of the slot, only if the SFI-index field value in DCI format 2_0 indicates the set of symbols of the slot as DL.
- if the UE is configured by the higher layer to transmit a PUCCH, a PUSCH, or a PRACH in the set of symbols of the slot, the UE transmits the PUCCH, the PUSCH, or the PRACH in the slot only if the SFI-index field value in DCI format 2_0 indicates the set of symbols of the slot as UL.

if the UE is configured by the higher layer to transmit an SRS in the set of symbols of the slot, the UE transmits the SRS only in a subset of symbols from the set of symbols of the slot indicated as UL symbols by the SFI-index field value in DCI format 2_0.

the UE does not expect to detect an SFI-index field value in DCI format 2_0 indicating the set of symbols of the slot as DL and also detect DCI format 0_0, DCI format 0_1, DCI format 1_0, DCI format 1_1, DCI format 2_3, or an RAR UL grant indicating to the UE to transmit an SRS, a PUSCH, a PUCCH, or a PRACH, in one or more symbols from the set of symbols of the slot.

the UE does not expect to detect an SFI-index field value in DCI format 2_0 indicating the set of symbols of the slot as DL or flexible, if the set of symbols of the slot includes symbols corresponding to any repetition of a PUSCH transmission activated by a UL Type 2 grant PDCCH.

the UE does not expect to detect an SFI-index field value in DCI format 2_0 indicating the set of symbols of the slot as UL and also detect DCI format 1_0 or DCI format 1_1 or DCI format 0_1 indicating to the UE to receive a PDSCH or a CSI-RS in one or more symbols from the set of symbols of the slot.

If the UE is configured by the higher layer to receive a CSI-RS or a PDSCH in a set of symbols of a slot and detects DCI format 2_0 indicating a subset of symbols from the set of symbols as UL or flexible or DCI format 0_0, DCI format 0_1, DCI format 1_0, DCI format 1_1, or DCI format 2_3 indicating to the UE to transmit a PUSCH, a PUCCH, an SRS, or a PRACH in at least one symbol in the set of the symbols, the UE cancels the CSI-RS reception or the PDSCH reception in the slot.

If the UE is configured by the higher layer to transmit an SRS, a PUCCH, or a PUSCH, or a PRACH in a set of symbols of a slot and detects DCI format 2_0 with a slot format value indicating a subset of symbols from the set of symbols as DL or flexible, or DCI format 1_0, DCI format 1_1, or DCI format 0_1 indicating to the UE to receive a CSI-RS or a PDSCH in at least one symbol in the set of symbols, then the UE does not expect to cancel the signal transmission in the subset of symbols that occur, relative to a last symbol of a CORESET in which the UE detects DCI format 2_0, DCI format 1_0, DCI format 1_1, or DCI format 0_1, after fewer symbols than a PUSCH preparation time $T_{proc,2}$ for the corresponding PUSCH processing capability.

the UE cancels the PUCCH, or PUSCH, or PRACH transmission in the remaining symbols in the set of symbols and cancels the SRS transmission in the remaining symbols in the set of symbols.

If the UE does not detect DCI format 2_0 indicating the set of symbols of the slot as flexible or UL or DCI format 0_0, DCI format 0_1, DCI format 1_0, DCI format 1_1, or DCI format 2_3 indicating to the UE to transmit an SRS, a PUSCH, a PUCCH, or a PRACH in the set of symbols, the UE assumes that flexible symbols in a CORESET configured for the UE for PDCCH monitoring are DL symbols.

For a set of symbols of a slot that are indicated as flexible by the higher-layer parameters TDD-UL-DL-ConfigurationCommon and TDD-UL-DL-ConfigDedicated, or when the higher-layer parameters TDD-UL-DL-ConfigurationCommon, and TDD-UL-DL-ConfigDedicated are not provided to the UE, if the UE does not detect DCI format 2_0 providing a slot format for the slot, the UE receives a PDSCH or a CSI-RS in the set of symbols of the slot, if the UE receives a corresponding indication by DCI format 1_0, DCI format 1_1, or DCI format 0_1.

the UE transmits a PUSCH, a PUCCH, a PRACH, or an SRS in the set of symbols of the slot, if the UE receives a corresponding indication by DCI format 0_0, DCI format 0_1, DCI format 1_0, DCI format 1_1, or DCI format 2_3.

the UE may receive a PDCCH.

if the UE is configured by the higher layer to receive a PDSCH or a CSI-RS in the set of symbols of the slot, the UE does not receive the PDSCH or the CSI-RS in the set of symbols of the slot.

if the UE is configured by the higher layer to transmit an SRS, a PUCCH, a PUSCH, or a PRACH in the set of symbols of the slot, the UE does not transmit the PUCCH, the PUSCH, or the PRACH in the slot and does not transmit the SRS in symbols from the set of symbols in the slot, if any, starting from a symbol that is a number of symbols equal to the PUSCH preparation time N2 for the corresponding PUSCH timing capability after a last symbol of a CORESET where the UE is configured to monitor PDCCH for DCI format 2_0.

The UE does not expect to cancel the transmission of the SRS, or the PUCCH, or the PUSCH, or the PRACH in symbols from the set of symbols in the slot, if any, starting before a symbol that is a number of symbols equal to the PUSCH preparation time $N_2$ for the corresponding PUSCH timing capability after a last symbol of a CORESET where the UE is configured to monitor a PDCCH for DCI format 2_0.

1.9. RRM Measurement

While radio resource management (RRM) measurement is described below in the context of the LTE system, those skilled in the art could easily understand that the RRM measurement may be extended to the next-generation system (e.g., NR).

The LTE system supports RRM operations including power control, scheduling, cell search, cell reselection, handover, radio link or connection monitoring, and connection establishment/re-establishment. A serving cell may request RRM measurement information required for an RRM operation to a UE. In the LTE system, the UE may measure and report mainly information such as cell search information, reference signal received power (RSRP), and reference signal received quality (RSRQ). Specifically in the LTE system, the UE may receive 'measConfig' in a higher-layer signal for RRM measurement from the serving cell and measure RSRP or RSRQ according to information of 'measConfig'.

In the LTE system, RSRP, RSRQ, and received signal strength indicator (RSSI) are defined as follows.

RSRP is defined as the linear average over the power contributions (in [W]) of the resource elements that carry cell-specific reference signals within the considered measurement frequency bandwidth. For RSRP determination, the cell-specific reference signals $R_0$ shall be used. If receiver diversity is in use by the UE, the reported value shall not be lower than the corresponding MBSFN RSRP of any of the individual diversity branches. If the UE can reliably detect that $R_1$ is available, it may use $R_1$ in addition to $R_0$ to determine RSRP.

The reference point for the RSRP shall be the antenna connector of the UE.

If receiver diversity is in use by the UE, the reported value shall not be lower than the corresponding RSRP of any of the individual diversity branches.

RSRQ is defined as the ratio N×RSRP/(E-UTRA carrier RSSI), where N is the number of RB's of the E-UTRA carrier RSSI measurement bandwidth. The measurements in the numerator and denominator shall be made over the same set of resource blocks.

E-UTRA carrier RSSI comprises the linear average of the total received power (in [W]) observed only in OFDM symbols containing reference symbols for antenna port 0, in the measurement bandwidth, over N number of resource blocks by the UE from all sources, including co-channel serving and non-serving cells, adjacent channel interference, thermal noise etc. If higher-layer signaling indicates certain subframes for performing RSRQ measurements, then RSSI is measured over all OFDM symbols in the indicated subframes.

The reference point for the RSRQ shall be the antenna connector of the UE.

If receiver diversity is in use by the UE, the reported value shall not be lower than the corresponding RSRQ of any of the individual diversity branches.

RSSI is defined as the received wideband power, including thermal noise and noise generated in the receiver, within the bandwidth defined by the receiver pulse shaping filter.

The reference point for the measurement shall be the antenna connector of the UE.

If receiver diversity is in use by the UE, the reported value shall not be lower than the corresponding UTRA carrier RSSI of any of the individual receive antenna branches.

According to the above definitions, a UE operating in the LTE system may measure RSRP in a bandwidth indicated by an allowed measurement bandwidth-related information element (IE) transmitted in system information block type 3 (SIB3) in the case of intra-frequency measurement. In the case of inter-frequency measurement, the UE may measure RSRP in a bandwidth corresponding to one of 6, 15, 25, 50, 75, and 100 RBs, indicated by an allowed measurement bandwidth-related IE in system information block type 5 (SIB5). Alternatively, without the IE, the UE may measure RSRP in a total DL system frequency band by default.

When the UE receives information about an allowed measurement bandwidth, the UE may measure RSRP freely within the corresponding value, considering that the corresponding value is a maximum measurement bandwidth. However, when the serving cell transmits an IE defined as wideband-RSRQ (WB-RSRQ) to the UE and sets the allowed measurement bandwidth to 50 or more RBs, the UE should calculate an RSRP value for the total allowed measurement bandwidth. In regards to RSSI, the UE measures RSSI in a frequency band that the receiver of the UE has according to the definition of an RSSI bandwidth.

According to the above definitions, a UE operating in the LTE system may be allowed to measure RSRP in a bandwidth corresponding to one of 6, 15, 25, 50, 75, and 100 RBs by an allowed measurement bandwidth-related IE transmitted in SIB3 in the case of intra-frequency measurement. In the case of inter-frequency measurement, the UE may be allowed to measure RSRP in a bandwidth corresponding to one of 6, 15, 25, 50, 75, and 100 RBs by an allowed measurement bandwidth-related IE in SIB5. Alternatively, without the IE, the UE may measure RSRP in a total DL system frequency band by default.

When the UE receives the allowed measurement bandwidth-related IE, the UE may measure RSRP freely within the corresponding value, considering that the corresponding value is a maximum measurement bandwidth. However, when the serving cell transmits an IE defined as WB-RSRQ and sets an allowed measurement bandwidth to 50 or more RBs, the UE should calculate an RSRP value for the total allowed measurement bandwidth. In regards to RSSI, the UE measures RSSI in a frequency band that the receiver of the UE has according to the definition of an RSSI bandwidth.

2. Unlicensed Band System

FIGS. 17A and 17B illustrate an exemplary wireless communication system supporting an unlicensed band, which is applicable to the present disclosure.

In the following description, a cell operating in a licensed band (hereinafter, referred to as L-band) is defined as an L-cell, and a carrier of the L-cell is defined as a (DL/UL) LCC. In addition, a cell operating in an unlicensed band (hereinafter, referred to as a U-band) is defined as a U-cell, and a carrier of the U-cell is defined as a (DL/UL) UCC. The carrier/carrier-frequency of the cell may refer to the operating frequency (e.g., center frequency) of the cell. A cell/carrier (e.g., CC) is collectively referred to as a cell.

As illustrated in FIG. 17A, when the UE and the BS transmit and receive signals in carrier-aggregated LCC and UCC, the LCC may be configured as a primary CC (PCC) and the UCC may be configured as a secondary CC (SCC).

As illustrated in FIG. 17B, the UE and the BS may transmit and receive signals in one UCC or a plurality of carrier-aggregated LCC and UCC. That is, the UE and the BS may transmit and receive signals only in the UCC(s) without the LCC.

The above-described operation of transmitting and receiving a signal in an unlicensed band according to the present disclosure may be performed based on all the deployment scenarios described above (unless otherwise stated).

2.1. Radio Frame Structure for Unlicensed Band

Frame structure type 3 of LTE (see FIG. 3) or the NR frame structure (see FIG. 7) may be used for operation in the unlicensed band. The configuration of OFDM symbols occupied for a UL/DL signal transmission in the frame structure for the unlicensed band may be configured by the BS. Herein, an OFDM symbol may be replaced with an SC-FDM(A) symbol.

For a DL signal transmission in the unlicensed band, the BS may indicate the configuration of OFDM symbols used in subframe #n to the UE by signaling. In the following description, a subframe may be replaced with a slot or a TU.

Specifically, in the LTE system supporting the unlicensed band, the UE may assume (or identify) the configuration of OFDM symbols occupied in subframe #n by a specific field (e.g., a Subframe configuration for LAA field) in DCI received in subframe #n−1 or subframe #n from the BS.

Table 13 illustrates an exemplary method of indicating the configuration of OFDM symbols used for transmission of a DL physical channel and/or physical signal in a current and/or next subframe by the Subframe configuration for LAA field.

TABLE 13

| Value of 'Subframe configuration for LAA' field in current subframe | Configuration of occupied OFDM symbols (current subframe, next subframe) |
| --- | --- |
| 0000 | (—, 14) |
| 0001 | (—, 12) |

TABLE 13-continued

| Value of 'Subframe configuration for LAA' field in current subframe | Configuration of occupied OFDM symbols (current subframe, next subframe) |
|---|---|
| 0010 | (—, 11) |
| 0011 | (—, 10) |
| 0100 | (—, 9) |
| 0101 | (—, 6) |
| 0110 | (—, 3) |
| 0111 | (14, *) |
| 1000 | (12, —) |
| 1001 | (11, —) |
| 1010 | (10, —) |
| 1011 | (9, —) |
| 1100 | (6, —) |
| 1101 | (3, —) |
| 1110 | reserved |
| 1111 | reserved |

NOTE:
(—, Y) means UE may assume the first Y symbols are occupied in next subframe and other symbols in the next subframe are not occupied.
(X, —) means UE may assume the first X symbols are occupied in current subframe and other symbols in the current subframe are not occupied.
(X, *) means UE may assume the first X symbols are occupied in current subframe, and at least the first OFDM symbol of the next subframe is not occupied.

For a UL signal transmission in the unlicensed band, the BS may transmit information about a UL transmission duration to the UE by signaling.

Specifically, in the LTE system supporting the unlicensed band, the UE may acquire 'UL duration' and 'UL offset' information for subframe #n from a 'UL duration and offset' field in detected DCI.

Table 14 illustrates an exemplary method of indicating a UL offset and UL duration configuration by the UL duration and offset field in the LTE system.

TABLE 14

| Value of 'UL duration and offset' field | UL offset, l (in subframes) | UL duration, d (in subframes) |
|---|---|---|
| 00000 | Not configured | Not configured |
| 00001 | 1 | 1 |
| 00010 | 1 | 2 |
| 00011 | 1 | 3 |
| 00100 | 1 | 4 |
| 00101 | 1 | 5 |
| 00110 | 1 | 6 |
| 00111 | 2 | 1 |
| 01000 | 2 | 2 |
| 01001 | 2 | 3 |
| 01010 | 2 | 4 |
| 01011 | 2 | 5 |
| 01100 | 2 | 6 |
| 01101 | 3 | 1 |
| 01110 | 3 | 2 |
| 01111 | 3 | 3 |
| 10000 | 3 | 4 |
| 10001 | 3 | 5 |
| 10010 | 3 | 6 |
| 10011 | 4 | 1 |
| 10100 | 4 | 2 |
| 10101 | 4 | 3 |
| 10110 | 4 | 4 |
| 10111 | 4 | 5 |
| 11000 | 4 | 6 |
| 11001 | 6 | 1 |
| 11010 | 6 | 2 |
| 11011 | 6 | 3 |
| 11100 | 6 | 4 |
| 11101 | 6 | 5 |
| 11110 | 6 | 6 |
| 11111 | reserved | reserved |

For example, when the UL duration and offset field configures (or indicates) UL offset l and UL duration d for subframe #n, the UE may not need to receive a DL physical channel and/or physical signal in subframe #n+l+i (i=0, 1, . . . , d−1).

2.2. DL Channel Access Procedure (DL CAP)

For a DL signal transmission in the unlicensed band, the BS may perform a DL CAP for the unlicensed band. On the assumption that the BS is configured with a PCell that is a licensed band and one or more SCells which are unlicensed bands, a DL CAP operation applicable to the present disclosure will be described below in detail, with the unlicensed bands represented as licensed assisted access (LAA) SCells. The DL CAP operation may be applied in the same manner even when only an unlicensed band is configured for the BS.

2.2.1. Channel Access Procedure for Transmission(s) Including PDSCH/PDCCH/EPDCCH The BS senses whether a channel is in an idle state for a slot duration of a defer duration $T_d$. After a counter N is decremented to 0 in step 4 as described later, the BS may perform a transmission including a PDSCH/PDCCH/EPDCCH on a carrier on which the next LAA SCell(s) transmission is performed. The counter N may be adjusted by sensing the channel for an additional slot duration according to the following procedure.

1) Set N=$N_{init}$ where $N_{init}$ is a random number uniformly distributed between 0 and $CW_p$, and go to step 4.

2) If N>0 and the BS chooses to reduce the counter, set N=N−1.

3) Sense the channel for an additional slot duration, and if the additional slot duration is idle, go to step 4. Else, go to step 5.

4) If N=0, stop. Else, go to step 2.

5) Sense the channel until a busy slot is detected within the additional defer duration $T_d$ or all slots of the additional defer duration $T_d$ are sensed as idle.

6) If the channel is sensed as idle for all slot durations of the additional defer duration $T_d$, go to step 4. Else, go to step 5.

The above-described CAP for a transmission including a PDSCH/PDCCH/EPDCCH of the BS may be summarized as follows.

Figure 18:
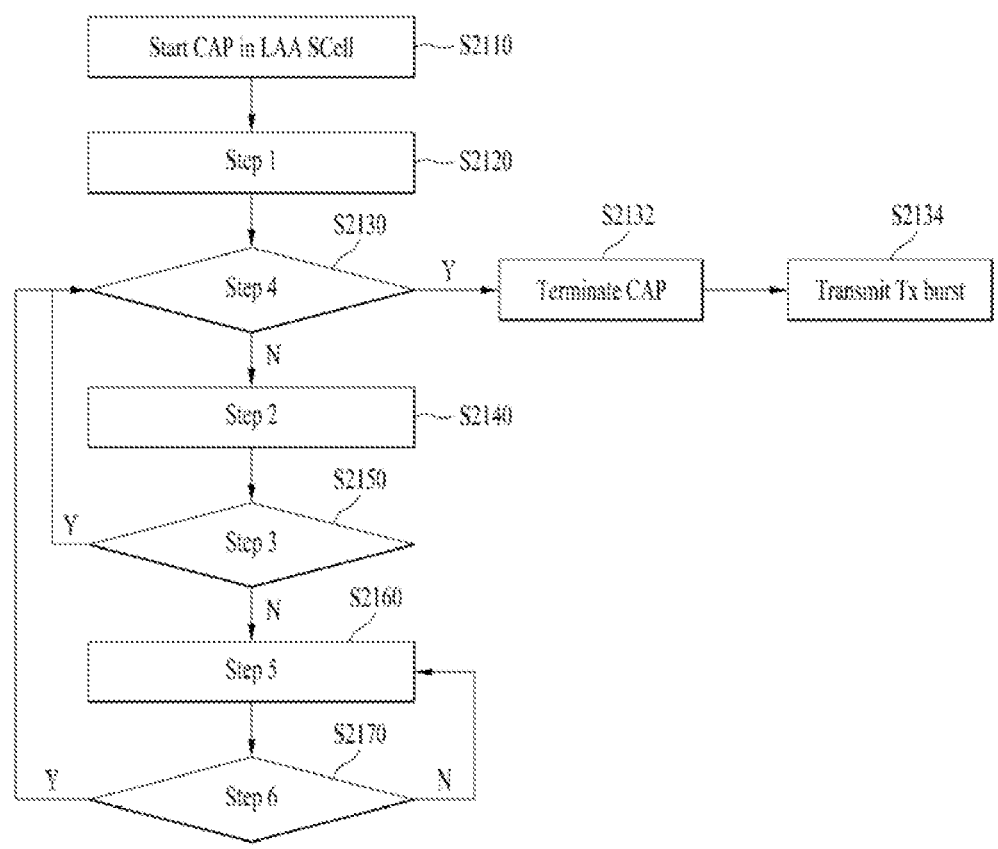
FIG. 18 is a diagram illustrating a channel access procedure (CAP) for transmission in an unlicensed band, which is applicable to various embodiments of the present disclosure.

FIG. 18 is a flowchart illustrating a CAP for transmission in an unlicensed band, which is applicable to the present disclosure.

For a DL transmission, a transmission node (e.g., a BS) may initiate the CAP to operate in LAA SCell(s) which is unlicensed band cell(s) (S2110).

The BS may randomly select a backoff counter N within a contention window (CW) according to step 1. N is set to an initial value, $N_{init}$ (S2120). $N_{init}$ is a random value selected from among the values between 0 and $CW_p$.

Subsequently, if the backoff counter N is 0 in step 4 (Y in S2130), the BS terminates the CAP (S2132). Subsequently, the BS may perform a Tx burst transmission including a PDSCH/PDCCH/EPDCCH (S2134). On the other hand, if the backoff counter N is not 0 (N in S2130), the BS decrements the backoff counter N by 1 according to step 2 (S2140).

Subsequently, the BS determines whether the channel of the LAA SCell(s) is in an idle state (S2150). If the channel is in the idle state (Y in S2150), the BS determines whether the backoff counter N is 0 (S2130).

On the contrary, if the channel is not idle in step S2150, that is, the channel is busy (N in S2150), the BS determines whether the channel is in the idle state for a defer duration $T_d$ (25 usec or more) longer than a slot time (e.g., 9 usec) according to step 5 (S2160). If the channel is idle for the defer duration (Y in S2170), the BS may resume the CAP.

For example, if the backoff counter $N_{init}$ is 10 and then reduced to 5, and the channel is determined to be busy, the BS senses the channel for the defer duration and determines whether the channel is idle. If the channel is idle for the defer duration, the BS may resume the CAP from a backoff counter value 5 (or from a backoff counter value 4 after decrementing the backoff counter value by 1).

On the other hand, if the channel is busy for the defer duration (N in S2170), the BS re-performs step S2160 to check again whether the channel is idle for a new defer duration.

In the above procedure, if the BS does not perform the transmission including the PDSCH/PDCCH/EPDCCH on the carrier on which a LAA SCell(s) transmission is performed after step 4, the BS may perform the transmission including the PDSCH/PDCCH/EPDCCH on the carrier, when the following conditions are satisfied:

When the BS is prepared to transmit the PDSCH/PDCCH/EPDCCH and the channel is sensed as idle for at least a slot duration $T_{sl}$, or for all slot durations of the defer duration $T_d$ immediately before the transmission; and On the contrary, when the BS does not sense the channel as idle for the slot duration $T_{sl}$ or for any of the slot durations of the defer duration $T_d$ immediately before the intended transmission, the BS proceeds to step 1 after sensing the channel as idle for a slot duration of the defer duration $T_d$.

The defer duration $T_d$ includes a duration of $T_f$ (=16 us) immediately followed by $m_p$ consecutive slot durations where each slot duration $T_{sl}$ is 9 us, and $T_f$ includes an idle slot duration $T_{sl}$ at the start of $T_f$.

If the BS senses the channel for the slot duration $T_{sl}$ and power detected by the BS for at least 4 us within the slot duration is less than an energy detection threshold $X_{Thresh}$, the slot duration $T_{sl}$ is considered to be idle. Otherwise, the slot duration $T_{sl}$ is considered to be busy.

$CW_{min,p} \leq CW_p \leq CW_{max,p}$ represents a contention window. $CW_p$ adjustment will be described in section 2.2.3.

$CW_{min,p}$ and $CW_{max,p}$ are chosen before step 1 of the above procedure.

$m_p$, $CW_{min,p}$, and $CW_{max,p}$ are based on a channel access priority class associated with the transmission of the BS (see Table 15 below).

$X_{Thresh}$ is adjusted according to section 2.2.4.

TABLE 15

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

If the BS performs a discovery signal transmission which does not include a PDSCH/PDCCH/EPDCCH when N>0 in the above procedure, the BS does not decrement N for a slot duration overlapping with the discovery signal transmission.

The BS does not continuously perform transmissions on the channel, for a period exceeding $T_{mcot,p}$ as given in Table 15 on the carrier on which an LASS SCell transmission is performed.

For p=3 and p=4 in Table 15, if the absence of any other technology sharing the carrier may be guaranteed on a long term basis (e.g., by level of regulation), $T_{mcot,p}$=10 ms and otherwise, $T_{mcot,p}$=8 ms.

2.2.2. Channel Access Procedure for Transmissions Including Discovery Signal Transmission(S) and not Including PDSCH If the transmission duration of the BS is 1 ms or less, the BS may perform a transmission including a discovery signal transmission without a PDSCH on a carrier on which a LAA SCell transmission is performed, immediately after a corresponding channel is sensed as idle for at least a sensing interval $T_{drs}$ (=25 us). $T_{drs}$ includes a duration of $T_f$(=16 us) immediately followed by one slot duration $T_{sl}$ (=9 us). $T_f$ includes an idle slot duration $T_{sl}$ at the start of $T_f$. If the channel is sensed as idle for the slot duration Tars, the channel is considered to be idle for $T_{drs}$.

2.2.3. Contention Window Adjustment Procedure

If the BS performs a transmission including a PDSCH associated with a channel access priority class p on a carrier, the BS maintains and adjusts a contention window value $CW_p$ by using the following procedures before step 1 of the procedure described in section 2.2.1. for the transmission (i.e., before performing a CAP):

1> Set $CW_p = CW_{min,p}$ for all priority classes $p \in \{1, 2, 3, 4\}$.

2> If at least 80% (z=80%) of HARQ-ACK values corresponding to PDSCH transmission(s) in a reference subframe k are determined to be NACK, the BS increments $CW_p$ for all priority classes $p \in \{1, 2, 3, 4\}$ to the next higher allowed value and remains in step 2. Otherwise, the BS goes to step 1.

In other words, when the probability that the HARQ-ACK values corresponding to the PDSCH transmission(s) in reference subframe k are determined to be NACK is at least 80%, the BS increments a CW value set for each priority class to the next higher value. Alternatively, the BS maintains the CW value set for each priority class to be an initial value.

Reference subframe k is the starting subframe of the most recent transmission on the carrier made by the BS, for which at least some HARQ-ACK feedback is expected to be available.

The BS adjusts the $CW_p$ values for all priority classes $p \in \{1, 2, 3, 4\}$ only once based on the given reference subframe k.

If $CW_p = CW_{max,p}$, the next higher allowed value for the $CW_p$ adjustment is $CW_{max,p}$.

The probability Z of determining HARQ-ACK values corresponding to PDSCH transmission(s) in reference subframe k to be NACK may be determined in consideration of the following.

If the transmission(s) of the BS for which HARQ-ACK feedback is available starts in the second slot of subframe k, HARQ-ACK values corresponding to PDSCH transmission(s) in subframe k and additionally, HARQ-ACK values corresponding to PDSCH transmission(s) in subframe k+1 are used.

If HARQ-ACK values correspond to PDSCH transmission(s) in the same LAA SCell allocated by an (E)PDCCH transmitted in LAA SCell, If an HARQ-ACK feedback for a PDSCH transmission of the BS is not detected or if the BS detects a 'DTX', 'NACK/DTX' or (any) other state, it is counted as NACK.

If the HARQ-ACK values correspond to PDSCH transmission(s) in another LAA SCell allocated by an (E)PDCCH transmitted in the LAA SCell, If an HARQ-ACK feedback for a PDSCH transmission of the BS is detected, 'NACK/DTX' or (any) other state is counted as NACK and the 'DTX' state is ignored.

If an HARQ-ACK feedback for a PDSCH transmission of the BS is not detected,

If it is expected that the BS will use PUCCH format 1 with channel selection, the 'NACK/DTX' state corresponding to 'no transmission' is counted as NACK, and the 'DTX' state corresponding to 'no transmission' is ignored. Otherwise, the HARQ-ACK for the PDSCH transmission is ignored.

If the PDSCH transmission has two codewords, an HARQ-ACK value for each codeword is considered individually.

A bundled HARQ-ACK across M subframes is considered to be M HARQ-ACK responses.

If the BS performs a transmission which includes a PDCCH/EPDDCH with DCI format 0A/0B/4A/4B and does not include a PDSCH associated with the channel access priority class p on a channel starting from time $t_0$, the BS maintains and adjusts the competing window size $CW_p$ by using the following procedures before step 1 of the procedure described in section 2.2.1. for the transmission (i.e., before performing the CAP):

1> Set $CW_p = CW_{min,p}$ for all priority classes $p \in \{1, 2, 3, 4\}$.

2> If a UE using a type 2 CAP (described in section 2.3.1.2.) successfully receives less than 10% of UL transport blocks (TBs) scheduled by the BS during a time period $t_0$ and $t_0 + T_{CO}$, the BS increments $CW_p$ for all priority classes to the next higher allowed value and remains in step 2. Otherwise, the BS goes to step 1.

$T_{CO}$ is calculated according to section 2.3.1.

If $CW_p = CW_{max,p}$ is used K times consecutively to generate $N_{init}$, only $CW_p$ for a priority class p for $CW_p = CW_{max,p}$ used K times consecutively to generate $N_{init}$ is reset to $CW_{min,p}$. the BS then selects K from a set of $\{1, 2, \ldots, 8\}$ values for each priority class $p \in \{1, 2, 3, 4\}$.

2.2.4. Energy Detection Threshold Adaptation Procedure

A BS accessing a carrier on which a LAA SCell transmission is performed sets an energy detection threshold $X_{Thresh}$ to a maximum energy detection threshold $X_{Thresh\_max}$ or less.

The maximum energy detection threshold $X_{Thresh\_max}$ is determined as follows.

If the absence of any other technology sharing the carrier may be guaranteed on a long term basis (e.g., by level of regulation), $$X_{Thresh\_max} = \min\left\{ \begin{array}{l} T_{max} + 10 \text{ dB}, \\ X_r \end{array} \right\}$$

where $X_r$ is the maximum energy detection threshold (in dBm) defined in regulatory requirements, when the regulation is defined. Otherwise, $X_r = T_{max} + 10$ dB.

Else, $$X_{Thresh\_max} = \max\left\{ \begin{array}{l} -72 + 10 \cdot \log10(BWMHz/20 \text{ MHz})\text{dBm}, \\ \min\left\{ \begin{array}{l} T_{max}, \\ T_{max} - T_A + (P_H + 10 \cdot \log10(BWMHz/20 \text{ MHz}) - P_{TX} \end{array} \right\} \end{array} \right\}$$

Herein, each variable is defined as follows.

$T_A = 10$ dB for transmission(s) including PDSCH;

$T_A = 5$ dB for transmissions including discovery signal transmission(s) and not including PDSCH;

$P_H = 23$ dBm;

$P_{TX}$ is the set maximum eNB output power in dBm for the carrier;

eNB uses the set maximum transmission power over a single carrier irrespective of whether single carrier or multi-carrier transmission is employed $T_{max}$ (dBm)=10·log 10(3.16228·10$^{-8}$ (mW/MHz) ·BWMHz (MHz));

BWMHz is the single carrier bandwidth in MHz.

2.2.5. Channel Access Procedure for Transmission(S) on Multiple Carriers

The BS may access multiple carriers on which a LAA SCell transmission is performed in one of the following type A or type B procedures.

2.2.5.1. Type A Multi-Carrier Access Procedures

According to the procedure described in this section, the BS performs channel access on each carrier $c_i \in C$ where C is a set of intended carriers to be transmitted by the BS, i=0, 1, ... q−1, and q is the number of carriers to be transmitted by the BS.

The counter N described in section 2.2.1 (i.e., the counter N considered in the CAP) is determined for each carrier $c_i$, and in this case, the counter for each carrier is represented as $N_{c_i}$. $N_{c_i}$ is maintained according to section 2.2.5.1.1. or section 2.2.5.1.2.

2.2.5.1.1. Type A1

The counter N described in section 2.2.1 (i.e., the counter N considered in the CAP) is determined for each carrier $c_i$, and the counter for each carrier is represented as $N_{c_i}$.

In the case where the BS ceases a transmission on one carrier $c_j \in C$, if the absence of any other technology sharing the carrier may be guaranteed on a long term basis (e.g., by level of regulation), the BS may resume $N_{c_i}$ reduction, when an idle slot is detected after waiting for a duration of $4 \cdot T_{sl}$ or reinitializing $N_{c_i}$ for each carrier $c_i$ (where $c_i$ is different from $c_j$, $c_i \neq c_j$).

2.2.5.1.2. Type A2

The counter N for each carrier $c_j \in C$ may be determined according to section 2.2.1., and is denoted by $N_{c_j}$. Here, $c_j$ may mean a carrier having the largest $CW_p$ value. For each carrier $c_j$, $N_{c_j} = N_{c_j}$.

When the BS ceases a transmission on any one carrier for which $N_{c_i}$ has been determined by the BS, the BS reinitializes $N_{c_i}$ for all carriers.

2.2.5.2. Type B Multi-Carrier Access Procedure

A carrier $c_j \in C$ may be selected by the BS as follows.

The BS selects $c_j$ uniformly randomly from C before each transmission on multiple carriers $c_i \in C$, or The BS does not select $c_j$ more than once every one second.

Herein, C is a set of carriers to be transmitted by the BS, i=0, 1, ... q−1, and q is the number of carriers to be transmitted by the BS.

For a transmission on a carrier $c_j$, the BS performs channel access on the carrier $c_j$ according to the procedure described in section 2.2.1 along with the modification described in section 2.2.5.2.1 or section 2.2.5.2.2.

For a transmission on the carrier $c_i \neq c_j$ among the carriers $c_i \in C$, For each carrier $c_i$, the BS senses the carrier $c_i$ for at least a sensing interval $T_{mc} = 25$ us immediately before the transmission on the carrier $c_j$. The BS may perform a transmission on the carrier $c_i$ immediately after sensing that the carrier $c_i$ is idle for at least the sensing interval $T_{mc}$. When the channel is sensed as idle during all time periods in which idle sensing is performed on the carrier $c_j$ within the given period $T_{mc}$, the carrier $c_i$ may be considered to be idle for $T_{mc}$.

The BS does not continuously perform transmissions on the carrier $c_i \neq c_j$ ($c_i \in C$) for a period exceeding $T_{mcot,p}$ as given in Table 15. $T_{mcot,p}$ is determined using the channel access parameter used for the carrier $c_j$.

2.2.5.2.1. Type B1

A single $CW_p$ value is maintained for the carrier set C.

To determine $CW_p$ for channel access on a carrier $c_j$, step 2 in the procedure described in section 2.2.3. is modified as follows.

If at least 80% (Z=80%) of HARQ-ACK values corresponding to PDSCH transmission(s) in reference subframe k of all carriers $c_i \in C$ are determined to be NACK, then $CW_p$ for all priority classes $p \in \{1, 2, 3, 4\}$ is incremented to the next higher allowed value. Otherwise, the procedure goes to step 1.

2.2.5.2.2. Type B2 (Type B2)

The $CW_p$ value is maintained independently for each carrier $c_i \in C$ by using the procedure described in section 2.2.3. To determine $N_{init}$ for the carrier $c_j$, the $CW_p$ value of the carrier $c_{j1} \in C$ is used. Here, $c_{j1}$ is a carrier having the largest $CW_p$ among all carriers in the set C.

2.3. Uplink Channel Access Procedures

The UE and the BS that schedules a UL transmission for the UE perform the following procedure for access to a channel in which LAA SCell transmission(s) is performed. On the assumption that the UE and the BS are basically configured with a PCell that is a licensed band and one or more SCells which are unlicensed bands, a UL CAP operation applicable to the present disclosure will be described below in detail, with the unlicensed bands represented as LAA SCells. The UL CAP operation may be applied in the same manner even when only an unlicensed band is configured for the UE and the BS.

2.3.1. Channel Access Procedure for Uplink Transmission(s)

The UE may access a carrier on which LAA SCell UL transmission(s) are performed according to a type 1 or type 2 UL CAP. The type 1 CAP is described in section 2.3.1.1, and the type 2 CAP is described in section 2.3.1.2.

If a UL grant that schedules a PUSCH transmission indicates the type 1 CAP, the UE performs type 1 channel access to perform a transmission including the PUSCH transmission, unless otherwise stated in this section.

If the UL grant that schedules the PUSCH transmission indicates the type 2 CAP, the UE performs type 2 channel access to perform a transmission including the PUSCH transmission, unless otherwise stated in this section.

The UE performs type 1 channel access for an SRS transmission that does not include a PUSCH transmission. A UL channel access priority class p=1 is used for the SRS transmission that does not include a PUSCH.

TABLE 16

| Channel Access Priority Class (p) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms | {15, 31, 63, 127, 255, 511, 1023} |
|   |   |   |   | or 10 ms |   |
| 4 | 7 | 15 | 1023 | 6 ms | {15, 31, 63, 127, 255, 511, 1023} |
|   |   |   |   | or 10 ms |   |

TABLE 16-continued

NOTE1:
For p = 3, 4, $T_{ulmcot,p}$ = 10 ms if the higher layer parameter 'absenceOfAnyOtherTechnology-r14' indicates TRUE, otherwise, $T_{ulmcot,p}$ = 6 ms.
NOTE 2:
When $T_{ulmcot,p}$ = 6 ms it may be increased to 8 ms by inserting one or more gaps. The minimum duration of a gap shall be 100 μs The maximum duration before including any such gap shall be 6 ms.

When the 'UL configuration for LAA' field configures 'UL offset' l and 'UL duration' d for subframe n, If the end of a UE transmission occurs in or before subframe n+l+d−1, the UE may use the type 2 CAP for transmission in subframe n+l+i (where i=0, 1, . . . d−1).

If the UE is scheduled to perform a transmission including a PUSCH in a subframe set $n_0, n_1, \ldots, n_{w-1}$ by using PDCCH DCI format 0B/4B, and the UE may not perform channel access for transmission in subframe $n_k$, the UE should attempt to make a transmission in subframe $n_{k+1}$ according to a channel access type indicated by DCI. $k \in \{0, 1, \ldots w-2\}$ and w is the number of scheduled subframes indicated by the DCI.

If the UE is scheduled to perform a transmission including a PUSCH without gaps in the subframe set $n_0, n_1, \ldots, n_{w-1}$ by using one or more of PDCCH DCI formats 0A/0B/4A/4B, and performs a transmission in subframe $n_k$ after accessing a carrier according to the type 1 or type 2 CAP, the UE may continue the transmission in a subframe after $n_k$ where $k \in \{0, 1, \ldots w-1\}$.

If the start of the UE transmission in subframe n+1 immediately follows the end of the UE transmission in subframe n, the UE does not expect that a different channel access type will be indicated for the transmission in the subframe.

If the UE is scheduled to perform a transmission without gaps by using one or more of PDCCH DCI formats 0A/0B/4A/4B, stops the transmission during or before subframe $n_{k1}$ (where $k1 \in \{0, 1, \ldots w-2\}$), and continuously senses the corresponding channel as idle after stopping the transmission, the UE may perform the transmission in the type 2 CAP after subframe $n_{k2}$ (where $k2 \in \{1, \ldots w-1\}$). If the channel is not sensed continuously as idle by the UE after the UE stops the transmission, the UE may perform the transmission in the type 1 CAP of a UL channel access priority class indicated by DCI corresponding to subframe $n_{k2}$ after subframe $n_{k2}$ (where $k2 \in \{1, \ldots w-1\}$).

If the UE receives a UL grant, DCI indicates the UE to start a PUSCH transmission in subframe n by using the type 1 CAP, and the UE has an ongoing type 1 CAP before subframe n, If a UL channel access priority class value p1 used for the ongoing type 1 CAP is equal to or greater than a UL channel access priority class value p2 indicated by the DCI, the UE may perform the PUSCH transmission by accessing a carrier in the ongoing type 1 CAP.

If the UL channel access priority class value p1 used for the ongoing type 1 CAP is less than the UL channel access priority class value p2 indicated by the DCI, the UE terminates the ongoing type 1 CAP.

If the UE is scheduled to transmit on a carrier set C in subframe n, a UL grant scheduling a PUSCH transmission on the carrier set C indicates the type 1 CAP, the same 'PUSCH starting position' is indicated for all carriers of the carrier set C, and the carrier frequencies of the carrier set C are a subset of a preset carrier frequency set, The UE may perform a transmission on a carrier $c_i \in C$ in the type 2 CAP.

If the type 2 CAP has been performed on the carrier $c_i$ immediately before the UE transmission on a carrier $c_j \in C$, and If the UE has accessed the carrier $c_j$ by using the type 1 CAP, Before performing the type 1 CAP on any one carrier in the carrier set C, the UE uniformly randomly selects the carrier $c_j$ from the carrier set C.

When the BS has transmitted on the carrier according to the CAP described in section 2.2.1, the BS may indicate the type 2 CAP by DCI in a UL grant that schedules a transmission including a PUSCH on the carrier in subframe n.

Alternatively, when the BS has transmitted on the carrier according to the CAP described in section 2.2.1, the BS may indicate that the type 2 CAP is available for the transmission including the PUSCH on the carrier in subframe n by the 'UL Configuration for LAA' field.

Alternatively, when subframe n occurs within a time period starting from to and ending at $t_0+T_{CO}$, the BS may schedule the transmission including the PUSCH on the carrier within subframe n following a transmission of a duration $T_{short\_ul}=25$ us from the BS. $T_{CO}=T_{mcot,p}+T_g$ and each variable may be defined as follows.

t0: a time instant at which the BS starts a transmission.

$T_{mcot,p}$: determined by the BS according to section 2.2.

$T_g$: the total period of all gap periods exceeding 25 us occurring between a DL transmission of the BS starting from to and a UL transmission scheduled by the BS and between two UL transmissions scheduled by the BS.

If the UL transmissions are scheduled in succession, the BS schedules the UL transmissions between consecutive subframes in $t_0$ and $t_0+T_{CO}$.

For the UL transmission on the carrier following the transmission of the BS on the carrier within the duration $T_{short\_ul}=25$ us, the UE may perform the type 2 CAP for the UL transmission.

If the BS indicates the type 2 CAP for the UE by DCI, the BS indicates a channel access priority class used to obtain access to the channel in the DCI.

2.3.1.1. Type 1 UL Channel Access Procedure

After sensing that the channel is idle for a slot duration of a defer duration $T_d$ and the counter N becomes 0 in step 4, the UE may perform a transmission using the type 1 CAP. The counter N is adjusted by sensing the channel for additional slot duration(s) according to the following procedure.

1) Set $N=N_{init}$ where $N_{init}$ is a random number uniformly distributed between 0 and $CW_p$, and go to step 4.

2) If N>0 and the BS chooses to decrement the counter, set N=N−1.

3) Sense the channel for an additional slot duration, and if the additional slot duration is idle, go to step 4. Else, go to step 5.

4) If N=0, stop. Else, go to step 2.

5) Sense the channel during all slot durations of an additional defer duration $T_d$.

6) If the channel is sensed as idle during the slot durations of the additional defer duration $T_d$, go to step 4. Else, go to step 5.

The above-described type 1 UL CAP of the UE may be summarized as follows.

For a UL transmission, a transmission node (e.g., a UE) may initiate the CAP to operate in LAA SCell(s) which is an unlicensed band cell (S2110).

The UE may randomly select a backoff counter N within a CW according to step 1. N is set to an initial value $N_{init}$ (S2120). $N_{init}$ is a value selected randomly from among the values between 0 and $CW_p$.

Subsequently, if the backoff counter value N is 0 according to step 4 (Y in S2130), the UE ends the CAP (S2132). Subsequently, the UE may perform a Tx burst transmission (S2134). On the other hand, if the backoff counter value is not 0 (N in S2130), the UE decrements the backoff counter value by 1 according to step 2 (S2140).

Subsequently, the UE checks whether the channel of the LAA SCell(s) is idle (S2150). If the channel is idle (Y in S2150), the UE checks whether the backoff counter value is 0 (S2130).

On the contrary, if the channel is not idle in step S2150, that is, the channel is busy (N in S2150), the UE checks whether the channel is idle for a defer duration $T_d$ (25 usec or more) longer than a slot time (e.g., 9 usec) according to step 5 (S2160). If the channel is idle for the defer duration (Y in S2170), the UE may resume the CAP.

For example, if the backoff counter value $N_{init}$ is 10 and the channel is determined to be busy after the backoff counter value is decremented to 5, the UE determines whether the channel is idle by sensing the channel for the defer duration. In this case, if the channel is idle for the defer duration, the UE may perform the CAP again from the backoff counter value 5 (or from the backoff counter value 4 after decrementing the backoff counter value by 1), instead of setting the backoff counter value $N_{init}$.

On the other hand, if the channel is busy for the defer duration (N in S2170), the UE re-performs S2160 to check again whether the channel is idle for a new defer duration.

In the above procedure, if the UE does not perform the transmission including the PUSCH on the carrier in which LAA SCell transmission(s) is performed after step 4 of the afore-described procedure, the UE may perform the transmission including the PUSCH on the carrier, when the following conditions are satisfied:

When the UE is prepared to transmit the transmission including the PUSCH and the channel is sensed as idle during at least the slot duration $T_{sl}$; and When the channel is sensed as idle during all slot durations of the defer duration $T_d$ immediately before the transmission including the PUSCH.

On the contrary, when the UE senses the channel for the first time after being prepared for the transmission, if the channel is not sensed as idle during the slot duration $T_{sl}$, or during any of all slot durations of the defer duration $T_d$ immediately before the intended transmission including the PUSCH, the UE proceeds to step 1 after sensing the channel as idle during the slot durations of the defer duration $T_d$.

The defer duration $T_d$ includes a duration of $T_f (=16$ us) immediately followed by $m_p$ consecutive slot durations where each slot duration $T_{sl}$ is 9 us, and $T_f$ includes an idle slot duration $T_{sl}$ at the start of $T_f$.

If the UE senses the channel during the slot duration $T_{sl}$ and power measured by the UE for at least 4 us in the slot duration is less than an energy detection threshold $X_{Thresh}$, the slot duration $T_{sl}$ is considered to be idle. Otherwise, the slot duration $T_{sl}$ is considered to be busy.

$CW_{min,p} \leq CW_p \leq CW_{max,p}$ represents a contention window, and $CW_p$ adjustment is described in detail in section 2.3.2.

$CW_{min,p}$ and $CW_{max,p}$ are chosen before step 1 of the above procedure.

$m_p$, $CW_{min,p}$, and $CW_{max,p}$ are determined based on a channel access priority class signaled to the UE (see Table 16 below).

$X_{Thresh}$ is adjusted according to section 2.3.3.

2.3.1.2. Type 2 UL Channel Access Procedure

If the UE uses the type 2 CAP for a transmission including a PUSCH, the UE may perform the transmission including the PUSCH immediately after sensing a channel as idle for at least a sensing duration $T_{short\_ul}$=25 us. $T_{short\_ul}$ includes a duration of $T_f$(=16 us) immediately followed by one slot duration $T_{sl}$ (=9 us). $T_f$ includes an idle slot duration $T_{sl}$ at the start of $T_f$. If the channel is sensed as idle during the slot duration $T_{short\_ul}$, the channel is considered to be idle for $T_{short\_ul}$.

2.3.2. Contention Window Adjustment Procedure

If the UE performs a transmission using the type 1 CAP associated with a channel access priority class p on a carrier, the UE maintains and adjusts a contention window value $CW_p$ using the following procedures before step 1 of the procedure described in section 2.3.1.1. for the transmission (i.e., before performing the CAP):

When a new data indicator (NDI) for at least one HARQ process related to HARQ_ID_ref is toggled, Set $CW_p$=$CW_{min,p}$ for all priority classes p∈{1, 2, 3, 4}.

Else, increment $CW_p$ to the next higher allowed value for all priority classes p∈{1, 2, 3, 4}.

HARQ_ID_ref is the HARQ process ID of a UL-SCH in reference subframe $n_{ref}$. Reference subframe $n_{ref}$ is determined as follows.

When the UE receives a UL grant in subframe $n_g$. Here, subframe $n_w$ is the most recent subframe before subframe $n_g$−3 in which the UE transmits the UL-SCH using the type 1 CAP.

If the UE performs a transmission including a UL-SCH without gaps, starting from subframe no in a subframe $n_0, n_1, \ldots, n_w$, reference subframe $n_{ref}$ is subframe $n_0$.

Else, reference subframe $n_{ref}$ is subframe $n_w$.

If the UE is scheduled to perform a transmission including a PUSCH without gaps in a subframe set $n_0, n_1, \ldots, n_{w-1}$ and may not perform any transmission including the PUSCH in the subframe set, the UE may maintain $CW_p$ for all priority classes p∈{1, 2, 3, 4} without changing $CW_p$.

If a reference subframe for the recent scheduled transmission is also subframe $n_{ref}$, the UE may maintain $CW_p$ for all priority classes p∈{1, 2, 3, 4} equal to $CW_p$ for a transmission including a PUSCH, which uses the recent scheduled type 1 CAP.

If $CW_p$=$CW_{max,p}$, the next higher allowed value for the $CW_p$ adjustment is $CW_{max,p}$.

If $CW_p$=$CW_{max,p}$ is used K times consecutively to generate $N_{init}$, only $CW_p$ for a priority class p for $CW_p$=$CW_{max,p}$ used K times consecutively to generate $N_{init}$ is reset to $CW_{min,p}$. K is then selected by the UE from a set of {1, 2, . . . , 8} values for each priority class p∈{1, 2, 3, 4}.

2.3.3. Energy Detection Threshold Adaptation Procedure)

A UE accessing a carrier on which a LAA SCell transmission is performed sets an energy detection threshold $X_{Thresh}$ to a maximum energy detection threshold $X_{Thresh\_max}$ or less.

The maximum energy detection threshold $X_{Thresh\_max}$ is determined as follows.

If the UE is configured with a higher-layer parameter 'maxEnergyDetectionThreshold-r14', $X_{Thresh\_max}$ is set equal to a value signaled by the higher-layer parameter.

Else,

The UE determines $X'_{Thresh\_max}$ according to the procedure described in section 2.3.3.1.

If the UE is configured with a higher-layer parameter maxEnergyDetectionThresholdOffset-r14', $X_{Thresh\_max}$ is set to $X'_{Thresh\_max}$ adjusted according to an offset value signaled by the higher-layer parameter.

Else,

The UE sets $X_{Thresh\_max}$=$X'_{Thresh\_max}$.

2.3.3.1. Default Maximum Energy Detection Threshold Computation Procedure

If a higher-layer parameter 'absenceOfAnyOtherTechnology-r14' indicates TRUE:

$$X'_{Thresh\_max} = \min\left\{\begin{array}{l}T_{max} + 10 \text{ dB}, \\ X_r\end{array}\right\}$$

where Xr is a maximum energy detection threshold (in dBm) defined in regulatory requirements when the regulation is defined. Else, $X_r$=$T_{max}$+10 dB.

Else:

$$X'_{Thres\_max} = \max\left\{\begin{array}{l}-72 + 10 \cdot \log10(BWMHz/20 \text{ MHz})\text{dBm}, \\ \min\left\{\begin{array}{l}T_{max}, \\ T_{max} - T_A + (P_H + 10 \cdot \log10(BWMHz/20 \text{ MHz}) - P_{TX}\end{array}\right\}\end{array}\right\}$$

Here, each variable is defined as follows.

$T_A$=10 dB $P_H$=23 dBm;

$P_{TX}$ is the set to the value $P_{CMAX\_H,c}$ as defined in 3GPP TS 36.101.

$T_{max}$ (dBm)=10·log 10(3.16228·10$^{-8}$ (mW/MHz) ·BWMHz (MHz))

BWMHz is the single carrier bandwidth in MHz.

2.4. Subframe/Slot Structure Applicable to Unlicensed Band System

Figure 19:
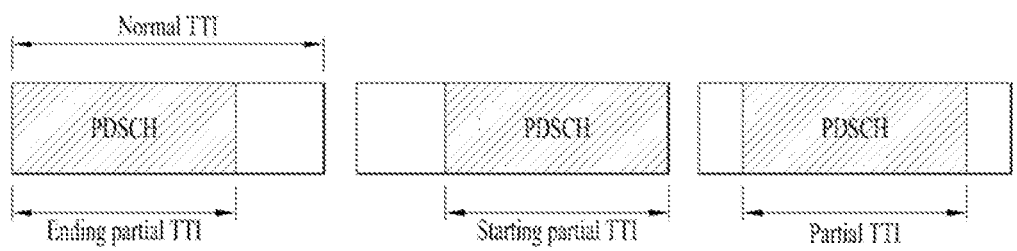
FIG. 19 is a diagram illustrating a partial transmission time interval (TTI) or a partial subframe/slot, which is applicable to various embodiments of the present disclosure.

FIG. 19 illustrates a partial TTI or partial subframe/slot applicable to the present disclosure.

In the Release-13 LAA system, a partial TTI is defined as a DwPTS to maximize use of MCOT and support continuous transmission in a DL burst transmission. The partial TTI (or partial subframe) refers to a period in which a PDSCH signal is transmitted for a length smaller than a legacy TTI (e.g., 1 ms).

In the present disclosure, a starting partial TTI or a starting partial subframe/slot refers to a form in which some front symbols of a subframe are emptied, and an ending partial TTI or ending partial subframe/slot refers to a form in which some symbols at the end of a subframe are emptied. (On the other hand, a whole TTI is called a normal TTI or a full TTI.)

Figure 22:
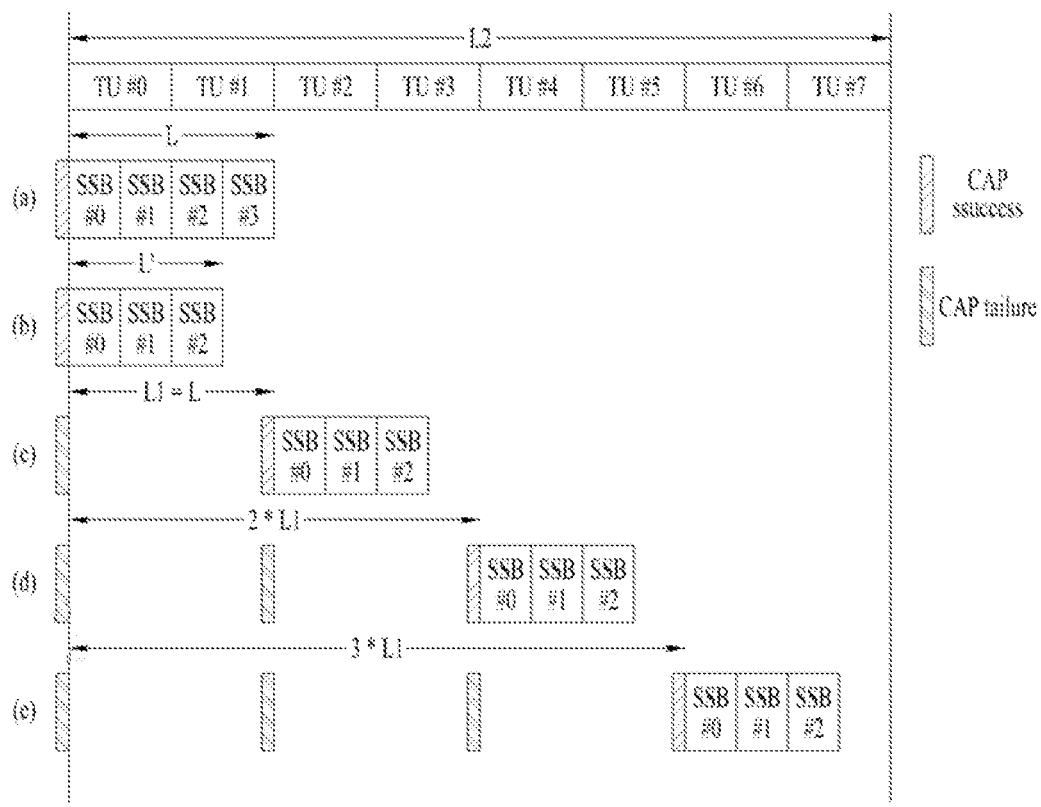
FIG. 22 is a diagram illustrating an exemplary SSB transmission structure according to various embodiments of the present disclosure.

FIG. 19 illustrates various forms of the above-described partial TTI. The first drawing of FIG. 19 illustrates the ending partial TTI (or subframe/slot), and the second drawing of FIG. 19 illustrates the starting partial TTI (or subframe/slot). In addition, the third drawing of FIG. 22 illustrates a partial TTI (or subframe/slot) configured by emptying some symbols at the start and end of the subframe/slot. In this case, a time interval excluding signal transmission in a normal TTI is called a transmission gap (TX gap).

While FIG. 19 has been described in the context of a DL operation, the same thing may be applied to a UL operation. For example, the partial TTI structures illustrated in FIG. 19 may also be applied to PUCCH and/or PUSCH transmission.

3. Various Embodiments of the Present Disclosure

Various embodiments of the present disclosure will be described in more detail based on the above technical idea. The contents of clause 1 and clause 2 described above may be applied to the various embodiments of the present disclosure described below. For example, operations, functions, terms, and so on that are not defined in the following embodiments of the present disclosure may be performed and described based on the contents of clause 1 and clause 2.

As more and more communication devices require larger communication capacities, efficient use of a limited frequency band becomes a significant requirement. In this context, techniques of using an unlicensed band (U-band) in traffic offloading, such as 2.4 GHz mainly used in the legacy WiFi system or 5 GHz and/or 60 GHz which has newly attracted attention, are under consideration for a cellular communication system such as 3GPP LTE/NR.

To transmit a signal in an unlicensed band, a UE or a BS may perform wireless transmission and reception based on contention between communication nodes. That is, when each communication node is to transmit a signal in the unlicensed band, the communication node may confirm that another communication node is not transmitting a signal in the unlicensed band by performing channel sensing before the signal transmission. This operation may be defined as listen before talk (LBT) or a CAP. Particularly, the operation of checking whether another communication node is transmitting a signal may be defined as carrier sensing (CS), and determining that another communication node is not transmitting a signal is defined as confirming clear channel assessment (CCA).

In an LTE/NR system to which various embodiments of the present disclosure are applicable, an eNB/gNB or a UE may also have to perform an LBT operation or a CAP for signal transmission in an unlicensed band. In other words, the eNB/gNB or the UE may transmit a signal in the unlicensed band, based on the CAP.

Further, when the eNB/gNB or the UE transmits a signal in the unlicensed band, other communication nodes such as WiFi nodes should not interfere with the eNB/gNB or the UE by performing a CAP. For example, the WiFi standard (e.g., 801.11ac) specifies a CCA threshold as −62 dBm for a non-WiFi signal and as −82 dBm for a WiFi signal. Accordingly, a station (STA) or access point (AP) operating in conformance to the WiFi standard may not transmit a signal to prevent interference, for example, when receiving a non-WiFi signal at or above −62 dBm.

In the NR system, at least one synchronization signal/physical broadcast channel block (SS/PBCH block) or synchronization signal block (SSB) is supported. Each SS/PBCH block may correspond to a specific index. The index of the SS/PBCH block may be indicated by or known from sequence information in the SS/PBCH block and/or the payload of the SS/PBCH block. When the index of the SS/PBCH block is obtained from the above information during initial access, a time-axis boundary such as a frame/subframe/slot and/or an index may be identified from a predefined relationship. The UE may also know the index of the frame/subframe/slot based on a combination with other information in the SS/PBCH block. The predefined relationship may refer to a relationship between the indexes of SS/PBCH blocks and time-axis boundaries such as frames/subframes/slots.

For mobility support, the UE should perform radio resource management/radio link monitoring (RRM/RLM) measurement for a neighboring cell and/or a serving cell. The UE may require such index information even when performing RRM/RLM measurement in each SS/PBCH block of the (neighboring) cell.

However, since the unlicensed band is based on random access, the BS and the UE may attempt signal transmission only when they perform a CAP and succeed in the CAP before transmitting a signal. That is, since signal transmission in the unlicensed band depends on a CAP result, an SS/PBCH block to be transmitted by the BS may not be transmitted at a predetermined timing in the unlicensed band. However, when the SS/PBCH block (transmission) itself is dropped, it may take a longer time for UEs attempting initial access to camp on the cell. It may also take a longer time for UEs attempting measurement of the serving cell/neighboring cell to obtain a meaningful measurement result.

Because signal transmission depends on a CAP result in the unlicensed band, the UE may not identify when the BS actually succeeds in a CAP and starts to transmit an SSB/PBCH block. In other words, the UE may not have knowledge of the starting time of the SSB/PBCH block transmission, thereby suffering from ambiguity.

According to various embodiments of the present disclosure described below, CAP failure may increase the number of transmission occasions of an SSB/PBCH block. In addition, according to various embodiments of the present disclosure, the above-described ambiguity may be eliminated.

Various embodiments of the present disclosure described below relate to a method of transmitting and receiving an SS/PBCH block by a BS and a UE, when a CAP for transmitting the SS/PBCH block in an unlicensed band is failed. Particularly, the various embodiments of the present disclosure described below relate to a method of performing RRM measurement and a method of obtaining the index/boundary of a frame/slot by a UE, based on (or in consideration of) the SS/PBCH block transmission/reception method.

In the description of various embodiments of the present disclosure, when it is said that a BS has succeeded in a CAP, this may mean that when transmitting a DL signal in an unlicensed band, the BS identifies that the unlicensed band is idle based on the CAP and thus starts to transmit the DL signal at a predetermined or predefined timing.

On the contrary, in the description of various embodiments of the present disclosure, when it is said that a BS has failed in a CAP, this may mean that when transmitting a DL signal in an unlicensed band, the BS identifies that the unlicensed band is busy based on the CAP and thus is not capable of starting to transmit the DL signal at a predetermined or predefined timing.

Figure 20:
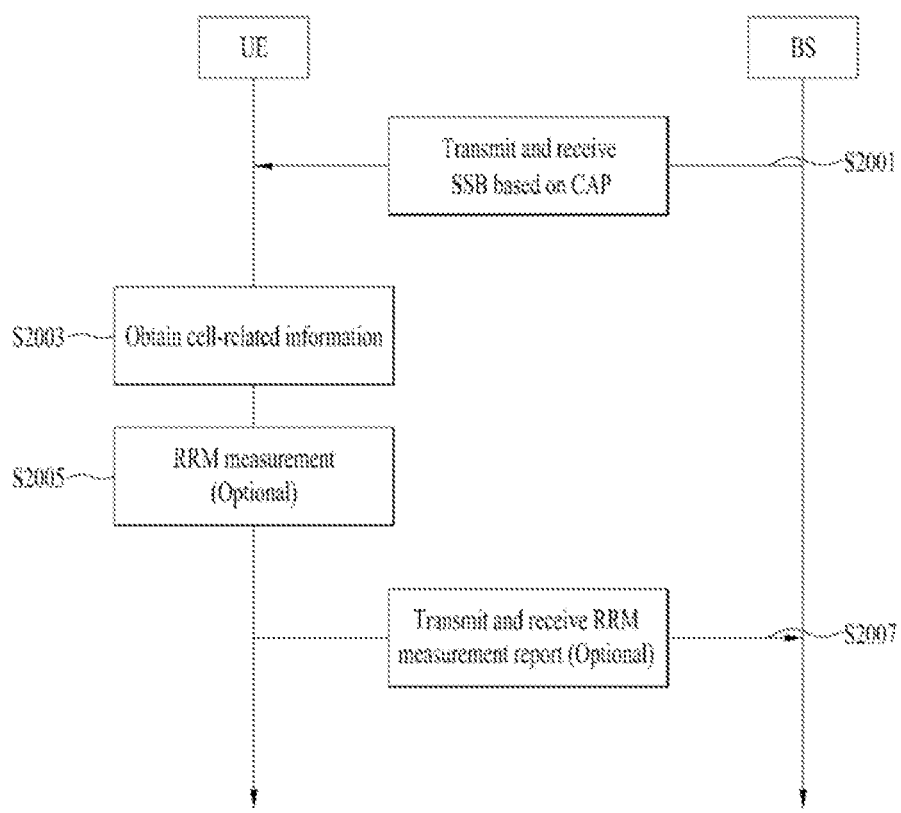
FIG. 20 is a simplified diagram illustrating a signal flow for operations of a user equipment (UE) and a base station (BS) in an unlicensed band to which various embodiments of the present disclosure are applicable.

FIG. 20 is a simplified diagram illustrating a signal flow for operations of a UE and a BS in an unlicensed band, to which various embodiments of the present disclosure are applicable.

Referring to FIG. 20, according to various embodiments of the present disclosure, the BS may transmit an SSB based on a CAP and the UE may receive the SSB (S2001).

According to various embodiments of the present disclosure, the UE may obtain cell-related information from the received SSB (S2003).

In an exemplary embodiment, the UE may perform RRM measurement based on the received SSB (S2005). The UE may then transmit an RRM measurement report to the BS, and the BS may receive the RRM measurement report (S2007).

In various embodiments of the present disclosure, each of the above operations will be described in detail. Those skilled in the art will clearly understand that unless contradicting each other, the various embodiments of the present disclosure described below may be combined fully or partially to implement other various embodiments of the present disclosure.

3.1 Method of Transmitting SSB Depending on Success or Failure of CAP

For convenience, a maximum number of SSBs transmittable from a BS is denoted by L, and a number equal to or less than L is denoted by L'. According to various embodiments of the present disclosure, the BS may select only L' SSBs and attempt to transmit the L' SSBs. That is, the BS may transmit an SSB burst set including L or L' SSBs according to various embodiments of the present disclosure.

According to various embodiments of the present disclosure, a window of a time duration or a size longer or larger than the transmission duration of L SSBs may be configured, and a plurality of transmission candidates for SSB transmission may be configured within this window. For convenience, the time duration or size of the window is denoted by L2. L2 may correspond to a time period during which L SSBs may be transmitted (in time division multiplexing (TDM)). L2 may be represented in time units such as the number of slot and/or msec.

3.1.1. <Option 1. Shifted SSB Transmission>

In option 1, a minimum time interval between available transmission starting occasions in an SSB burst set is denoted by L1. L1 may be represented in time units such as the number of slot and/or msec.

Figure 21:
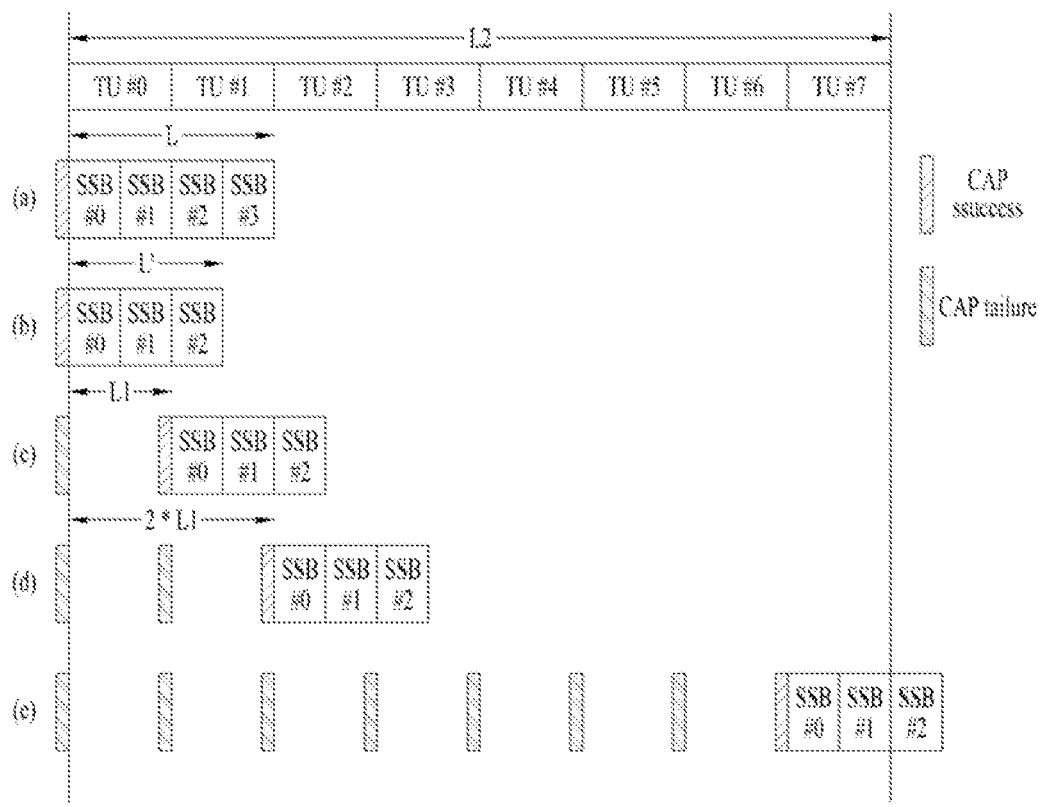
FIG. 21 is a diagram illustrating an exemplary synchronization signal block (SSB) transmission structure according to various embodiments of the present disclosure.

FIG. 21 is a diagram illustrating an exemplary SSB transmission structure according to various embodiments of the present disclosure.

Referring to FIG. 21, according to various embodiments of the present disclosure, the time length of a block corresponding to one SSB may be equal to or greater than a time duration occupied by the SSB. In an exemplary embodiment, DL signals/channels (e.g., CSI-RS, PDCCH, PDSCH, and so on) other than the SSB may be multiplexed and transmitted in the remaining resource area of the block other than the time area to which the SSB is mapped.

According to various embodiments of the present disclosure, a TU may correspond to or relate to a specific time unit. For example, the TU may be, but not limited to, a slot, a half-slot, or a subframe (1 msec). According to various embodiments of the present disclosure, the value of L1 and/or L2 may be predefined. Alternatively, according to various embodiments of the present disclosure, the value of L1 and/or L2 may be set by a UE-specific signal, a cell-specific signal, an L1 signal, or a MAC signal.

According to various embodiments of the present disclosure, when failing in a CAP for an SSB transmission from (at) time t, the BS may perform the CAP to start the SSB transmission from time t+L1*N (N is a natural number).

Referring to FIG. 21, in an example according to various embodiments of the present disclosure, L2=8 TUs, L=4, L'=3, and L1=1 TU.

(a) indicates that L=4

(b) is an example in which for L'=3, an SSB burst set is transmitted from the starting time of L2, TU #0, (c) is an example in which when a CAP for the transmission starting in TU #0 is failed, the SSB burst set is transmitted from the next occasion, TU #1 (TU #0+L1) after the CAP is successful. That is, according to various embodiments of the present disclosure, when the BS fails in the CAP for the transmission of the SSB burst set, which starts in TU #0, the BS may transmit the SSB burst set after succeeding in the CAP in the next occasion, TU #1.

(d) is an example in which when the CAPs for transmissions starting in TU #0 and TU #1 are failed, the SSB burst set is transmitted from the next occasion, TU #2 (TU #1+L1) after the CAP is successful. That is, according to various embodiments of the present disclosure, when the BS fails in the CAP for the transmission of the SSB burst set, which starts in TU #0 and fails again in the CAP in the next occasion TU #0, the BS may transmit the SSB burst set after succeeding in the CAP in the next occasion, TU #2.

(e) is an example in which when CAPs for transmissions starting in TU #0, TU #1, TU #2, TU #3, TU #4, TU #5, and TU #6 are failed, the SSB burst set is transmitted from the next occasion, TU #7 after a CAP is successful. That is, according to various embodiments of the present disclosure, when the BS fails in the CAPs for the transmissions of the SSB burst set, which start in TU #0, TU #1, TU #2, TU #3, TU #4, TU #5, and TU #6, the BS may transmit the SSB burst set after succeeding in a CAP in the next occasion, TU #7.

According to an exemplary embodiment, when an SSB burst transmission starts in TU #7, some SSB may be transmitted outside the L2 window, as in the example of (e). In an exemplary embodiment, when an SSB burst transmission starts in a specific occasion within the L2 window and some SSB may be transmitted outside the L2 window as in the example of (e), the SSB may be transmitted in a corresponding occasion according to the following Method 1 to Method 3.

Method 1

Once the SSB burst transmission starts in a corresponding occasion, transmission of the L' SSBs may be allowed (even outside the L2 window). In the example of (e), although SSB #2 is outside the L2 window, SSB #0, SSB #1, and SSB #2 may be continuously transmitted.

Method 2

When the SSB burst transmission starts in the corresponding occasion and becomes outside the L2 window, the SSB burst transmission may not be allowed to start in the occasion. In the example of (e), since SSB #2 is outside the L2 window, the SSB burst transmission illustrated in (e) may not be allowed. In this case, the SSB burst transmission illustrated in (e) may be dropped.

Method 3

When the SSB burst transmission starts in the corresponding occasion and becomes outside the L2 window, the SSB burst transmission may be allowed to start in the occasion, while transmission of an SSB outside the L2 window is not allowed. In the example of (e), the transmission of SSB #2 may not be allowed. In this case, only SSB #0 and SSB #1 may be transmitted, while the transmission of SSB #2 is dropped, in the SSB burst illustrated in (e).

FIG. 22 is a diagram illustrating an exemplary SSB transmission structure according to various embodiments of the present disclosure. Particularly, L1=L in the illustrated case of FIG. 22.

(a) indicates that L=4

(b) is an example in which for L'=3, an SSB burst set is transmitted from the starting time of L2, TU #0, (c) is an example in which when a CAP for transmission of an SSB burst set starting in TU #0 is failed, the SSB burst set is transmitted from the next occasion, TU #2 (TU #0+L1) after a CAP is successful.

(d) is an example in which when the CAPs for the SSB burst set transmissions starting in TU #0 and TU #2 are failed, the SSB burst set is transmitted from the next occasion, TU #4 after a CAP is successful.

(e) is an example in which when the CAPs for the SSB burst set transmissions starting in TU #0, TU #2, and TU #4 are failed, the SSB burst set is transmitted from the next occasion, TU #6 after a CAP is successful.

According to various embodiments of the present disclosure, a method of eliminating ambiguity that a UE receiving an SSB suffers from may be provided. For example, on the assumption of L1<the transmission duration of L SSBs or L1<the transmission duration of L' SSBs, the UE receiving SSBs may suffer from ambiguity about which SSB is transmitted in a specific SSB occasion.

For example, referring to FIGS. 21(*b*) and 21(*c*), an SSB transmittable at the beginning of TU #1 may be SSB #0 or SSB #2, which may depend on a time when a CAP is successful. The UE receiving SSBs does not have knowledge of the success time of the CAP. Accordingly, even though the UE detects an SSB (particularly, a PSS/SSS) at the corresponding position, the UE should identify whether the SSB is SSB #0 or SSB #2. According to various embodiments of the present disclosure described below, methods of solving this problem may be provided.

3.1.2. <Option 2. Cyclically Rotated SSB Transmission

In option 2, for convenience, a minimum allowed time interval between transmissions of the same SSB is defined as L1. L1 may be represented in time units such as the number of slot and/or msec.

In various embodiments of the present disclosure, the same SSBs or the same SSB indexes may be SSBs that the BS has transmitted using the same transmission (TX) beam filter. Alternatively, in various embodiments of the present disclosure, the same SSBs or the same SSB indexes may be SSBs carrying fully or partially identical information. Alternatively, in various embodiments of the present disclosure, the same SSBs or the same SSB indexes may be SSBs that the UE receives using the same reception (RX) beam filter.

In summary, in various embodiments of the present disclosure, the same SSBs or the same SSB indexes may be interpreted as the same beams or the same beam indexes, or may be interpreted as SSBs in a QCL relationship.

According to various embodiments of the present disclosure, the value of L1 and/or L2 may be predefined. Alternatively, according to various embodiments of the present disclosure, the value of L1 and/or L2 may be set by a UE-specific signal, a cell-specific signal, an L1 signal, or a MAC signal.

According to various embodiments of the present disclosure, the time interval L1 may be equal to or greater than the time duration of at least L' or L SSBs. According to various embodiments of the present disclosure, the BS may perform (attempt) a CAP for each SSB. According to various embodiments of the present disclosure, a minimum SSB interval at which a CAP may be attempted may be defined.

For example, when the BS fails in a first CAP, the BS may attempt a second CAP after G SSBs. In an exemplary embodiment, G may be an integer equal to or greater than 1, which may be predefined. Alternatively, only candidate values for G may be predefined, and the BS may select a value for G from among the predefined candidates. In an exemplary embodiment, a rule for selecting a value for G from among predefined candidates may be predefined.

Specifically, according to various embodiments of the present disclosure, with transmission occasions for SSBs configured within an L2 window according to the value of L1, the BS may transmit an SSB burst set including L' SSBs from a time when a CAP is actually successful.

Figure 23:
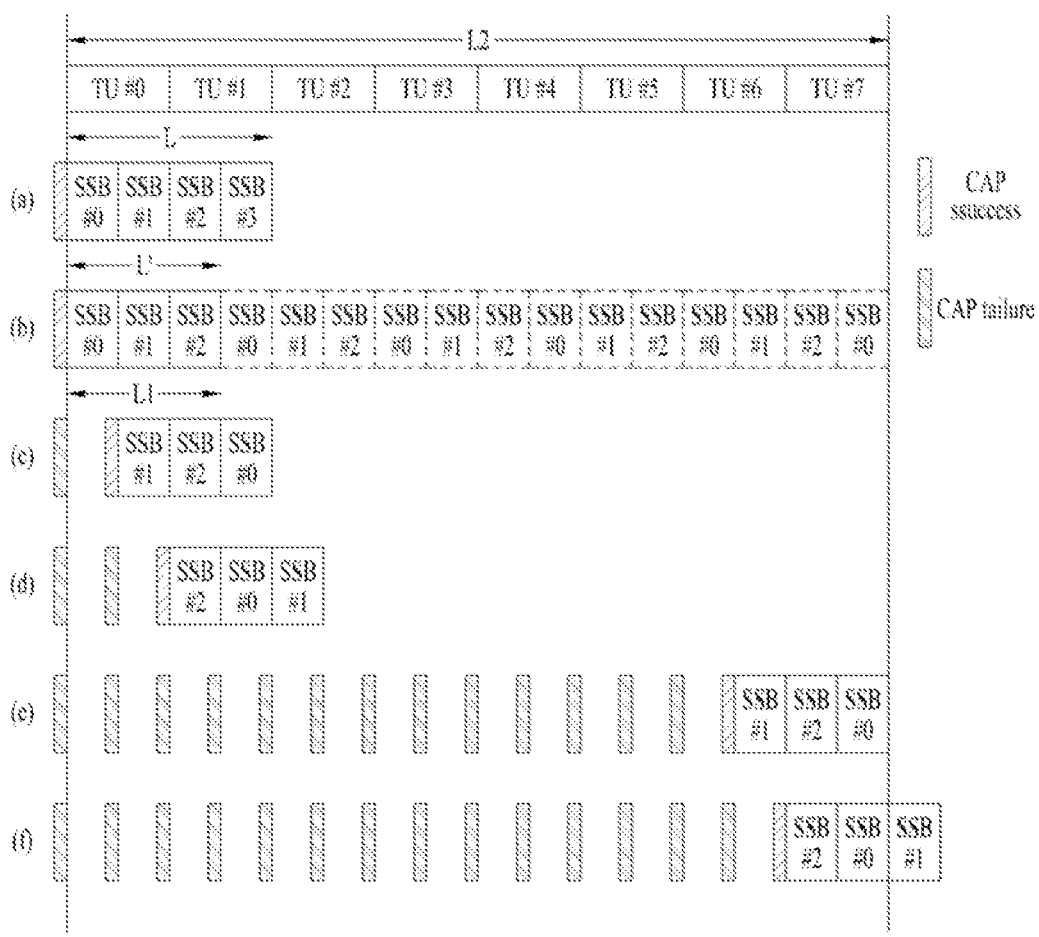
FIG. 23 is a diagram illustrating an exemplary SSB transmission structure according to various embodiments of the present disclosure.

FIG. 23 is a diagram illustrating an exemplary SSB transmission structure according to various embodiments of the present disclosure.

Referring to FIG. 23, in an example according to various embodiments of the present disclosure, L2=8 TUs, L=4, L'=3, and L1=1.5 TU (i.e., the transmission duration of L' SSBs).

(a) indicates that L=4

(b) is an example in which for L'=3, an SSB burst set is transmitted from the starting time of L2, TU #0. (b) indicates candidate positions at which SSBs may be located at L1 intervals.

(c) is an example in which when a CAP for the SSB burst set transmission at the beginning of TU #0 is failed, the SSB burst set is transmitted from the next candidate, the middle of TU #0 after a CAP is successful.

(d) is an example in which the SSB burst set is transmitted from TU #1 after a CAP is successful.

(e) is an example in which the SSB burst set is transmitted from the middle of TU #6 after a CAP is successful.

(f) is an example in which the SSB burst set is transmitted from TU #7 after a CAP is successful.

When the SSB burst set transmission as illustrated in the example of (e) is allowed, the number of candidates for SSB #0 is 6, and the number of candidates for each of SSB #1 and SSB #2 is 5. Therefore, the number or probability of possible transmissions may vary for each SSB. In this regard, according to various embodiments of the present disclosure, the number of candidates available for an SSB transmission within the L2 window may be set equally for each of L' SSBs.

For example, in FIG. 23, SSB #0 allocated to the latter half of TU #7 may be excluded so that the number of candidates for each SSB is equal. In this case, when an SSB burst set is transmitted from the middle of TU #6 after CAP success, only SSB #1 and SSB #2 are sequentially transmitted as in the example of (e). According to various embodiments of the present disclosure, this transmission may not be allowed. That is, according to various embodiments of the present disclosure, only when transmission of the L' SSBs is guaranteed, transmission of the SSB burst set may be allowed to start. This may also be applied to a case in which L1>=the transmission duration of L SSBs (L1 is equal to or greater than L).

As in the example of (e), when the SSB burst transmission starts in TU #7, some SSB may be transmitted outside the L2 window. According to various embodiments of the present disclosure, when an SSB transmission starts in a specific occasion within the L2 window and some SSB may be transmitted outside the L2 window as in the example of (e), a method of transmitting SSBs in a corresponding occasion may be provided. Specifically, the methods according to various embodiments of the present disclosure provided in Option. 1 may also be applied herein.

Figure 24:
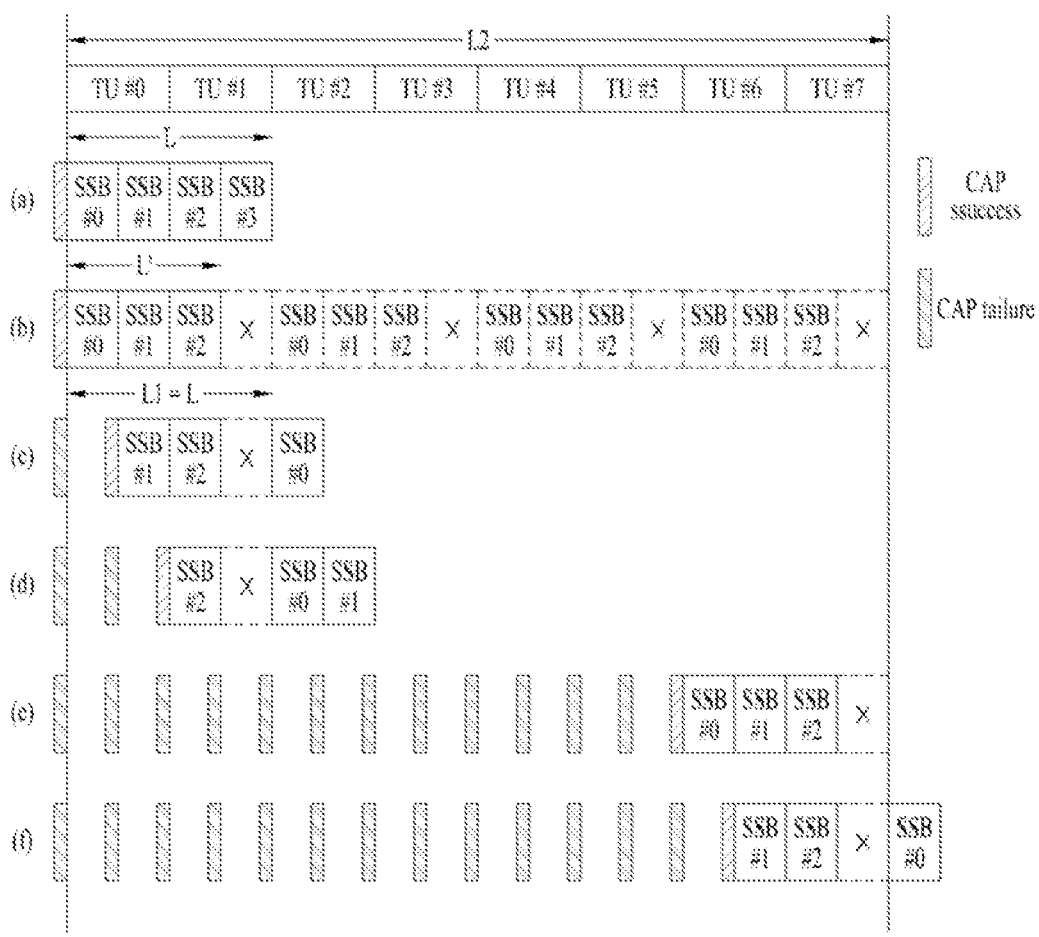
FIG. 24 is a diagram illustrating an exemplary SSB transmission structure according to various embodiments of the present disclosure.

FIG. 24 is a diagram illustrating an exemplary SSB transmission structure according to various embodiments of the present disclosure. Particularly, L1=L in FIG. 24.

(a) indicates that L=4.

(b) is an example in which for L'=3, an SSB burst set is transmitted from the starting time of L2, TU #0. (b) indicates candidate positions at which each SSB may be located at L1 intervals.

(c) is an example in which when a CAP for the SSB burst set transmission at the beginning of TU #0 is failed, the SSB burst set is transmitted from the next occasion, the middle of TU #0 after a successful CAP.

d) is an example in which the SSB burst set is transmitted from TU #1 after a successful CAP.

(e) is an example in which the SSB burst set is transmitted from the middle of TU #6 after a successful CAP.

(f) is an example in which the SSB burst set is transmitted from TU #7 after a successful CAP.

In the example of (b), according to various embodiments of the present disclosure, 'X' may be filled with any DL signal or channel by the BS. Alternatively, according to various embodiments of the present disclosure, 'X' may be filled with a predefined DL signal or channel. Alternatively, according to various embodiments of the present disclosure, the BS may not fill 'X' with any DL signal or channel. According to various embodiments of the present disclosure, when 'X' is not filled with any DL signal or channel, the BS may additionally attempt a CAP, and transmit SSB #n from the success time of the CAP.

As in the example of (f), when the SSB burst set transmission starts in TU #7, some SSB may be transmitted outside the L2 window. According to various embodiments of the present disclosure, when an SSB transmission starts in a specific occasion within the L2 window and some SSB may be transmitted outside the L2 window as in the example of (f), a method of transmitting SSBs in a corresponding occasion may be provided. In an exemplary embodiment, the methods according to various embodiments of the present disclosure provided in Option. 1 may also be applied herein. According to various embodiments of the present disclosure, when transmission of SSB #0 is not allowed, transmission in 'X' may not be performed either.

As illustrated in FIG. 24, when L1>the transmission duration of L' SSBs (i.e., L1 exceeds L'), a transmission period such as 'X' may be required. According to various embodiments of the present disclosure, a specific SSB may be transmitted during a transmission period such as 'X'. In the example of FIG. 24, one of SSB #0, SSB #1, and SSB #2 may be transmitted in the transmission period 'X'. According to various embodiments of the present disclosure, a rule for determining an SSB to be transmitted in the transmission period 'X' may be defined.

In an exemplary embodiment, an SSB to be transmitted during the transmission period 'X' may be predefined according to a specific rule.

In an exemplary embodiment, the specific rule may be a function of SSB #0 or a function of a cell ID. Alternatively, an SSB to be transmitted during the transmission period 'X' may be configured by a UE-specific or cell-specific signal (e.g., an RRC signal, an L1 signal, or a MAC signal).

In an exemplary embodiment, the BS may operate in a stand-alone (SA) cell (e.g., a primary cell (PCell)) in the unlicensed band. Alternatively in an exemplary embodiment, the BS may operate in a non-stand-alone (NSA) cell (e.g., a primary secondary cell (PSCell) or secondary cell (SCell)).

According to various embodiments of the present disclosure, the value of L1 and/or the number of SSBs related to L1 may be configured for or indicated to the UE by a cell-specific RRC signal or a UE-specific RRC signal. In an exemplary embodiment, the cell-specific RRC signal may be, but not limited to, a PBCH, remaining minimum system information (RMSI), other system information (OSI), or the like.

In an exemplary embodiment, when the BS operates in an SA cell in Option. 1 and Option. 2, only the transmission duration of L1=L SSBs may be allowed.

When L1≠L (L1 is not the transmission duration of L SSBs) or when L1<L (L1 is the transmission duration of fewer SSBs than L), time-axis positions at which the same SSB is transmittable may be changed according to the value of L1 and the number of SSBs related to L1. Therefore, the BS needs to indicate the value of L1 and/or the number of SSBs related to L1 to the UE. In an exemplary embodiment, the BS may signal the value of L1 and/or the number of SSBs related to L1 to the UE by PBCH payload.

To guarantee the transmission reliability of a PBCH, PBCH payload needs to be minimized. Therefore, compressing the above information as much as possible and loading the compressed information in the PBCH payload may be favorable. For this purpose, according to various embodiments of the present disclosure, the BS may indicate an SSB ending index or the number of SSBs to the UE.

Specifically, according to various embodiments of the present disclosure, the BS may indicate the SSB ending index or the number of SSBs to the UE by the PBCH payload. According to various embodiments of the present disclosure, the UE may assume that SSBs with consecutive indexes from SSB index 0 to the SSB ending index or as many consecutive indexes from SSB index 0 as the number of SSBs signaled from the BS are transmitted.

According to various embodiments of the present disclosure, the interval between SSBs may be signaled to the UE by the PBCH payload. Although an SSB should be transmitted in every half-slot in the above-described examples, the BS may transmit only one SSB in a specific slot, and multiplex RMSI, a CSI-RS, and so on in the remaining resource area of the slot. In this case, it may be necessary to transmit the SSB in every slot, not in every half-slot.

According to various embodiments of the present disclosure, in this regard, the BS may signal the interval between SSBs to the UE by the PBCH payload. According to various embodiments of the present disclosure, one bit may be added to the PBCH payload to indicate whether the interval between SSBs is a half-slot according to the value of the bit. In an exemplary embodiment, one bit may be added to the PBCH payload to indicate to the UE that the interval between SSBs is a half-slot, when the one bit is set to '0' (or '1'). According to various embodiments of the present disclosure, it may be generalized that the interval between SSBs or the transmission periodicity of one SSB may be transmitted to the UE by PBCH payload or cell-specific or UE-specific RRC signaling.

According to various embodiments of the present disclosure, the interval between SSBs (or the transmission periodicity of one SSB) and an SSB ending index (or the number of SSBs) may be jointly signaled. That is, according to various embodiments of the present disclosure, information about the interval between SSBs or the transmission periodicity of one SSB and information about an SSB ending index or the number of SSBs may be jointly transmitted to the UE. For example, according to various embodiments of the present disclosure, one bit may be added to the PBCH payload, and when the bit is set to '0' (or '1'), this may indicate to the UE that the interval between SSBs is a half-slot (or two SSBs are transmitted in one slot). Alternatively, according to various embodiments of the present disclosure, if the bit is set to '1' (or '0'), this may indicate to the UE that the interval between SSBs is a slot (or one SSB is transmitted in one slot). According to various embodiments of the present disclosure, when the signaled number of SSBs is 2 and the interval between SSBs is a half-slot, this may imply that SSB #0 and SSB #1 may be transmitted in one slot. Further, according to various embodiments of the present disclosure, when the signaled number of SSBs is 2 and the interval between SSBs is a slot, SSB #0 may transmitted in one slot (without SSB #1 in the slot), and then SSB #2 (or SSB #1) may be transmitted in the next one slot.

While various embodiments of the present disclosure have been described above in the context of the PBCH by way of example, the method of indicating an SSB transmission pattern such as a transmission SSB index/the number of SSBs or the transmission periodicity of an SSB according to various embodiments of the present disclosure described above may also be applied to RRC signaling other than the PBCH. That is, those skilled in the art will clearly understand that a PBCH may be replaced with other RRC signaling in the method of indicating a transmission SSB index/the number of SSBs or the transmission periodicity of an SSB according to the various embodiments of the present disclosure described above. According to various embodiments of the present disclosure, when the interval between SSBs is a slot, this may mean that a timing synchronization relationship between a serving cell and a neighboring cell may differ by about 1 slot at maximum.

RRC signaling other than the PBCH may have more margin in terms of payload than the PBCH. In this regard, according to various embodiments of the present disclosure, when the SSB transmission pattern of a corresponding cell or a cell in a different frequency is indicated by RRC signaling (other than the PBCH), a method other than the above-described method may be applied.

In an exemplary embodiment, an L-bit bitmap and a repetition number may be signaled. For example, when "bitmap of 1000+repetition number 1" is signaled for L=4, only SSB #0 may be transmitted, and the value of L1 or the number of SSBs may be 1 in the above-described Option. 2. That is, in an exemplary embodiment, because L=4, SSB #0, SSB #1, SSB #2, and SSB #3 may be transmitted. Due to the bitmap of 1000, only SSB #0 is transmitted. Alternatively, when "bitmap of 1000+repetition number 2" is signaled for L=4, only SSB #0 may be transmitted, and the number of SSBs related to L1 may be 2 in Option. 2 (i.e., although SSB #1 is not transmitted, no SSB is transmitted in the corresponding resources).

When a plurality of candidate positions are available for transmission of one SSB in Option. 1 and Option. 2, an actual transmission position among the candidate positions may be signaled according to various embodiments of the present disclosure. Information about the actual transmission position may be jointly encoded with the value of L1 and/or the number of SSBs related to L1 according to various embodiments of the present disclosure. In an exemplary embodiment, the information about the actual transmission position among the candidate positions may be loaded in PBCH payload and jointly encoded with the value of L1 and/or the number of SSBs related to L1.

For convenience, let the maximum number of candidate positions available for transmission of an SSB within an L2 window be denoted by Y. In an exemplary embodiment, when the value of L1 and/or the number of SSBs related to L1 is 1, the number of candidate positions available for transmission of SSB #0 may be Y. In an exemplary embodiment, when the value of L1 and/or the number of SSBs related to L1 is 2, the number of candidate positions available for transmission of SSB #0 may be Y/2. In an exemplary embodiment, when Y/2 is not an integer, Y/2 may be subjected to ceiling or flooring.

In summary, the number of bits required to indicate the value of L1 and/or the number of SSBs related to L1, and a resulting actual transmission position for each SSB may be determined by the following equation according to various embodiments of the present disclosure.

$$n_{bit} = \text{ceiling}\left(\log_2 \sum_{n=1}^{L} \text{flooring}\left(\frac{Y}{n}\right)\right) \quad \text{[Equation]}$$

In the equation, $n_{bit}$ is the number of bits required to indicate the value of L1 and/or the number of SSBs related to L1, and a resulting actual transmission position for each SSB. L is the maximum number of SSBs transmittable from the BS. Y is the maximum number of candidate positions available for transmission of an SSB within an L2 window. In the equation, ceiling and flooring may be exchanged with each other.

As described above, the value of L1 and/or the number of SSBs related to L1 may be configured for or indicated to the UE by cell-specific RRC signaling or UE-specific RRC signaling. As described above, according to various embodiments of the present disclosure, the cell-specific RRC signaling may be, but not limited to, a PBCH, RMSI, or OSI.

According to various embodiments of the present disclosure, which one of (predetermined) limited values is the value of L1 and/or the number of SSBs related to L1 may be configured for or indicated to the UE by cell-specific RRC signaling or UE-specific RRC signaling. In other words, according to various embodiments of the present disclosure, values available as the value of L1 and/or the number of SSBs related to L1 may be predefined, and a specific one of the predefined values may be configured for or indicated to the UE by cell-specific RRC signaling or UE-specific RRC signaling.

In an exemplary embodiment, the value of L1 may be limited to 4 or 8. The BS may signal the value of L1 as 4 or 8 to the UE by one bit of a cell-specific RRC signal or a UE-specific RRC signal.

In an exemplary embodiment, the value of L1 may be limited to an even number (2, 4, 6, or 8). The BS may signal the value of L1 as 2, 4, 6, or 8 to the UE by two bits of the cell-specific RRC signal or a UE-specific RRC signal.

In an exemplary embodiment, the value of L1 may be limited to the factors of 8 (1, 2, 4, or 8). The BS may signal the value of L1 as 1, 2, 4, or 8 to the UE by two bits of the cell-specific RRC signal or a UE-specific RRC signal.

It may be generalized that values available as L1 are predefined, and a certain set of a plurality of candidate values for L1 is configured according to various embodiments of the present disclosure. The BS may indicate a specific one of the plurality of candidate values to the UE by a cell-specific RRC signal or a UE-specific RRC signal. According to various embodiments of the present disclosure, the specific one of the plurality of candidate values may be indicated by bits in the cell-specific RRC signal or the UE-specific RRC signal, and the number of the bits may be equal to the number of the plurality of candidate values in the certain set.

3.1.3. Method of Determining Value of L

In the NR system, the value of L may be predefined or preconfigured band-specifically. For example, L=4 at 3 GHz or below, L=8 at 6 GHz or below, and L=64 at 6 GHz or above.

According to various embodiments of the present disclosure, a different L value may be set in an NR system supporting an unlicensed band operating in a sub-7 GHz band. For example, according to various embodiments of the present disclosure, the value of L may be set based on the following options. Those skilled in the art will clearly understand that the value of L may be set based on a combination of all or some of the following options, unless contradicting each other.

Opt. 1: Method of defining value of L for transmission during Y msec

For example, Y=1.

For example, when Y=1, L=2 for a 15-kHz SCS according to various embodiments of the present disclosure.

For example, when Y=1, L=4 for a 30-kHz SCS according to various embodiments of the present disclosure.

For example, when Y=1, L=8 for a 60-kHz SCS according to various embodiments of the present disclosure.

Opt. 2: Method of defining different value of L according to SCS

In an exemplary embodiment, L=2 for the 15-kHz SCS.
In an exemplary embodiment, L=4 for the 30-kHz SCS.
In an exemplary embodiment, L=8 for the 60-kHz SCS.

Opt. 3: Method of defining different value of L according to (sub)band in sub-7 GHz band In an exemplary embodiment, L=2 at 5150 to 5250 MHz.
In an exemplary embodiment, L=4 at 5250 to 5350 MHz.

According to various embodiments of the present disclosure, the value of L used in the NR system may be maintained, while the maximum value of L1 (i.e., the number of SSBs actually transmitted by the BS, equal to or less than L) may be limited. According to various embodiments of the present disclosure, L may be replaced with the maximum value of L' in Opt. 1 to Opt. 3.

If an SS/PBCH block (or a part of the SS/PBCH block, for example, a PSS) should be transmitted repeatedly even within one L2 window, the repetition number needs to be associated with L (and/or L'). For example, when an SS/PBCH block (or a part of the SS/PBCH block, for example, a PSS) should be transmitted X times repeatedly within one L2 window, L (and/or L') may be restricted to a multiple of X.

3.1.3.1 Method of Setting Different Value of L According to BS Operation (SA/NSA)

According to various embodiments of the present disclosure, the BS may operate in an SA cell (e.g., a PCell) in the unlicensed band. Alternatively, according to various embodiments of the present disclosure, the BS may operate in an NSA cell (e.g., a PSCell or SCell).

According to various embodiments of the present disclosure, different values of L (and/or different maximum values of L') may be defined for BS operations in an SA cell and an NSA cell.

For example, according to various embodiments of the present disclosure, when the BS operates in an SA cell, the value of L (or the maximum value of L') may be defined as 4.

For example, according to various embodiments of the present disclosure, when the BS operates in an NSA cell, the value of L (or the maximum value of L') may be defined as 8.

3.1.4. Method of Configuring Interval Between SSBs

Figure 25:
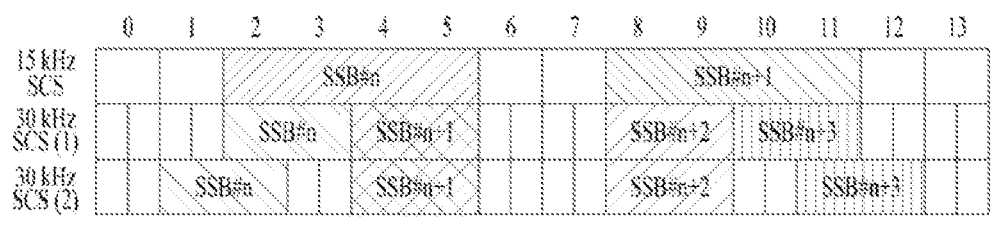
Figure 26:
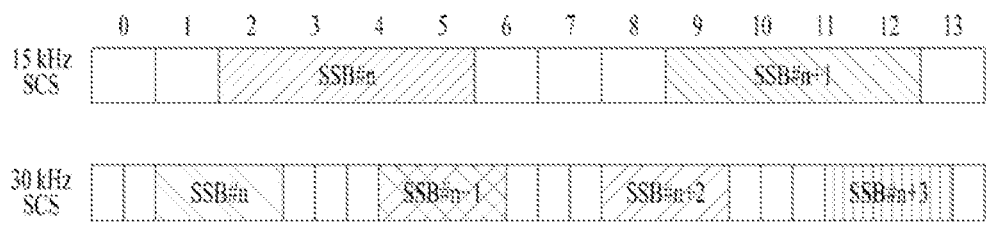
FIG. 26 is a diagram illustrating an exemplary SSB transmission structure according to various embodiments of the present disclosure.

FIGS. 25 and 26 are diagrams illustrating exemplary SSB transmission structures according to various embodiments of the present disclosure.

Referring to FIG. 25, for the 15-kHz SCS and the 30-kHz SCS, SSB transmission symbols may be determined in the NR system, as illustrated in FIG. 25. That is, in an exemplary embodiment, for the 15-kHz SCS, one SSB may be transmitted in symbols #2, #3, #4, and #5 in a slot, and another SSB may be transmitted in symbols #8, #9, #10, and #11 in the same slot.

In an exemplary embodiment, there may be two patterns for the 30-kHz SCS. In the first pattern (30 kHz SCS (1)), for example, SSB #n may be transmitted in symbols #2 and #3 in a slot, SSB #n+1 may be transmitted in symbols #4 and #5 in the same slot, SSB #n+2 may be transmitted in symbols #8 and #9 in the same slot, and SSB #n+3 may be transmitted in symbols #10 and #11 in the same slot.

In the second pattern (30 kHz SCS (2)), for example, SSB #n may be transmitted in symbols #1 and #2 in a slot, SSB #n+1 may be transmitted in symbols #4 and #5 in the same slot, SSB #n+2 may be transmitted in symbols #8 and #9 in the same slot, and SSB #n+3 may be transmitted in symbols #11 and #12 in the same slot.

The interval between SSB #n and SSB #n+1 is defined as Interval #n, and the interval between SSB #n+1 and SSB #n+2 is defined as Interval #n+1. It may be noted that Interval #n is different from Interval #n+1.

For example, Interval #n may be 2 symbols and Interval #n+1 may be 4 symbols in the cases of the 15-kHz SCS and the second pattern (30 kHz SCS (2)). In the case of the first pattern (30 kHz SCS (1)), Interval #n may be 0 symbol and Interval #n+1 may be 4 symbols.

However, because signal transmission or non-transmission depends on a CAP result in the unlicensed band, a specific SSB transmission at a predetermined timing may not be guaranteed. That is, considering that the transmission position of an SSB is variable according to a CAP result in the unlicensed band, when a UE which has detected a specific SBS attempts the next SSB detection, an inconsistent interval between SSBs may lead to ambiguity about the transmission timing of the next SSB.

To avert the above problem, various embodiments of the present disclosure may provide a method of maintaining the interval between SSBs to be constant.

For example, referring to FIG. 26, the interval between SSBs may be 3 symbols consistently according to various embodiments of the present disclosure. Obviously, FIG. 26 is exemplary. According to various embodiments of the present disclosure, SSB #n may be transmitted in symbols #3, #4, #5, and #6 (or #0, #1, #2, and #3 or #1, #2, #3, and #4), and SSB #n+1 may be transmitted 3 symbols later.

3.2. From Perspective of Cell Acquisition

In the NR system, when the UE successfully receives an SSB, the UE may obtain system frame number (SFN) information, frame boundary information, and slot boundary information. Subsequently, the UE may receive a PDCCH/PDSCH for system information from the BS. However, because signal transmission or non-transmission in the unlicensed band depends on a CAP result, a specific SSB transmission at a predetermined timing may not be guaranteed as described in subclause 3.1. Accordingly, the UE may have difficulty in obtaining the SFN information, the frame boundary information, and the slot index/boundary information.

According to various embodiments of the present disclosure described below, a method of enabling a UE to obtain SFN information, frame boundary information, and slot boundary information may be provided to overcome the above problem. Various embodiments of the present disclosure may also be applied, when the UE obtains timing information about a cell to be measured during neighboring cell measurement and/or intra-frequency measurement and/or inter-frequency measurement. This will be easily understood to those skilled in the art.

3.2.1. [Method #1] Acquisition of Frame/Slot Boundary/Index Information from PBCH Payload According to various embodiments of the present disclosure, method #1 of enabling a UE to obtain frame/slot boundary/index information from PBCH payload may be provided. Method #1 may be effective, particularly when PBCH decoding is possible in one slot, that is, PBCH decoding is possible even with one SSB reception.

According to various embodiments of the present disclosure, frame/slot boundary/index information may be fully and/or partially transmitted to the UE by a PBCH scrambling sequence. According to various embodiments of the present disclosure, the frame/slot boundary/index information may be fully and/or partially transmitted to the UE by a DL signal/channel (e.g., system information) multiplexed with an SSB.

Referring to FIGS. 21 and 23, for convenience, it is assumed that L1<{transmission duration of L (or L') SSBs} in Option. 1 or the value of L1 is a function of the transmission duration L' in Option. 2 according to various embodiments of the present disclosure described before in subclause 3.1.

According to various embodiments of the present disclosure, PBCH demodulation reference signal (DM-RS) sequence information may be linked to SSB #0, SSB #1, and SSB #2 as illustrated in FIGS. 21 and 23. According to various embodiments of the present disclosure, the PBCH DM-RS sequence may be the same regardless of a TU actually carrying SSB #0(½) in an L2 window. That is, according to various embodiments of the present disclosure, the same PBCH DM-RS sequence may be configured irrespective of (with no regard to) a TU carrying SSB #0(½) within L2.

According to various embodiments of the present disclosure, upon detection of a PSS/SSS, the UE may identify whether a PBCH DM-RS sequence corresponds to SSB #0, SSB #1, SSB #2, or SSB #3 by blind detection (BD). According to various embodiments of the present disclosure, because the BS may transmit up to L SSBs, the UE may assume that L SSBs may be transmitted until obtaining information about L'. For example, because L=4 in the example of FIG. 21 or FIG. 23, the UE may assume that SSB #0, SSB #1, SSB #2, and SSB #3 may be transmitted.

According to various embodiments of the present disclosure, the UE may decode the PBCH based on the detected PBCH DM-RS and thus obtain frame and/or slot boundary and/or index information from PBCH payload and/or a PBCH scrambling sequence.

According to various embodiments of the present disclosure, the time-domain size of the L2 window may be set equally regardless of the SCS of an SSB or an SS/PBCH block. In this case, according to various embodiments of the present disclosure, as the SSB or SS/PBCH block has a larger SCS, more SSBs or SS/PBCH blocks may be transmitted within the L2 window. In an exemplary embodiment, the number of SSBs or SS/PBCH blocks transmittable within the L2 window may be proportional to the SCS.

In an exemplary embodiment, when the SCS of an SSB or SS/PBCH block is 15 kHz, N SSBs or SS/PBCH blocks may be transmittable within the L2 window. In this case, according to various embodiments of the present disclosure, when the SCS of an SSB or SS/PBCH block is 30 kHz, 2N SSBs or SS/PBCH blocks may be transmittable within the L2 window.

Therefore, according to various embodiments of the present disclosure, as the SCS of an SSB or SS/PBCH block increases, a larger amount of PBCH information may be needed to indicate frame and/or slot boundary/index information to the UE. In an exemplary embodiment, the required amount of PBCH information may be proportional to the SCS.

In an exemplary embodiment, when the SCS of an SSB or SS/PBCH block is 15 kHz, frame and/or slot boundary/index information may be indicated to the UE by 1-bit PBCH payload. In an exemplary embodiment, when the SCS of an SSB or SS/PBCH block is 30 kHz, frame and/or slot boundary/index information may be indicated to the UE by 2-bit PBCH payload.

That is, according to various embodiments of the present disclosure, when the SCS of an SSB or SS/PBCH block is 15 kHz, the UE may obtain frame and/or slot boundary/index information based on 1-bit PBCH payload. In this case, according to various embodiments of the present disclosure, when the SCS of an SSB or SS/PBCH block is 30 kHz, the UE may obtain frame and/or slot boundary/index information based on 2-bit PBCH payload.

3.2.2. [Method #2] Acquisition of Frame/Slot Boundary/Index Information from DM-RS Sequence of PDCCH (and PDSCH) Multiplexed with SSB According to various embodiments of the present disclosure, the UE may obtain frame/slot boundary/index information from the DM-RS sequence of a PDCCH (and a PDSCH) multiplexed with an SSB in method #2.

Referring to FIGS. 21 and 23, for convenience, it is assumed that L1<{the transmission duration of L (or L') SSBs} in Option. 1 or the value of L1 is a function of the transmission duration L' in Option. 2 according to various embodiments of the present disclosure described before in subclause 3.1. According to various embodiments of the present disclosure, PBCH DM-RS sequence information may be linked to SSB #0, SSB #1, and SSB #2 as illustrated in FIGS. 21 and 23.

According to various embodiments of the present disclosure, PBCH payload and a PBCH scrambling sequence as well as a PBCH DM-RS sequence may be the same regardless of a TU actually carrying SSB #0(½) in an L2 window. That is, according to various embodiments of the present disclosure, the same PBCH DM-RS sequence, the same PBCH payload, and the same PBCH scrambling sequence may be configured irrespective of (with no regard to) a TU carrying SSB #0(½) within L2.

For convenience, the period of an L2 window is K [msec]. According to various embodiments of the present disclosure, although the UE detects a DM-RS sequence corresponding to SSB #0 by blind-detecting a PBCH DM-RS within the L2 window and then attempts PBCH decoding, a CRS error may occur in some cases. In this case, according to various embodiments of the present disclosure, when the UE detects the DM-RS sequence corresponding to SSB #0 by performing blind detection on the PBCH DM-RS in an L2 window before or after the L2 window in which the UE has failed in PBCH decoding, the UE may attempt PBCH combining.

That is, according to various embodiments of the present disclosure, upon detection of a DM-RS sequence corresponding to SSB #0 by performing blind detection on a PBCH DM-RS in an L2 window before or after an L2 window in which the UE has failed in PBCH decoding, the UE may attempt PBCH combining. According to various embodiments of the present disclosure, various methods are available for PBCH combining. For example, a PBCH combining scheme used in the NR system may be used.

According to various embodiments of the present disclosure, even though the UE has succeeded in PBCH decoding, the UE may not have obtained accurate slot boundary information and/or slot index information. This is because even though the UE detects SSB #0 in TU #0 in the first L2 window and detects TU #2 in the L2 window after K [msec], the UE is not capable of distinguishing them from the cases of TU #2 (in the first L2 window) and TU #4 (in the next L2 window), respectively. That is, even though SSB #0 is detected in TU #0 in the first L2 window and TU #2 is detected in the next L2 window after K [msec], the UE may not distinguish TU #0 and TU #2 from TU #2 in the first L2 window and TU #4 in the next L2 window, respectively.

Therefore, according to various embodiments of the present disclosure, the UE may obtain slot (and frame) index/boundary information by detecting SSB #0 in an L2 window after another K [msec] and blind-detecting the DM-RS sequence of a PDCCH scheduled or configured within a corresponding TU.

In an exemplary embodiment, the DM-RS sequence of the scheduled or configured PDCCH may be a function of a slot and/or symbol index.

According to various embodiments of the present disclosure, the time-domain size of an L2 window may be equally set regardless of the SCS of an SSB or SS/PBCH block. In this case, according to various embodiments of the present disclosure, as the SSB or SS/PBCH block has a larger SCS, more SSBs or SS/PBCH blocks may be transmitted within the L2 window.

In an exemplary embodiment, the number of SSBs or SS/PBCH blocks transmittable within the L2 window may be proportional to the SCS.

In an exemplary embodiment, when the SCS of an SSB or SS/PBCH block is 15 kHz, N SSBs or SS/PBCH blocks may be transmittable within the L2 window. In this case, according to various embodiments of the present disclosure, when the SCS of an SSB or SS/PBCH block is 30 kHz, 2N SSBs or SS/PBCH blocks may be transmittable within the L2 window.

Accordingly, according to various embodiments of the present disclosure, as the SCS of an SSB or SS/PBCH block increases, a larger number of DM-RS sequences may be needed to indicate frame and/or slot boundary/index information to the UE. In an exemplary embodiment, the required number of DM-RS sequences may be proportional to the SCS.

3.2.3. [Method #3] Acquisition of Slot Boundary/Index Information from PBCH DM-RS According to various embodiments of the present disclosure, the UE may obtain slot boundary and/or index information from a PBCH DM-RS in method #3.

Referring to FIGS. 22 and 24, for convenience, it is assumed that L1>={transmission duration of L SSs} in Option. 1 or the value of L1 is not related to the transmission duration L' in Option. 2 according to various embodiments of the present disclosure described before in subclause 3.1.

According to various embodiments of the present disclosure, a PBCH DM-RS sequence may be different depending on a TU carrying the PBCH DM-RS despite the same SSB #0, SSB #1, or SSB #2.

In an exemplary embodiment, a different PBCH DM-RS sequence may be defined depending on a TU carrying the PBCH DM-RS sequence despite the same SSB #0, SSB #1, or SSB #2.

In an exemplary embodiment, PBCH DM-RS sequences corresponding to SSB #0 transmitted in TU #0, TU #2, TU #4, and TU #6 may correspond to index #0, index #4, index #8, and index #12, respectively.

In an exemplary embodiment, PBCH DM-RS sequences corresponding to SSB #1 transmitted in TU #0, TU #2, TU #4, and TU #6 may correspond to index #1, index #5, index #9, and index #13, respectively.

In an exemplary embodiment, PBCH DM-RS sequences corresponding to SSB #2 transmitted in TU #1, TU #3, TU #5, and TU #7 may correspond to index #2, index #6, index #10, and index #14, respectively.

In an exemplary embodiment, PBCH DM-RS sequences corresponding to SSB #3 transmitted in TU #1, TU #3, TU #5, and TU #7 may correspond to index #3, index #7, index #11, and index #15, respectively.

According to various embodiments of the present disclosure, after PSS/SSS detection, the UE may obtain slot boundary and/or index information by bind-detection of a PBCH DM-RS sequence. However, SFN information may not be obtained from the PBCH.

For example, it is assumed that L=4. In an exemplary embodiment, when the UE succeeds in detecting a sequence corresponding to PBCH DM-RS sequence index #8 in the first L2 window and succeeds in detecting a sequence corresponding to PBCH DM-RS sequence index #4 in the L2 window after K [msec], the UE may identify that both SSBs are SSB #0. Further, according to various embodiments of the present disclosure, the UE may obtain SFN information by combining PBCHs included in the two SSBs.

The above-described method may also be applied, when the value of L1 is a function of the transmission duration L' (e.g., L1=L'), which may be clearly understood by those skilled in the art.

Referring to FIG. 23, according to various embodiments of the present disclosure, a different PBCH DM-RS sequence may be defined depending on a TU carrying the PBCH DM-RS sequence despite the same SSB #0, SSB #1, or SSB #2.

In an exemplary embodiment, PBCH DM-RS sequences corresponding to SSB #0 transmitted in TU #0, TU #1, TU #3, TU #4, TU #6, and TU #7 may correspond to index #0, index #3, index #6, index #9, index #12, and index #15, respectively.

In an exemplary embodiment, PBCH DM-RS sequences corresponding to SSB #1 transmitted in TU #0, TU #2, TU #3, TU #5, and TU #6 may correspond to index #1, index #4, index #7, index #10, and index #13, respectively.

In an exemplary embodiment, PBCH DM-RS sequences corresponding to SSB #2 transmitted in TU #1, TU #2, TU #4, TU #5, and TU #7 may correspond to index #2, index #5, index #8, index #11, and index #14, respectively.

According to various embodiments of the present disclosure, after PSS/SSS detection, the UE may obtain slot boundary and/or index information by blind-detection of a PBCH DM-RS sequence. However, SFN information may not be obtained from the PBCH.

For example, it is assumed that the UE succeeds in detecting a sequence corresponding to PBCH DM-RS sequence index #6 in the first L2 window, and then succeeds in detecting a sequence corresponding to PBCH DM-RS sequence index #3 in the L2 window after K [msec]. In an exemplary embodiment, the UE may recognize that both SSBs are SSB #0 based on the fact that the result values of a modulo (mod) operation between the DM-RS sequence indexes and L1 are all equal to 0. In an exemplary embodiment, the UE may obtain SFN information by combining PBCHs included in the two SSBs.

In the NR system, 3 least significant bits (LSBs) of a PBCH DM-RS index may be used as the second scrambling code of a PBCH. However, according to various embodiments of the present disclosure described above, SFN information may be obtained through PBCH combining by using $log_2(L)$ LSBs of a PBCH DM-RS index as the second scrambling code.

For example, if L=4, the UE should use only $log_2(L)$ LSBs of a PBCH DM-RS index, that is, 2 bits, as the second scrambling sequence to obtain SFN information through PBCH combining as in the NR system.

According to various embodiments of the present disclosure, the time-domain size of an L2 window may be configured equally regardless of the SCS of an SSB or SS/PBCH block. In this case, according to various embodiments of the present disclosure, as the SSB or SS/PBCH block has a larger SCS, more SSBs or SS/PBCH blocks may be transmitted within the L2 window. In an exemplary embodiment, the number of SSBs or SS/PBCH blocks transmittable within the L2 window may be proportional to the SCS.

In an exemplary embodiment, when the SCS of an SSB or SS/PBCH block is 15 kHz, N SSBs or SS/PBCH blocks may be transmittable within the L2 window. In this case, according to various embodiments of the present disclosure, when the SCS of an SSB or SS/PBCH block is 30 kHz, 2N SSBs or SS/PBCH blocks may be transmittable within the L2 window.

Accordingly, according to various embodiments of the present disclosure, as the SCS of an SSB or SS/PBCH block increases, a larger number of PBCH DM-RS sequences may be needed to indicate frame and/or slot boundary/index information to the UE. In an exemplary embodiment, the required number of PBCH DM-RS sequences may be proportional to the SCS.

In an exemplary embodiment, when the SCS of an SSB or SS/PBCH block is 15 kHz, frame and/or slot boundary/index information may be indicated to the UE based on N PBCH DM-RS sequences. In an exemplary embodiment, when the SCS of an SSB or SS/PBCH block is 30 kHz, frame and/or slot boundary/index information may be indicated to the UE based on 2N PBCH DM-RS sequences.

That is, according to various embodiments of the present disclosure, when the SCS of an SSB or SS/PBCH block is 15 kHz, the UE may obtain frame and/or slot boundary/index information based on N PBCH DM-RS sequences. In an exemplary embodiment, when the SCS of an SSB or SS/PBCH block is 30 kHz, the UE may obtain frame and/or slot boundary/index information based on 2N PBCH DM-RS sequences.

3.2.4. [Method #4] Acquisition of Slot Boundary/Index Information from Combination of SSS (or PSS) and PBCH DM-RS According to various embodiments of the present disclosure, method #4 in which the UE obtains slot boundary and/or index information from a combination of an SSS or PSS and a PBCH DM-RS may be provided.

Referring to FIGS. 22 and 24, for convenience, it is assumed that L1>={transmission duration of L SSBs} in Option. 1, or the value of L1 is independent of the transmission duration L' in Option. 2 according to various embodiments of the present disclosure, described in sub-clause 3.1.

According to various embodiments of the present disclosure, a combination of an SSS (or PSS) and a PBCH DM-RS sequence may vary depending on which TU carries the combination despite the same SSB #0, SSB #1, or SSB #2.

That is, according to various embodiments of the present disclosure, a different combination of an SSS (or PSS) and a PBCH DM-RS sequence may be defined according to a TU carrying the combination in spite of the same SSB #0, SSB #1, or SSB #2.

In an exemplary embodiment, PBCH DM-RS sequences corresponding to SSB #0 transmitted in TU #0, TU #2, TU #4, and TU #6 may correspond to index #0, index #4, index #0, and index #4, respectively.

In an exemplary embodiment, PBCH DM-RS sequences corresponding to SSB #1 transmitted in TU #0, TU #2, TU #4, and TU #6 may correspond to index #1, index #5, index #1, and index #5, respectively.

In an exemplary embodiment, PBCH DM-RS sequences corresponding to SSB #2 transmitted in TU #1, TU #3, TU #5, and TU #7 may correspond to index #2, index #6, index #2, and index #6, respectively.

In an exemplary embodiment, PBCH DM-RS sequences corresponding to SSB #3 transmitted in TU #1, TU #3, TU #5, and TU #7 may correspond to index #3, index #7, index #3, and index #7, respectively.

In an exemplary embodiment, SSSs (or PSSs) corresponding to TU #0, TU #1, TU #2, and TU #3 may belong to SSS group A (or PSS group A).

In an exemplary embodiment, SSSs (or PSSs) corresponding to TU #4, TU #5, TU #6, and TU #7 may belong to SSS group B (or PSS group B).

In the NR system, SSSs with 336 sequences may be grouped, such that each of SSS group A and SSS group B may include 168 sequences. According to various embodiments of the present disclosure, after PSS/SSS detection, the UE may obtain slot boundary and/or index information based on the SSS detection and blind-detection of a PBCH DM-RS sequence. However, SFN information may not be obtained from the PBCH.

In an exemplary embodiment, it is assumed that L=4. In an exemplary embodiment, when the UE succeeds in detecting a sequence corresponding to PBCH DM-RS sequence index #0 and SSS group B in the first L2 window and detecting a sequence corresponding to PBCH DM-RS sequence index #4 and SSS group A the L2 window after K [msec], the UE may identify that both SSBs are SSB #0. In an exemplary embodiment, the UE may obtain SFN information by combining PBCHs included in the two SSBs. As described above, in the NR system, 3 LSBs of a PBCH DM-RS index may be used as the second scrambling code of the PBCH.

However, in various embodiments of the present disclosure described above, SFN information may be obtained through PBCH combining by using $log_2(L)$ LSBs of the PBCH DM-RS index as the second scrambling code. In this example, since L=4, the UE should use only the $log_2(L=4)$ LSBs of the PBCH DM-RS index, that is, 2 bits, as the second scrambling sequence to obtain SFN information through PBCH combining.

3.2.5. [Method #5] Acquisition of Slot Boundary/Index Information from Combination of Separate DL Signal and PBCH DM-RS According to various embodiments of the present disclosure, method #4 in which the UE obtains slot boundary and/or index information based on a combination of a separate DL signal and a PBCH DM-RS may be provided.

According to various embodiments of the present disclosure, a separate DL signal may be defined. The defined DL signal may be multiplexed with an SSB. Similarly to method #4 of obtaining slot boundary and/or index information according to various embodiments of the present disclosure described above, the UE may combine the defined DL signal with PBCH DM-RS information to obtain slot boundary and/or index information.

According to various embodiments of the present disclosure, the RE positions of the DL signal multiplexed with the SSB may be predefined. Alternatively, according to various embodiments of the present disclosure, the RE positions of the DL signal multiplexed with the SSB may be determined based on a function of a Cell-ID. That is, according to various embodiments of the present disclosure, the positions of the REs in a resource area, to which the DL signal multiplexed with the SSB is mapped, may be preset or predefined, or determined based on a function of a cell ID.

Referring to FIGS. 22 and 24, for convenience, it is assumed that L1>={transmission duration of L SSBs} in Option. 1, or the value of L1 is independent of the transmission duration L' in Option. 2 according to various embodiments of the present disclosure, described in subclause 3.1. According to various embodiments of the present disclosure, a combination of an SSS (or PSS) and a PBCH DM-RS sequence may vary depending on which TU carries the combination despite the same SSB #0, SSB #1, or SSB #2.

That is, according to various embodiments of the present disclosure, a different combination of an SSS (or PSS) and a PBCH DM-RS sequence is defined according to a TU carrying the combination in spite of the same SSB #0, SSB #1, or SSB #2.

In an exemplary embodiment, PBCH DM-RS sequences corresponding to SSB #0 transmitted in TU #0, TU #2, TU #4, and TU #6 may correspond to index #0, index #4, index #0, and index #4, respectively.

In an exemplary embodiment, PBCH DM-RS sequences corresponding to SSB #1 transmitted in TU #0, TU #2, TU #4, and TU #6 may correspond to index #1, index #5, index #1, and index #5, respectively.

In an exemplary embodiment, PBCH DM-RS sequences corresponding to SSB #2 transmitted in TU #1, TU #3, TU #5, and TU #7 may correspond to index #2, index #6, index #2, and index #6, respectively.

In an exemplary embodiment, PBCH DM-RS sequences corresponding to SSB #3 transmitted in TU #1, TU #3, TU #5, and TU #7 may correspond to index #3, index #7, index #3, and index #7, respectively.

In an exemplary embodiment, a DL signal corresponding to TU #0, TU #1, TU #2, and TU #3 may belong to sequence A.

In an exemplary embodiment, a DL signal corresponding to TU #4, TU #5, TU #6, and TU #7 may belong to sequence B.

According to various embodiments of the present disclosure, after PSS/SSS detection, the UE may obtain slot boundary and/or index information based on blind-detection of a DL signal and blind-detection of a PBCH DM-RS sequence. However, SFN information may not be obtained from a PBCH.

For example, it is assumed that L=4. In an exemplary embodiment, when the UE succeeds in detecting a sequence corresponding to PBCH DM-RS sequence index #0 and sequence B in the first L2 window and detecting a sequence corresponding to PBCH DM-RS sequence index #4 and sequence A in the L2 window after K [msec], the UE may identify that both SSBs are SSB #0.

Further, according to various embodiments of the present disclosure, the UE may obtain SFN information by combining PBCHs included in the two SSBs. As described above, 3 LSBs of a PBCH DM-RS index may be used as the second scrambling code of the PBCH in the NR system.

However, in various embodiments of the present disclosure described above, SFN information may be obtained through PBCH combining by using $\log_2(L)$ LSBs of a PBCH DM-RS index as the second scrambling code. In this example, since L=4, the UE should use only the $\log_2(L=4)$ LSBs of the PBCH DM-RS index, that is, 2 bits, as the second scrambling sequence to obtain SFN information through PBCH combining.

3.3 From Perspective of RRM Measurement

According to various embodiments of the present disclosure, a UE may perform RRM measurement for a serving cell and a neighboring cell to support mobility. According to various embodiments of the present disclosure, the UE may report RRM measurement information derived from the RRM measurement. In an exemplary embodiment, the RRM measurement information may be, but not limited to, RSRP or RSRQ.

Specifically, according to various embodiments of the present disclosure, the UE may perform RRM measurement based on an SSB (e.g., an SSS and a PBCH DM-RS) and/or a CSI-RS on a cell basis (or on a beam basis).

Particularly, various embodiments of the present disclosure descried below relate to methods of performing RRM measurement based on an SSB by a UE. In an exemplary embodiment, an SSB may be transmitted to a UE in the methods according to various embodiments of the present disclosure, described before in subclause 3.1.

In various embodiments of the present disclosure described below, it is assumed that the UE has acquired time and frequency synchronization for RRM measurement of the serving cell/neighboring cell. Various embodiments of the present disclosure described below may also be applied in the same manner in RLM and/or beam management, which could easily be understood by those skilled in the art.

3.3.1. [Method 1]

According to various embodiments of the present disclosure, after blind-detecting an SSB index within an L2 window, the UE may measure SSB quality corresponding to the same SSB index.

That is, according to various embodiments of the present disclosure, the UE may blind-detect an SSB index within an L2 window. Then, the UE may perform RRM measurement by measuring the quality of an SSB corresponding to the detected SSB index.

Referring to FIG. 21, particularly when L1<{transmission duration of L (or L') SSBs}, the UE may not identify an SSB to be transmitted after the first L1 time of the L2 window. Particularly in this case, a method of measuring the quality of an SSB according to various embodiments of the present disclosure may be applied.

3.3.3. [Method 2]<Option 1. Shifted SSB Transmission>

Referring to FIG. 22, for example, when L1>{transmission duration of L SSBs}, the index of an SSB to be transmitted at a specific time within an L2 window may be fixed. Therefore, according to various embodiments of the present disclosure, the UE may measure the quality of SSBs corresponding to the same SSB index without blind-detection of the SSB index, compared to method 1 described in subclause 3.3.1.

According to various embodiments of the present disclosure in methods 3, 4 and 5 described in subclause 3.2, even the same SSBs may have different PBCH DM-RS sequences and/or SSS sequences and/or separate DL signal sequences.

For example, it is assumed that L=4. In an exemplary embodiment, a PBCH DM-RS sequence corresponding to SSB index #0 may be transmitted in an SSB transmitted in the first TU of an L2 window. In an exemplary embodiment, a PBCH DM-RS sequence corresponding to SSB index #4 may be transmitted in an SSB transmitted in the third TU of an L2 window after K [msec].

In an exemplary embodiment, upon receipt of the two SSBs, the UE may identify that the two SSBs are the same because L=4. In an exemplary embodiment, the UE may perform L1 and/or L3 filtering on a measurement result corresponding to SSB index #0 in the first L2 window and a measurement result corresponding to SSB index #4 in the next L2 window.

3.3.3. [Method 3]<Option 2. Cyclically Rotated SSB Transmission>

In an exemplary embodiment, even when the value of L1 is a function of the transmission duration L' as illustrated in FIG. 23 and the value of L1 is independent of the transmission duration L' as illustrated in FIG. 24, the UE may perform measurement without blind-detection of an SSB index (compared to the methods according to various embodiments of the present disclosure described in subclause 3.3.1.), only when the UE has knowledge of L' and/or L. According to various embodiments of the present disclosure, L' may be replaced with L1.

Alt 1: According to various embodiments of the present disclosure, the BS may signal L' to the UE on a cell ID basis. In an exemplary embodiment, the BS may signal L' to the UE on a cell ID basis by a cell-specific RRC signal and/or a UE-specific RRC signal and/or SIB3 and/or SIB4. According to various embodiments of the present disclosure, the UE may obtain cell ID information based on PSS/SSS detection and perform measurement based on the value of L' corresponding to the obtained cell ID without ambiguity about an SSB index at a specific time in the L2 window.

According to various embodiments of the present disclosure, which one of (predefined) limited values is L' may be configured for or indicated to the UE. In other words, according to various embodiments of the present disclosure, values available as L' may be predefined and a specific one of the predefined values may be signaled to the UE.

In an exemplary embodiment, L' may be limited to 4 or 8. In an exemplary embodiment, the BS may signal to the UE whether L' is 4 or 8 by one bit of a cell-specific RRC signal or a UE-specific RRC signal.

In an exemplary embodiment, L' may be limited to an even number (2, 4, 6, or 8). In an exemplary embodiment, the BS may signal to the UE which one of 2, 4, 6, or 8 is L' by two bits of a cell-specific RRC signal or a UE-specific RRC signal.

In an exemplary embodiment, L' may be limited to a factor of 8, (1, 2, 4 or 8). In an exemplary embodiment, the BS may signal to the UE which one of 1, 2, 4, or 8 is L' by two bits of a cell-specific RRC signal or a UE-specific RRC signal.

According to various embodiments of the present disclosure, it may be generated that values available as L' are predetermined, and a predetermined set including a plurality of candidate values is configured. The BS may indicate to the UE which one of the candidate values is L' by a cell-specific RRC signal or a UE-specific RRC signal.

According to various embodiments of the present disclosure, the predetermined value among the plurality of candidate values may be indicated by bits configured in the cell-specific RRC signal or the UE-specific RRC signal, and the number of the bits may be equal to the number of the plurality of candidate values in the predetermined set.

Alt 1a: According to various embodiments of the present disclosure, the UE may have detected a cell ID for which an L' value has not been received (e.g., although the UE has received an L' value corresponding to a certain cell ID as described in Alt 1). That is, although the UE receives the cell ID, the UE may not know the L' value corresponding to the cell ID.

According to various embodiments of the present disclosure, in this case, a rule may be defined or configured so that the UE assumes a specific value of L'. In an exemplary embodiment, the UE may assume that L'=8 in this case. In an exemplary embodiment, in this case, the UE may assume that L' is the maximum one of available values. In an exemplary embodiment, in this case, the UE may assume L' as the value of L' of the serving cell.

Even though the UE is configured to report quality for each beam index (i.e., beam-level quality), the UE may have difficulty in performing beam-level RRM measurement for a cell ID in the above case because the UE has not been configured with an accurate value of L' for the cell ID. According to various embodiments of the present disclosure, in this case, it may be regulated that the UE reports only a measured cell-level quality during reporting of an RRM measurement corresponding to a corresponding cell ID and reports a specific value during reporting of a beam-level quality. In an exemplary embodiment, in this case, it may be regulated that the UE reports a value corresponding to the lowest quality (among measured cell-level qualities and/or values that the UE may report regardless of the measured cell-level qualities) as the beam-level quality.

Alt 2: According to various embodiments of the present disclosure, the UE may perform measurement on the assumption that L' of a neighboring cell is equal to L' of the serving cell.

Alt 2a: According to various embodiments of the present disclosure, the BS may signal an S value to the UE separately from the L' value of the serving cell. According to various embodiments of the present disclosure, the UE may perform measurement on the assumption that all (intra-frequency) neighboring cells subject to (intra-frequency) measurement transmit S SSBs.

Meanwhile, according to various embodiments of the present disclosure, it may be regulated that the UE assumes a specific S value, when an S value is not signaled separately. In an exemplary embodiment, the UE may assume that S=8 in this case. In an exemplary embodiment, in this case, the UE may assume that S is the maximum of available values.

Alt 2b: According to various embodiments of the present disclosure, the BS may signal to the UE whether it is possible to assume that L' of the serving cell is equal to L' of the neighboring cell. That is, according to various embodiments of the present disclosure, the BS may signal to the UE whether it is possible to assume that L' of the serving cell is equal to L' of the neighboring cell by cell-specific RRC signaling and/or UE-specific RRC signaling. In an exemplary embodiment, the cell-specific RRC signaling may be, but not limited to, a PBCH, RMSI, OSI, or the like.

According to various embodiments of the present disclosure, when the UE is configured or indicated by the BS to assume that L' of the serving cell and L' of the neighboring cell are equal, the UE may perform measurement in the method of Alt 2 according to various embodiments of the present disclosure described above.

According to various embodiments of the present disclosure, when the UE is configured or indicated by the BS not to assume that L' of the serving cell and L' of the neighboring cell are equal, the UE may perform measurement in the method of Alt 1a according to various embodiments of the present disclosure described above.

Alt 3: According to various embodiments of the present disclosure, the UE may average the measurements of SSBs detected at time points within an L2 window and report the average. That is, according to various embodiments of the present disclosure, the UE may measure only SSBs detected in each L2 window, calculate the averages of the measurements of each of the SSBs over L2 windows, and report the averages to the BS on an L2 window basis.

Referring to FIG. 23, for example, there may be 16 SSB occasions in an L2 window. In an exemplary embodiment, the UE may calculate the average of measurements of each occasion over L2 windows and report up to 16 measurements. In an exemplary embodiment, the UE may report up to 16 L1-filtered measurements to a higher layer and report beam-level and/or cell-level measurement results (after L3 filtering) to the BS.

Alt 4: According to various embodiments of the present disclosure, the UE may directly obtain the value of L' by decoding system information multiplexed with an SSB, transmitted from a neighboring cell. According to various embodiments of the present disclosure, the UE may obtain information about a cell ID by detecting a PSS/SSS and obtain the value of L' corresponding to the obtained cell ID. According to various embodiments of the present disclosure, the UE may perform measurement based on the obtained value of L' without ambiguity about an SSB index at a specific time in the L2 window.

Alt 5: According to various embodiments of the present disclosure, the serving cell may signal to the UE information about the number of beam indexes and/or the number of SSB indexes and/or the number of PBCH DM-RS sequence indexes, which the UE may assume when measuring (the neighboring cell).

In an exemplary embodiment, when the number of SSB indexes is indicated as K to the UE, the UE may measure SSBs corresponding to indexes {0, 1, ..., K−1} derived from a combination of an SSB index and/or a PBCH DM-RS sequence index and/or a PBCH DM-RS sequence and PBCH payload in a measurement window.

According to various embodiments of the present disclosure, when a downlink burst at least including an SSB burst set is defined as a discovery signal or discovery reference signal (DRS), a DRS measurement timing configuration (DMTC) may be defined. According to various embodiments of the present disclosure, a DMTC for RRM or RLM measurement may be configured (individually), and this DMTC may be an example of the afore-mentioned measurement window.

Alt 6: According to various embodiments of the present disclosure, the serving cell may signal to the UE information about a beam index and/or an SSB index and/or a PBCH DM-RS sequence index and/or an index derived from a combination of PBCH DM-RS sequence and PBCH payload, which the UE may assume when measuring (the neighboring cell).

In an exemplary embodiment, the information may be L-bit bitmap information. Assuming L=4, for example, the UE receiving bitmap information of [1 0 1 0] may perform measurement on SSB indexes #0 and #2 (and/or beam indexes #0 and #2 and/or PBCH DM-RS sequence index #0 and #2 and/or indexes #0 and #2 derived from a combination of a PBCH DM-RS sequence and PBCH payload) in the L2 window.

According to various embodiments of the present disclosure, it may be generalized that the corresponding information may be L-bit bitmap information [b 0, b 1, ..., b L−1]. Each bit of the L-bit bitmap may correspond to a beam index and/or an SSB index and/or a PBCH DM-RS sequence index and/or an index derived from a combination of a PBCH DM-RS sequence and PBCH payload, subject to measurement during the L2 window.

In an exemplary embodiment, when $b_0=1$, it may mean that the UE should perform measurement at SSB index #0. When $b_0=0$, it may mean that the UE should not perform measurement at SSB index #0.

Alt 7: According to various embodiments of the present disclosure, the serving cell or the BS may signal to the UE information about a timing at which the UE should (a neighboring cell) measurement within a measurement window (e.g., the afore-mentioned DMTC).

In an exemplary embodiment, the information may be L-bit bitmap information. Assuming that L=4, for example, the UE receiving bitmap information of [1 1 0 0] may interpret the bitmap information as its repetition during the L2 window, [1 1 0 0 1 1 0 0 1 1 0 0 . . . ] and perform measurement only at positions corresponding to a value of '1'. According to various embodiments of the present disclosure, the number of SSB candidate positions in the L2 window may be equal to the number of elements of the repeated bitmap information array.

Opt 1: According to various embodiments of the present disclosure, the UE may perform measurement at positions corresponding to '1', assuming all beam indexes and/or SSB indexes and/or PBCH DM-RS sequence indexes and/or indexes derived from combinations of PBCH DM-RS sequences and PBCH payload.

Opt 2: According to various embodiments of the present disclosure, the UE may perform measurement for beam index #0 and/or SSB index #0 and/or PBCH DM-RS sequence index #0 and/or index #0 derived from a combination of a PBCH DM-RS sequence and PBCH payload at a position in which the first bit is repeated among 4-bit bitmap repetitions. According to various embodiments of the present disclosure, the UE may perform measurement for beam index #1 and/or SSB index #1 and/or PBCH DM-RS sequence index #1 and/or index #1 derived from a combination of a PBCH DM-RS sequence and PBCH payload at a position in which the second bit is repeated among 4-bit bitmap repetitions.

Opt 3: According to various embodiments of the present disclosure, the UE may perform measurement for beam indexes #0/1 and/or SSB index #0/1 and/or PBCH DM-RS sequence #0/1 and/or index #0/1 derived from a combination of a PBCH DM-RS sequence and PBCH payload by mapping each bit of the 4-bit bitmap information to a beam index and/or an SSB index and/or a PBCH DM-RS sequence index and/or an index derived from a combination of a PBCH DM-RS sequence and PBCH payload. The UE may perform measurement only at positions corresponding to '1', interpreting time resources to be measured as repeated bitmap information.

Alt 8: According to various embodiments of the present disclosure, the serving cell or the BS may signal to the UE information about timings and beam indexes (and/or SSB indexes and/or PBCH DM-RS sequence indexes and/or indexes derived from combinations of PBCH DM-RS sequences and PBCH payload) at which the UE should perform (neighboring cell) measurement in a measurement window (e.g., the afore-mentioned DMTC).

In an exemplary embodiment, the information may be L-bit bitmap information and information about the number M. Assuming that L=4, for example, the UE receiving bitmap information of [1 1 0 0] and 3 (M=3) as the number information may interpret the bitmap information as bitmap information obtained by the first three bits of the received bitmap information during the L2 window, [1 1 0 1 1 0 1 1 0 . . . ], and perform measurement only at positions corresponding to a value of '1'. According to various embodiments of the present disclosure, the number of SSB candidate positions in the L2 window may be equal to the number of elements of the repeated bitmap information array.

Opt A: According to various embodiments of the present disclosure, the UE may perform measurement at positions corresponding to '1', assuming all beam indexes and/or SSB indexes and/or PBCH DM-RS sequence indexes and/or all indexes derived from combinations of PBCH DM-RS sequences and PBCH payload.

Opt 2: According to various embodiments of the present disclosure, the UE may perform measurement for beam index #0 and/or SSB index #0 and/or PBCH DM-RS sequence #0 and/or index #0 derived from a combination of a PBCH DM-RS sequence and PBCH payload at a position in which the first bit is repeated among 4-bit bitmap repetitions. According to various embodiments of the present disclosure, the UE may perform measurement for beam index #1 and/or SSB index #1 and/or PBCH DM-RS sequence #1 and/or index #1 derived from a combination of a PBCH DM-RS sequence and PBCH payload at a position in which the second bit is repeated among 4-bit bitmap repetitions.

Opt C: According to various embodiments of the present disclosure, the UE may perform measurement for beam index #0/1 and/or SSB index #0/1 and/or PBCH DM-RS sequence #0/1 and/or index #0/1 derived from a combination of a PBCH DM-RS sequence and PBCH payload by mapping each bit of the 4-bit bitmap information to a beam index and/or an SSB index and/or a PBCH DM-RS sequence index and/or an index derived from a combination of a PBCH DM-RS sequence and PBCH payload. The UE may perform measurement only at positions corresponding to '1', interpreting time resources to be measured as repeated bitmap information.

3.3.4 [Method 4]

Referring to FIG. 24, for example, when the value of L1 is independent of the transmission duration L', the index of an SSB to be transmitted at a specific time within an L2 window may be fixed. Therefore, according to various embodiments of the present disclosure, the UE may measure the quality of SSBs corresponding to the same SSB index without blind-detection of the SSB index, compared to the methods described in subclause 3.3.1.

According to various embodiments of the present disclosure in methods 3, 4 and 5 described in subclause 3.2, even the same SSBs may have different PBCH DM-RS sequences and/or SSS sequences and/or separate DL signal sequences.

Referring to FIG. 24, for example, it is assumed that L=4. In an exemplary embodiment, a PBCH DM-RS sequence corresponding to SSB index #0 may be transmitted in an SSB transmitted in the first TU of an L2 window. In an exemplary embodiment, a PBCH DM-RS sequence corresponding to SSB index #4 may be transmitted in an SSB transmitted in the third TU of an L2 window after K [msec]. In an exemplary embodiment, upon receipt of the two SSBs, the UE may identify that the two SSBs are the same because L=4. In an exemplary embodiment, the UE may perform L1 and/or L3 filtering on a measurement result corresponding to SSB index #0 in the first L2 window and a measurement result corresponding to SSB index #4 in the next L2 window.

3.3.3. [Method 5]

Referring to FIG. 23, when the value of L1 is a function of the transmission duration L', and when the neighboring cell and the serving cell are not accurately synchronized with each other, the UE may face ambiguity about the position of the next SSB even though the UE detects an SSB from the neighboring cell within an L2 window.

For example, (on the assumption of Case A/C among SSB transmission schemes of the NR system) when the UE detects SSB #2 in the first half-slot of TU #1 from the neighboring cell, the next SSB candidate position of the neighboring cell may be 2 symbols after the ending symbol of SSB #2. For example, when the UE detects SSB #2 in the second half-slot of TU #5 from the neighboring cell, the next SSB candidate position of the neighboring cell may be 4 symbols after the ending symbol of SSB #2. However, the UE may have difficulty in obtaining information about the transmission duration L' of the neighboring cell. In this case, even though the UE detects SSB #2, the UE may suffer from ambiguity about the position of the next SSB.

To solve this problem, according to various embodiments of the present disclosure, limitations may be imposed on the index of an SSB transmitted in the first half-slot and the index of an SSB transmitted in the second half-slot.

In an exemplary embodiment, the index of an SSB transmitted in the first half-slot may be an even value.

In an exemplary embodiment, the index of an SSB transmitted in the second half-slot may be an odd value.

In an exemplary embodiment, the index of a PBCH DM-RS sequence transmitted in the first half-slot may be an even value.

In an exemplary embodiment, the index of a PBCH DM-RS sequence transmitted in the second half-slot may be an odd value.

In an exemplary embodiment, when the index of an SSB and/or the index of a PBCH DM-RS sequence that the UE has detected from a specific neighboring cell is an even value, the UE may identify that the SSB has been transmitted in the first half-slot. In an exemplary embodiment, the UE may identify that the next SSB candidate position of the neighboring cell is 2 symbols after the SSB.

The various embodiments of the present disclosure described above are some of various implementation schemes of the present disclosure, and it is clearly understood by those skilled in the art that various embodiments of the present disclosure are not limited to the above-described embodiments. While the various embodiments of the present disclosure described above may be independently implemented, other various embodiments of the present disclosure may be configured by combining (or merging) some embodiments. It may be regulated that information indicating whether to apply the various embodiments of the present disclosure described above (or information about the rules of the various embodiments of the present disclosure described above) is indicated by a signal (e.g., a physical-layer signal or a higher-layer signal) predefined for the UE by the BS.

3.4. Initial Network Access and Communication Process

The UE may perform a network access process to perform the above-described/proposed procedures and/or methods. For example, the UE may receive and store system information and configuration information required to perform the above-described/proposed procedures and/or methods during network access (e.g., BS access). The configuration information required for the present disclosure may be received by higher-layer signaling (e.g., RRC signaling or MAC-layer signaling).

Figure 27:
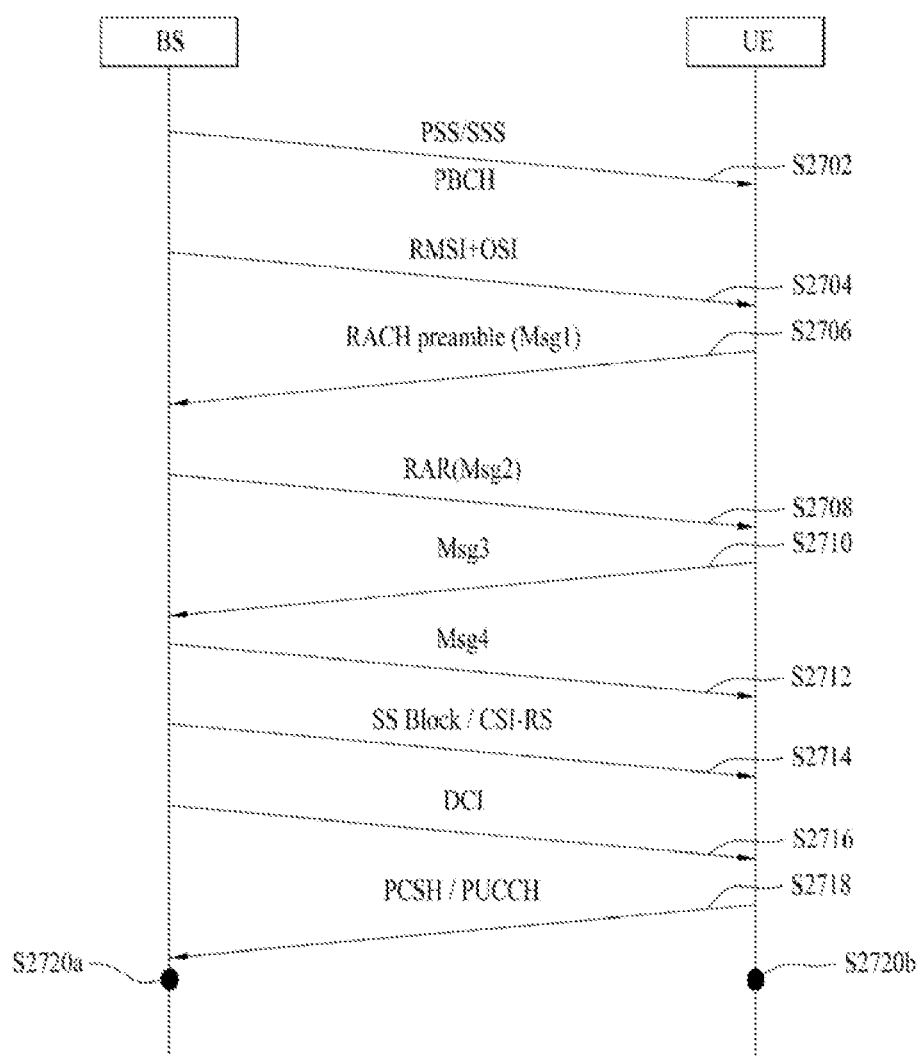
FIG. 27 is a simplified diagram illustrating a signal flow for an initial network access and subsequent communication process according to various embodiments of the present disclosure.

FIG. 27 is a diagram illustrating an initial network access and subsequent communication process. In the NR system to which various embodiments of the present disclosure, a physical channel and an RS may be transmitted by beamforming. When beamforming-based signal transmission is supported, beam management may follow for beam alignment between a BS and a UE. Further, a signal proposed in various embodiments of the present disclosure may be transmitted/received by beamforming. In RRC_IDLE mode, beam alignment may be performed based on an SSB (or SS/PBCH block), whereas in RRC_CONNECTED mode, beam alignment may be performed based on a CSI-RS (in DL) and an SRS (in UL). On the contrary, when beamforming-based signal transmission is not supported, beam-related operations in the following description may be skipped.

Referring to FIG. 27, a BS (e.g., eNB) may periodically transmit an SSB (S2702). The SSB includes a PSS/SSS/PBCH. The SSB may be transmitted by beam sweeping. The BS may then transmit RMSI and other system information (OSI) (S2704). The RMSI may include information required for the UE to perform initial access to the BS (e.g., PRACH configuration information). After detecting SSBs, the UE identifies the best SSB. The UE may then transmit an RACH preamble (Message 1; Msg1) in PRACH resources linked/corresponding to the index (i.e., beam) of the best SSB (S2706). The beam direction of the RACH preamble is associated with the PRACH resources. Association between PRACH resources (and/or RACH preambles) and SSBs (SSB indexes) may be configured by system information (e.g., RMSI). Subsequently, in an RACH procedure, the BS may transmit a random access response (RAR) (Msg2) in response to the RACH preamble (S2708), the UE may transmit Msg3 (e.g., RRC Connection Request) based on a UL grant included in the RAR (S2710), and the BS may transmit a contention resolution message (Msg4) (S2720). Msg4 may include RRC Connection Setup.

When an RRC connection is established between the BS and the UE in the RACH procedure, beam alignment may subsequently be performed based on an SSB/CSI-RS (in DL) and an SRS (in UL). For example, the UE may receive an SSB/CSI-RS (S2714). The SSB/CSI-RS may be used for the UE to generate a beam/CSI report. The BS may request the UE to transmit a beam/CSI report, by DCI (S2716). In this case, the UE may generate a beam/CSI report based on the SSB/CSI-RS and transmit the generated beam/CSI report to the BS on a PUSCH/PUCCH (S2718). The beam/CSI report may include a beam measurement result, information about a preferred beam, and so on. The BS and the UE may switch beams based on the beam/CSI report (S2720a and S2720b).

Subsequently, the UE and the BS may perform the above-described/proposed procedures and/or methods. For example, the UE and the BS may transmit a wireless signal by processing information stored in a memory or may process a received wireless signal and store the processed signal in a memory according to the proposal of the present disclosure, based on configuration information obtained in a network access process (e.g., a system information acquisition process, an RRC connection process on an RACH, and so on). The wireless signal may include at least one of a PDCCH, a PDSCH, or an RS on DL and at least one of a PUCCH, a PUSCH, or an SRS on UL.

Figure 28:
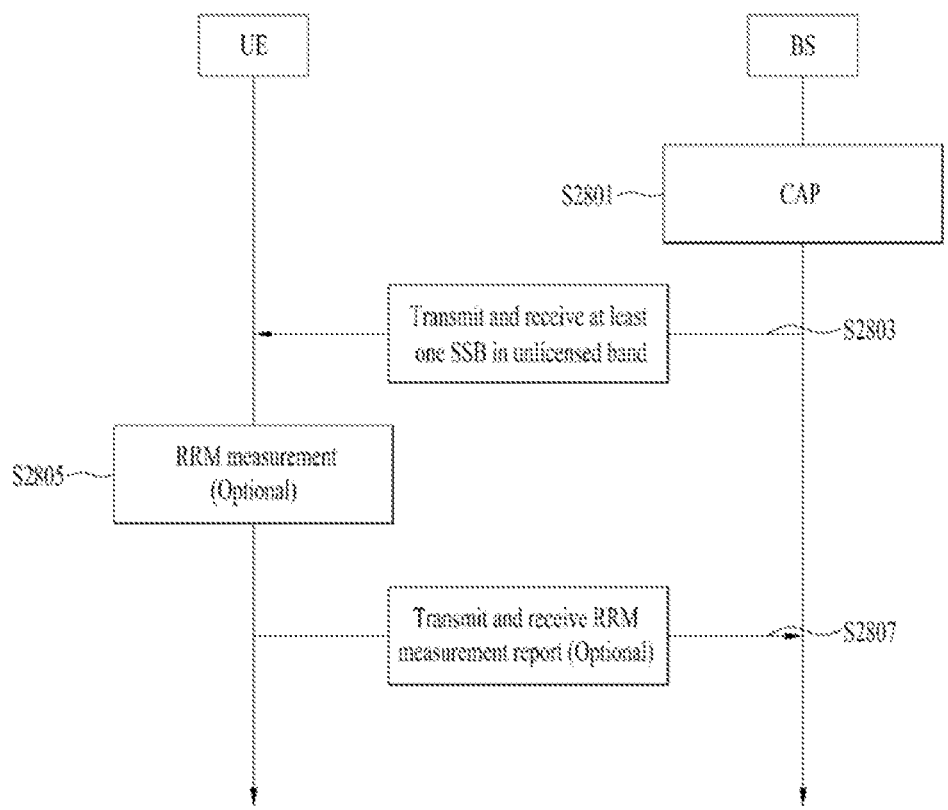
FIG. 28 is a simplified diagram illustrating a signal flow for a method of operating a UE and a BS according to various embodiments of the present disclosure.

FIG. 28 is a simplified diagram illustrating a signal flow for a method of operating a UE and a BS according to various embodiments of the present disclosure.

Figure 29:
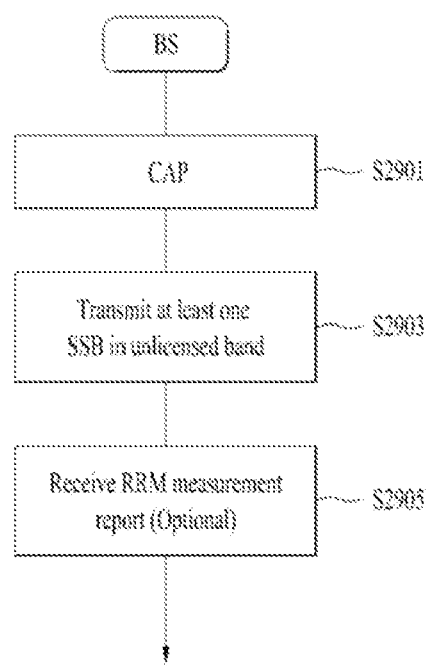
FIG. 29 is a flowchart illustrating a method of operating a UE according to various embodiments of the present disclosure.

FIG. 29 is a flowchart illustrating a method of operating a UE according to various embodiments of the present disclosure.

Figure 30:
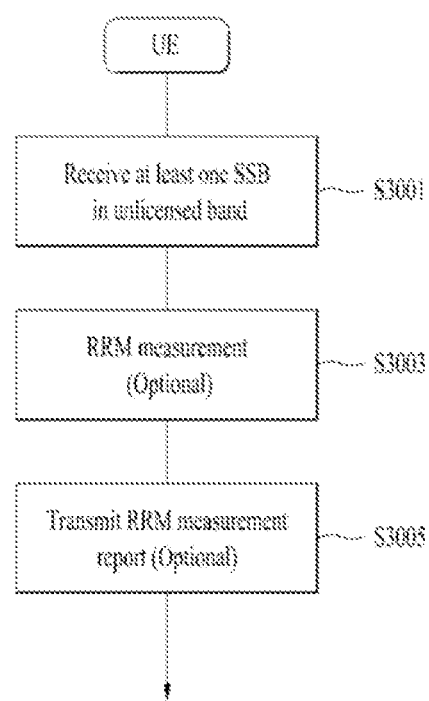
FIG. 30 is a flowchart illustrating a method of operating a BS according to various embodiments of the present disclosure.

FIG. 30 is a flowchart illustrating a method of operating a BS according to various embodiments of the present disclosure.

Referring to FIGS. 28 to 30, according to various embodiments of the present disclosure, the BS may perform a CAP for an unlicensed band (S2801 and S2901).

According to various embodiments of the present disclosure, the BS may transmit one or more SSBs in the unlicensed band based on the CAP, and the UE may receive the SSBs (S2803, S2903, and S3001).

In an exemplary embodiment, the one or more SSBs may be transmitted at one or more second consecutive candidate positions including a starting candidate position determined based on the CAP among first candidate positions configured within a time window.

In an exemplary embodiment, (optionally) the UE may perform RRM measurement in response to the one or more SSBs (S2805 and S3003). The UE may report the RRM measurements, and the BS may receive the RRM measurements (S2807, S2905, and S3005).

More detailed operations of the BS and/or the UE according to the above-described various embodiments of the present disclosure may be described and performed based on the contents of clause 1 to clause 3.

Because examples of the above-described proposed methods may also be included as one of the implementation methods of the present disclosure, it is obvious that they may be considered as a kind of proposed method. Further, while the above-described proposed methods may be implemented independently, some of the proposed methods may be combined (or merged). It may be regulated that information indicating whether to apply the various embodiments of the present disclosure described above (or information about the rules of the various embodiments of the present disclosure described above) is indicated by a signal (e.g., a physical-layer signal or a higher-layer signal) predefined for the UE by the BS.

4. Apparatus Configuration

Figure 31:
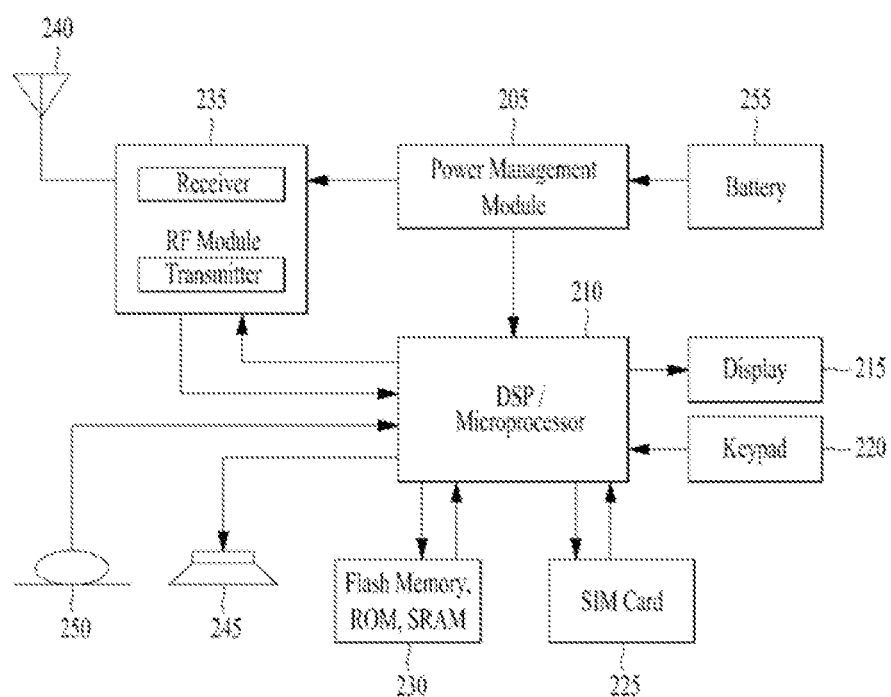
FIG. 31 is a block diagram illustrating an apparatus for implementing various embodiments of the present disclosure.

FIG. 31 is a diagram illustrating devices that implement various embodiments of the present disclosure.

The devices illustrated in FIG. 31 may be a UE and/or a BS (e.g., eNB or gNB) adapted to perform the afore-described mechanisms, or any devices performing the same operation.

Referring to FIG. 31, the device may include a digital signal processor (DSP)/microprocessor 210 and a radio frequency (RF) module (transceiver) 235. The DSP/microprocessor 210 is electrically coupled to the transceiver 235 and controls the transceiver 235. The device may further include a power management module 205, a battery 255, a display 215, a keypad 220, a SIM card 225, a memory device 230, an antenna 240, a speaker 245, and an input device 250, depending on a designer's selection.

Particularly, FIG. 31 may illustrate a UE including a receiver 235 configured to receive a request message from a network and a transmitter 235 configured to transmit timing transmission/reception timing information to the network. These receiver and transmitter may form the transceiver 235. The UE may further include a processor 210 coupled to the transceiver 235.

Further, FIG. 31 may illustrate a network device including a transmitter 235 configured to transmit a request message to a UE and a receiver 235 configured to receive timing transmission/reception timing information from the UE. These transmitter and receiver may form the transceiver 235. The network may further include the processor 210 coupled to the transceiver 235. The processor 210 may calculate latency based on the transmission/reception timing information.

A processor included in a UE (or a communication device included in the UE) and a BE (or a communication device included in the BS) according to various embodiments of the present disclosure may operate as follows, while controlling a memory.

According to various embodiments of the present disclosure, a UE or a BS may include at least one transceiver, at least one memory, and at least one processor coupled to the at least one transceiver and the at least one memory. The at least one memory may store instructions causing the at least one processor to perform the following operations.

A communication device included in the UE or the BS may be configured to include the at least one processor and the at least one memory. The communication device may be configured to include the at least one transceiver, or may be configured not to include the at least one transceiver but to be connected to the at least one transceiver.

According to various embodiments of the present disclosure, at least one processor included in a BS (or at least one processor of a communication device included in the BS) may perform a CAP for an unlicensed band.

According to various embodiments of the present disclosure, the at least one processor included in the BS may transmit one or more SSBs in the unlicensed band based on the CAP.

In an exemplary embodiment, the one or more SSBs may be transmitted at one or more second consecutive candidate positions including a starting candidate position determined based on the CAP among first candidate positions configured within a time window.

According to various embodiments of the present disclosure, at least one processor included in a UE (or at least one processor of a communication device included in the UE) may receive one or more SSBs in an unlicensed band.

In an exemplary embodiment, the at least one processor included in the UE may (optionally) perform RRM measurement in response to the one or more SSBs and report the RRM measurements.

More detailed operations of the BS and/or the UE according to the above-described various embodiments of the present disclosure may be described and performed based on the contents of clause 1 to clause 3.

Various embodiments of the present disclosure may be implemented in combination with each other, unless contradicting each other. For example, (a processor included in) a BS and/or a UE according to various embodiments of the present disclosure may perform a combination/combined operation of the embodiments of clause 1 to clause 3 described above, unless contradicting each other.

In the present specification, various embodiments of the present disclosure have been described, focusing on a data transmission/reception relationship between a BS and a UE in a wireless communication system. However, various embodiments of the present disclosure are not limited thereto. For example, various embodiments of the present disclosure may also relate to the following technical configurations.

Example of Communication System to which Various Embodiments of the Present Disclosure are Applied The various descriptions, functions, procedures, proposals, methods, and/or operational flowcharts of the various embodiments of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 32:
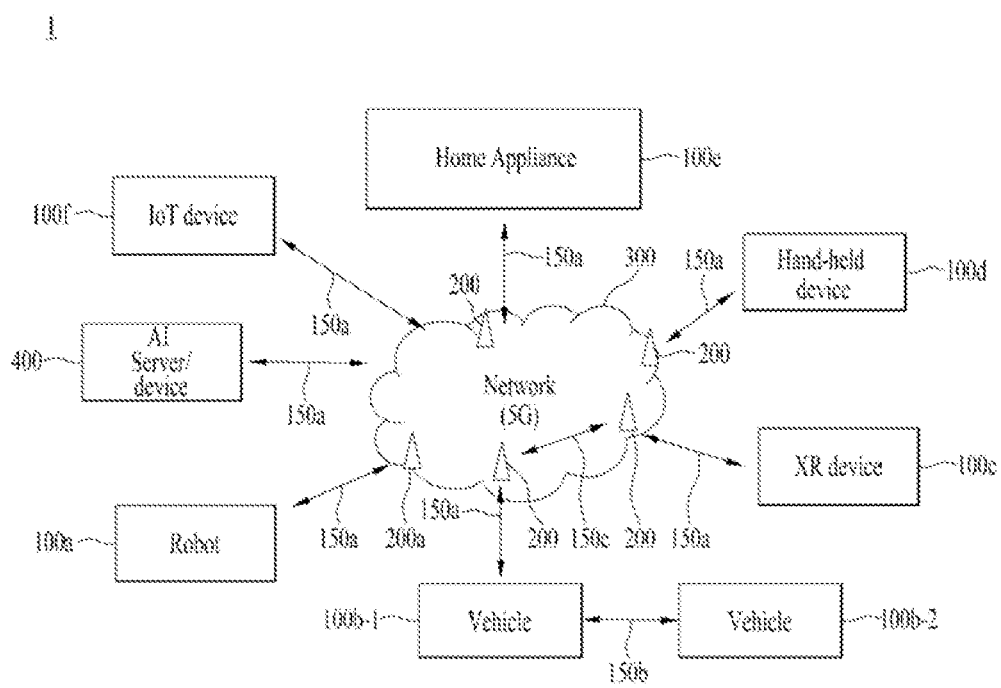
FIG. 32 is a diagram illustrating a communication system to which various embodiments of the present disclosure are applicable.

FIG. 32 illustrates an exemplary communication system to which various embodiments of the present disclosure are applied.

Referring to FIG. 32, a communication system 1 applied to the various embodiments of the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the various embodiments of the present disclosure.

Figure 33:
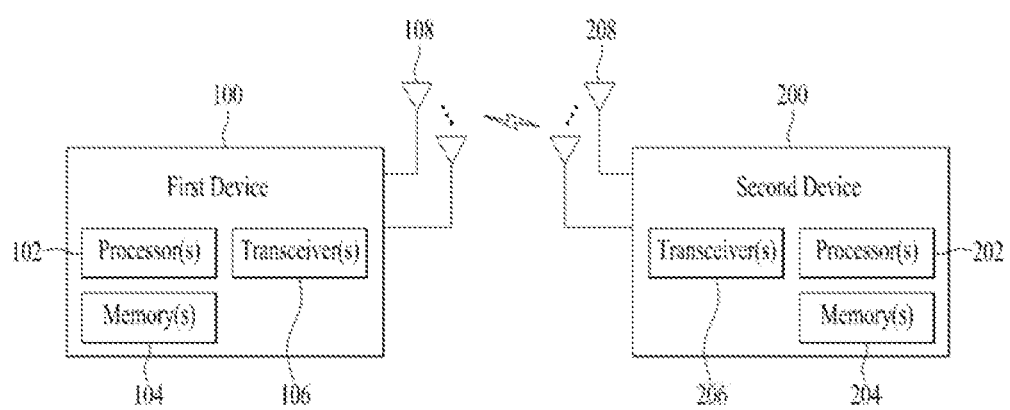
FIG. 33 is a block diagram illustrating wireless devices to which various embodiments of the present disclosure are applicable.

Example of Wireless Devices to which Various Embodiments of the Present Disclosure are Applied FIG. 33 illustrates exemplary wireless devices to which various embodiments of the present disclosure are applicable.

Referring to FIG. 33, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 32.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the various embodiments of the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the various embodiments of the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 34:
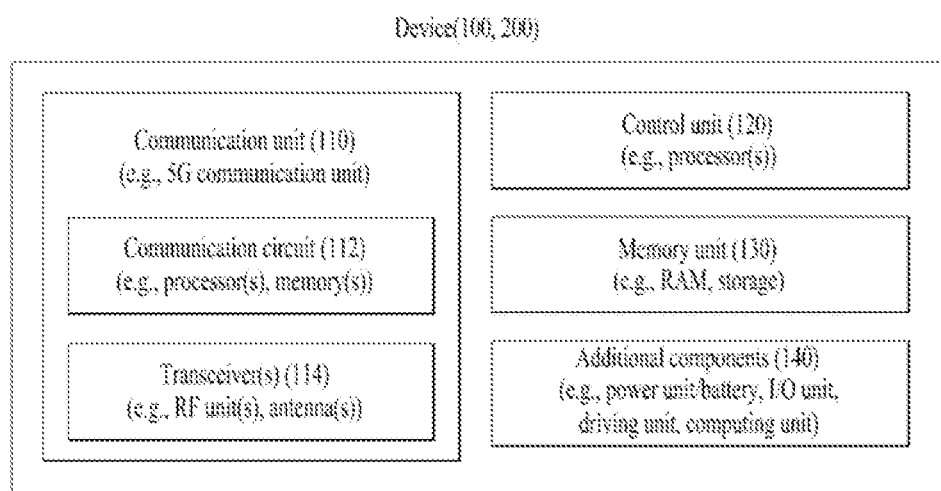
FIG. 34 is a block diagram illustrating another example of wireless devices to which various embodiments of the present disclosure are applicable.

Example of Using Wireless Devices to which Various Embodiments of the Present Disclosure are Applied FIG. 34 illustrates other exemplary wireless devices to which various embodiments of the present disclosure are applied. The wireless devices may be implemented in various forms according to a use case/service (see FIG. 32).

Referring to FIG. 34, wireless devices 100 and 200 may correspond to the wireless devices 100 and 200 of FIG. 33 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 33. For example, the transceiver(s) 114 may include the one or more transceivers 106 and 206 and/or the one or more antennas 108 and 208 of FIG. 33. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 32), the vehicles (100*b*-1 and 100*b*-2 of FIG. 32), the XR device (100*c* of FIG. 32), the hand-held device (100d of FIG. 32), the home appliance (100e of FIG. 32), the IoT device (100f of FIG. 32), a digital broadcast terminal, a hologram device, a public safety device, an MTC device, a medicine device, a fintech device (or a finance device), a security device, a climate/environment device, the AI server/device (400 of FIG. 32), the BSs (200 of FIG. 32), a network node, etc. The wireless device may be used in a mobile or fixed place according to a use-example/service.

In FIG. 34, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 34 will be described in detail with reference to the drawings.

Figure 35:
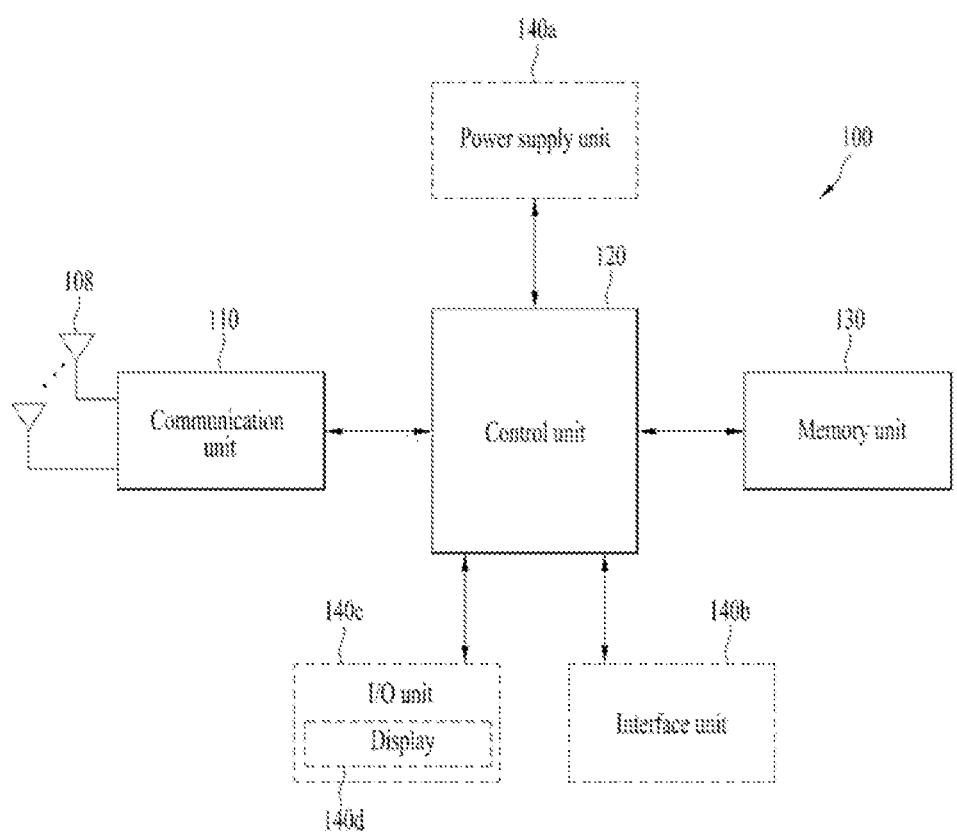
FIG. 35 is a block diagram illustrating a portable device applied to various embodiments of the present disclosure.

Example of Portable Device to which Various Embodiments of the Present Disclosure are Applied FIG. 35 illustrates an exemplary portable device to which various embodiments of the present disclosure are applied. The portable device may be any of a smartphone, a smartpad, a wearable device (e.g., a smartwatch or smart glasses), and a portable computer (e.g., a laptop). A portable device may also be referred to as mobile station (MS), user terminal (UT), mobile subscriber station (MSS), subscriber station (SS), advanced mobile station (AMS), or wireless terminal (WT).

Referring to FIG. 35, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 34, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Example of Vehicle or Autonomous Driving Vehicle to which Various Embodiments of the Present Disclosure.

Figure 36:
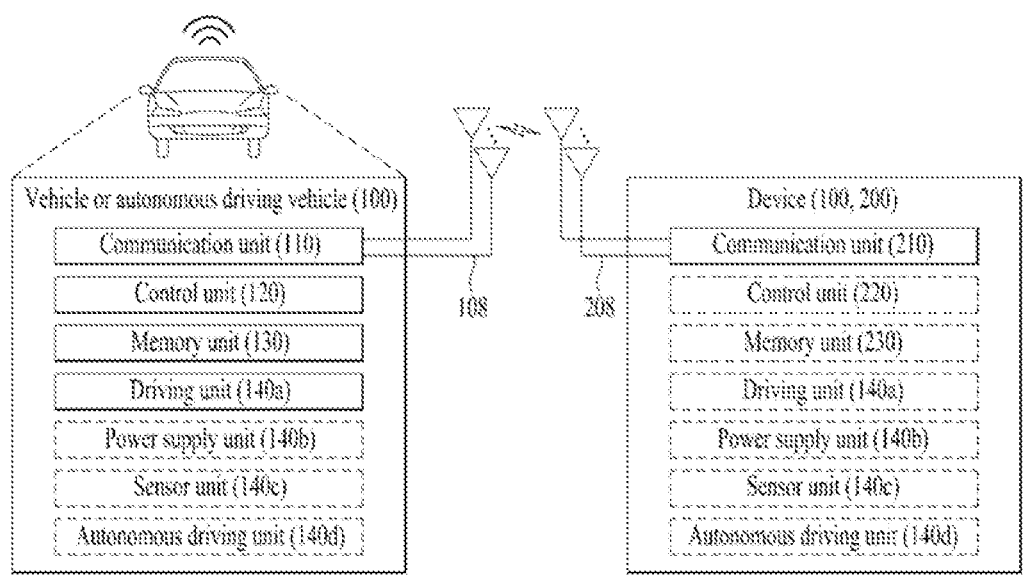
FIG. 36 is a block diagram illustrating a vehicle or an autonomous driving vehicle, which is applied to various embodiments of the present disclosure.

FIG. 36 illustrates an exemplary vehicle or autonomous driving vehicle to which various embodiments of the present disclosure. The vehicle or autonomous driving vehicle may be implemented as a mobile robot, a car, a train, a manned/unmanned aerial vehicle (AV), a ship, or the like.

Referring to FIG. 36, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 34, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

In summary, various embodiments of the present disclosure may be implemented through a certain device and/or UE.

For example, the certain device may be any of a BS, a network node, a transmitting UE, a receiving UE, a wireless device, a wireless communication device, a vehicle, a vehicle equipped with an autonomous driving function, an unmanned aerial vehicle (UAV), an artificial intelligence (AI) module, a robot, an augmented reality (AR) device, a virtual reality (VR) device, and other devices.

For example, a UE may be any of a personal digital assistant (PDA), a cellular phone, a personal communication service (PCS) phone, a global system for mobile (GSM) phone, a wideband CDMA (WCDMA) phone, a mobile broadband system (MBS) phone, a smartphone, and a multi mode-multi band (MM-MB) terminal.

A smartphone refers to a terminal taking the advantages of both a mobile communication terminal and a PDA, which is achieved by integrating a data communication function being the function of a PDA, such as scheduling, fax transmission and reception, and Internet connection in a mobile communication terminal. Further, an MM-MB terminal refers to a terminal which has a built-in multi-modem chip and thus is operable in all of a portable Internet system and other mobile communication system (e.g., CDMA 2000, WCDMA, and so on).

Alternatively, the UE may be any of a laptop PC, a hand-held PC, a tablet PC, an ultrabook, a slate PC, a digital broadcasting terminal, a portable multimedia player (PMP), a navigator, and a wearable device such as a smart watch, smart glasses, and a head mounted display (HMD). For example, a UAV may be an unmanned aerial vehicle that flies under the control of a wireless control signal. For example, an HMD may be a display device worn around the head. For example, the HMD may be used to implement AR or VR.

Various embodiments of the present disclosure may be implemented in various means. For example, various embodiments of the present disclosure may be implemented in hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the various embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the various embodiments of the present disclosure may be carried out in other specific ways than those set forth herein without departing from the spirit and essential characteristics of the various embodiments of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

The various embodiments of present disclosure are applicable to various wireless access systems including a 3GPP system, and/or a 3GPP2 system. Besides these wireless access systems, the various embodiments of the present disclosure are applicable to all technical fields in which the wireless access systems find their applications. Moreover, the proposed method can also be applied to mmWave communication using an ultra-high frequency band.

What is claimed is:

1. A method performed by a user equipment (UE) configured to operate in a wireless communication system, the method comprising:
receiving a synchronization signal/physical broadcast channel (SS/PBCH) block among a plurality of SS/PBCH blocks; and
acquiring synchronization based on the SS/PBCH block, wherein the SS/PBCH block comprises a primary synchronization signal (PSS), a secondary synchronization signal (SSS) and a physical broadcast channel (PBCH),
wherein a plurality of candidate SS/PBCH blocks related to the plurality of SS/PBCH blocks are included in a half frame, and
wherein information related to quasi-co-located (QCL) relation between the plurality of SS/PBCH blocks is received through a system information block (SIB) 4.

2. The method of claim 1, wherein the information related to QCL relation indicates one of: 1, 2, 4 or 8.

3. The method of claim 1, wherein the information related to QCL relation being received through the SIB4 corresponds to cell re-selection.

4. The method of claim 1, wherein an index of the SS/PBCH block is determined based on the information related to QCL relation and the plurality of candidate SS/PBCH blocks.

5. The method of claim 1, wherein a number of the plurality of candidate SS/PBCH blocks and a number of bits included in the PBCH are determined based on a subcarrier spacing (SCS) for the plurality of SS/PBCH blocks.

6. A user equipment (UE) configured to operate in a wireless communication system, the UE comprising:
a transceiver; and
at least one processor coupled to the transceiver, wherein the at least one processor is configured to:
receive a synchronization signal/physical broadcast channel (SS/PBCH) block among a plurality of SS/PBCH blocks; and
acquire synchronization based on the SS/PBCH block,
wherein the SS/PBCH block comprises a primary synchronization signal (PSS), a secondary synchronization signal (SSS) and a physical broadcast channel (PBCH),
wherein a plurality of candidate SS/PBCH blocks related to the plurality of SS/PBCH blocks are included in a half frame, and
wherein information related to quasi-co-located (QCL) relation between the plurality of SS/PBCH blocks is received through a system information block (SIB) 4.

7. A method performed by a base station configured to operate in a wireless communication system, the method comprising:
Obtaining a synchronization signal/physical broadcast channel (SS/PBCH) block comprising a primary synchronization signal (PSS), a secondary synchronization signal (SSS) and a physical broadcast channel (PBCH); and
transmitting the SS/PBCH block,
wherein the SS/PBCH block is included in a plurality of SS/PBCH blocks,
wherein a plurality of candidate SS/PBCH blocks related to the plurality of SS/PBCH blocks are included in a half frame, and
wherein information related to quasi-co-located (QCL) relation between the plurality of SS/PBCH blocks is transmitted through a system information block (SIB) 4.

8. A base station configured to operate in a wireless communication system, the base station comprising:
a transceiver; and
at least one processor coupled to the transceiver,
wherein the at least one processor is configured to:
obtain a synchronization signal/physical broadcast channel (SS/PBCH) block comprising a primary synchronization signal (PSS), a secondary synchronization signal (SSS) and a physical broadcast channel (PBCH); and
transmit the SS/PBCH block,
wherein the SS/PBCH block is included in a plurality of SS/PBCH blocks,
wherein a plurality of candidate SS/PBCH blocks related to the plurality of SS/PBCH blocks are included in a half frame, and
wherein information related to quasi-co-located (QCL) relation between the plurality of SS/PBCH blocks is transmitted through a system information block (SIB) 4.

* * * * *